US012136780B2

(12) United States Patent
Komoto et al.

(10) Patent No.: US 12,136,780 B2
(45) Date of Patent: Nov. 5, 2024

(54) CONNECTOR COMPRISING A TERMINAL WITH AN ARM HAVING A BASE PORTION EXTENDING ALONGSIDE A CONTACT PORITON

(71) Applicant: JAPAN AVIATION ELECTRONICS INDUSTRY, LIMITED, Tokyo (JP)

(72) Inventors: Tetsuya Komoto, Tokyo (JP); Akira Kimura, Tokyo (JP); Keisuke Nakamura, Tokyo (JP)

(73) Assignee: JAPAN AVIATION ELECTRONICS INDUSTRY, LIMITED, Tokyo (JP)

( * ) Notice: Subject to any disclaimer, the term of this patent is extended or adjusted under 35 U.S.C. 154(b) by 195 days.

(21) Appl. No.: 17/666,626

(22) Filed: Feb. 8, 2022

(65) Prior Publication Data

US 2022/0328994 A1 Oct. 13, 2022

(30) Foreign Application Priority Data

Apr. 7, 2021 (JP) ................................ 2021-065451

(51) Int. Cl.
*H01R 12/71* (2011.01)
*H01R 12/82* (2011.01)
*H01R 13/20* (2006.01)

(52) U.S. Cl.
CPC .......... *H01R 12/82* (2013.01); *H01R 12/716* (2013.01); *H01R 13/20* (2013.01)

(58) Field of Classification Search
CPC .... H01R 13/20; H01R 13/113; H01R 13/114; H01R 13/115; H01R 12/712; H01R 12/57
See application file for complete search history.

(56) References Cited

U.S. PATENT DOCUMENTS 9,048,601 B2 6/2015 Kimura
9,543,675 B1 1/2017 Takenaga et al.
(Continued)

FOREIGN PATENT DOCUMENTS

JP 2006269418 A 10/2006
JP 2010073674 A 4/2010
(Continued)

OTHER PUBLICATIONS

Extended European Search Report (EESR) dated Jul. 18, 2022, issued in counterpart European Application No. 22157643.2.
(Continued)

*Primary Examiner* — Vanessa Girardi
(74) *Attorney, Agent, or Firm* — Holtz, Holtz & Volek PC

(57) ABSTRACT

A connector is mateable with a mating connector. The connector comprises a housing and a terminal. The terminal has an arm, a contact portion and a held portion held by a holding portion of the housing. The arm couples the held portion and the contact portion to each other and supports the contact portion so that the contact portion is movable. The contact portion has a bottom portion, a first support portion, a second support portion, a first contact point and a second contact point. Each of the first support portion and the second support portion extends upward from the bottom portion. The first contact point is supported by the first support portion. The second contact point is supported by the second support portion. Under a mated state, a mating terminal of the mating connector is sandwiched and held between the first contact point and the second contact point.

18 Claims, 25 Drawing Sheets

(56) References Cited

U.S. PATENT DOCUMENTS

| | | | | |
|---|---|---|---|---|
| 10,128,614 | B2 * | 11/2018 | Suzuki .................. | H01R 13/11 |
| 10,516,228 | B2 * | 12/2019 | Takenaga ............ | H01R 12/716 |
| 2014/0213115 | A1 | 7/2014 | Kimura | |
| 2017/0040720 | A1 | 2/2017 | Lee et al. | |

FOREIGN PATENT DOCUMENTS

| | | | |
|---|---|---|---|
| JP | 5499191 | B1 | 5/2014 |
| JP | 2017016897 | A | 1/2017 |
| JP | 2017220431 | A | 12/2017 |
| JP | 2018073747 | A | 5/2018 |
| JP | 2018133309 | A | 8/2018 |

OTHER PUBLICATIONS

Japanese Office Action (and an English language translation thereof) dated Sep. 25, 2024, issued in counterpart Japanese Application No. 2021-065451.

* cited by examiner

CONNECTOR COMPRISING A TERMINAL WITH AN ARM HAVING A BASE PORTION EXTENDING ALONGSIDE A CONTACT PORITON

CROSS REFERENCE TO RELATED APPLICATIONS

This application is based on and claims priority under 35 U.S.C. § 119 to Japanese Patent Application No. JP 2021-065451 filed Apr. 7, 2021, the content of which is incorporated herein in its entirety by reference.

BACKGROUND OF THE INVENTION

This invention relates to a connector mateable with a mating connector.

For example, this type of connector is disclosed in JPA 2017-016897 (Patent Document 1), the content of which is incorporated herein by reference.

Referring to FIG. 48, Patent Document 1 discloses a connector 90 mateable with a mating connector 98. The mating connector 98 comprises a mating terminal 982. The connector 90 comprises a housing 94 and a terminal 96. The terminal 96 has a first contact point 962, a second contact point 964, a predetermined portion 966 and a fixed portion 968. The fixed portion 968 is attached to a board (not shown). Under a mated state where the connector 90 is mated with the mating connector 98, the mating terminal 982 is sandwiched and held between the first contact point 962 and the second contact point 964 of the terminal 96 so that the connector 90 is electrically connected with the mating connector 98.

Referring to FIG. 48, the first contact point 962 of the terminal 96 of Patent Document 1 is supported by a soft spring to be movable. This soft spring is a part of the terminal 96 which has high spring characteristics. In contrast, the predetermined portion 966 of the terminal 96 is restricted in movement by the housing. The second contact point 964 is supported by a part of the terminal 96 which slightly extends from an upper end of the predetermined portion 966. Thus, the second contact point 964 is supported by a hard spring and is hardly movable. For example, in an instance where a position of the mating terminal 982 is shifted toward the second contact point 964 because of tolerance, a large force presses the mating terminal 982 against the second contact point 964. This large force causes a large insertion force upon mating the mating connector 98 with the connector 90. In addition, this large force causes a large removal force upon removing the mating connector 98 from the connector 90. When the insertion force and the removal force are excessively large, the terminal 96 might be plastically deformed. Moreover, a part of the terminal 96 such as the fixed portion 968 might be damaged.

SUMMARY OF THE INVENTION

It is therefore an object of the present invention to provide a new connector having a structure which enables the insertion force upon mating and the removal force upon removing to be made small.

An aspect of the present invention provides a connector mateable with a mating connector along an upper-lower direction, the mating connector comprising a mating terminal. The connector comprises a housing and a terminal. The housing has a holding portion and an accommodation portion. The terminal has a held portion, an arm and a contact portion. The held portion is held by the holding portion. The arm couples the held portion and the contact portion to each other and supports the contact portion so that the contact portion is movable. At least a part of the arm is resiliently deformable. The contact portion is accommodated in the accommodation portion, and the whole contact portion is movable. The contact portion has a bottom portion, a first support portion, a second support portion, a first contact point and a second contact point. Each of the first support portion and the second support portion extends upward from the bottom portion. The first contact point is supported by the first support portion. The second contact point is supported by the second support portion. The second contact point is located between the first contact point and the held portion in a first horizontal direction perpendicular to the upper-lower direction. When the contact portion is seen along a second horizontal direction perpendicular to both the first horizontal direction and the upper-lower direction, the first contact point and the second contact point are apart from each other. Under a mated state where the connector is mated with the mating connector, the mating terminal is sandwiched and held between the first contact point and the second contact point.

The terminal of an aspect of the present invention has two contact points, or the first contact point and the second contact point provided on the contact portion. These two contact points are brought into contact with the mating terminal of the mating connector under the mated state. The contact portion is supported by the resiliently deformable arm so that the whole contact portion is movable. In addition, the first contact point is supported by the first support portion, and the second contact point is supported by the second support portion. According to this structure, each of the first contact point and the second contact point can be supported by a soft spring which has a long spring length, and thereby the insertion force upon mating and the removal force upon removing can be made small. Thus, an aspect of the present invention provides a new connector having a structure which enables the insertion force upon mating and the removal force upon removing to be made small.

An appreciation of the objectives of the present invention and a more complete understanding of its structure may be had by studying the following description of the preferred embodiment and by referring to the accompanying drawings.

Figure 1:
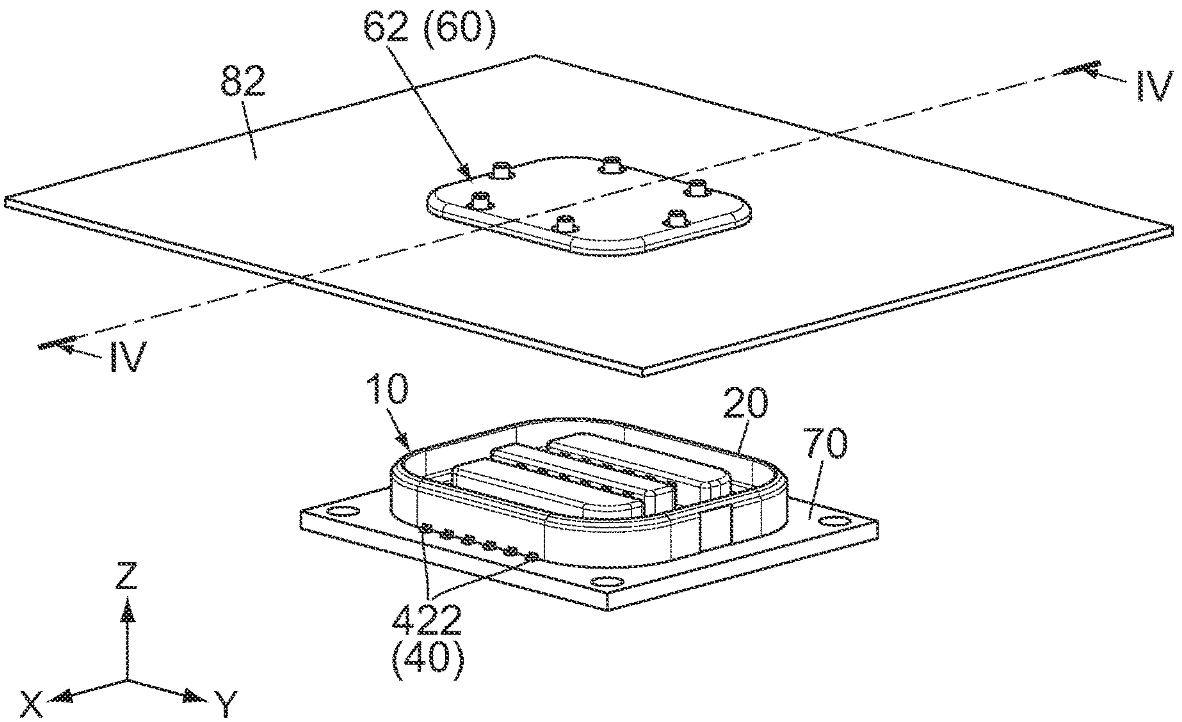
FIG. 1 is a perspective view showing a connector according to an embodiment of the present invention together with a mating connector, wherein the connector is attached to a circuit board, the mating connector is attached to a base member, and the connector and the mating connector are under a separated state where they are separated from each other.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION

Figure 2:
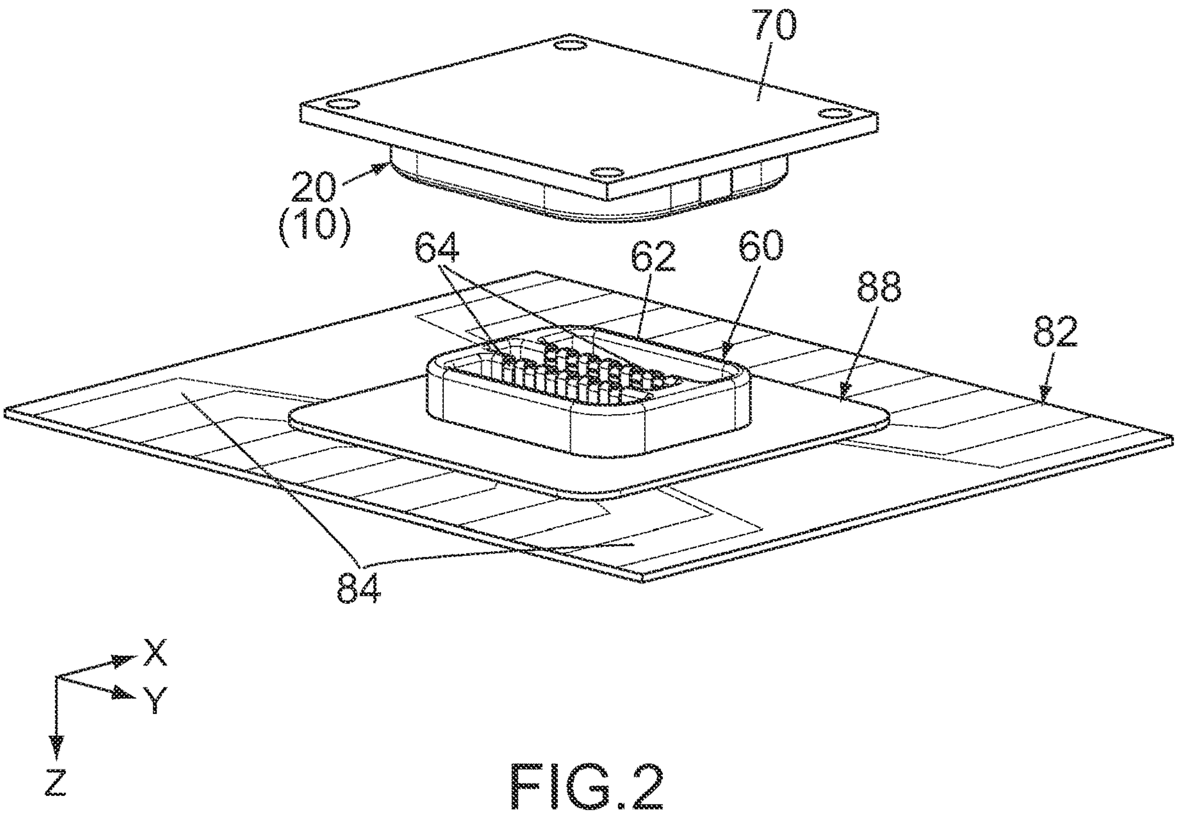
FIG. 2 is another perspective view showing the connector and the mating connector of FIG. 1.
Figure 3:
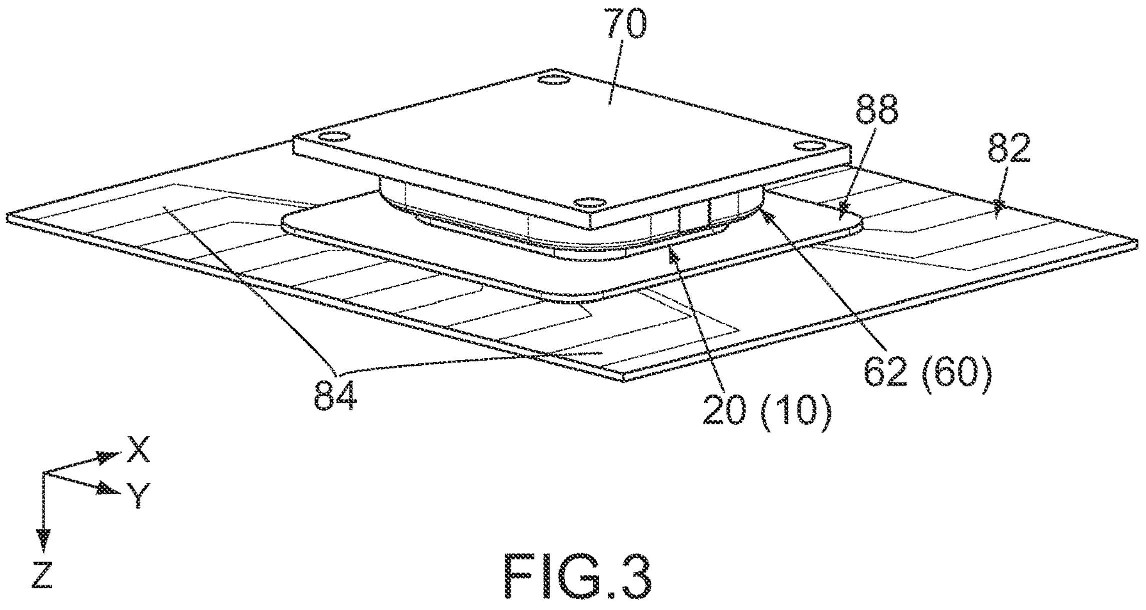
FIG. 3 is a perspective view showing the connector and the mating connector of FIG. 1, wherein the connector and the mating connector are under a mated state where they are mated with each other.

Referring to FIGS. 1 to 3, a connector 10 according to an embodiment of the present invention is mateable with a mating connector 60 along an upper-lower direction, the mating connector 60 being located below the connector 10 in the upper-lower direction. In the present embodiment and modifications, the upper-lower direction is the Z-direction. In the present embodiment and modifications, "upward" means the positive Z-direction, and "downward" means the negative Z-direction.

Referring to FIG. 2, the mating connector 60 of the present embodiment is attached to a bendable sheet member 82 and a base member 88 such as clothes. Each of the sheet member 82 and the base member 88 extends along a horizontal plane (XY-plane) perpendicular to the upper-lower direction. The sheet member 82 has an upper surface which is formed with a plurality of conductive patterns 84. The base member 88 is placed on the sheet member 82.

The mating connector 60 of the present embodiment comprises a mating housing 62 made of insulator and a plurality of mating terminals 64 each made of conductor. The mating housing 62 holds the mating terminals 64. Each of the mating terminals 64 is a member for electrically connecting the mating connector 60 with the connector 10. The mating terminals 64 have shapes same as each other. The mating terminals 64 are divided into two rows in a first horizontal direction (X-direction) perpendicular to the upper-lower direction. The mating terminals 64 of each row are arranged in a second horizontal direction (Y-direction) perpendicular to both the upper-lower direction and the first horizontal direction. However, the present invention is not limited thereto. For example, the mating terminals 64 may be arranged along an imaginary circle.

The mating connector 60 of the present embodiment has only the aforementioned members. However, the present invention is not limited thereto. For example, the arrangement of the mating terminals 64 is not specifically limited. The mating connector 60 may comprise only one of the mating terminals 64. The mating connector 60 may further have another member in addition to the aforementioned members.

Figure 4:
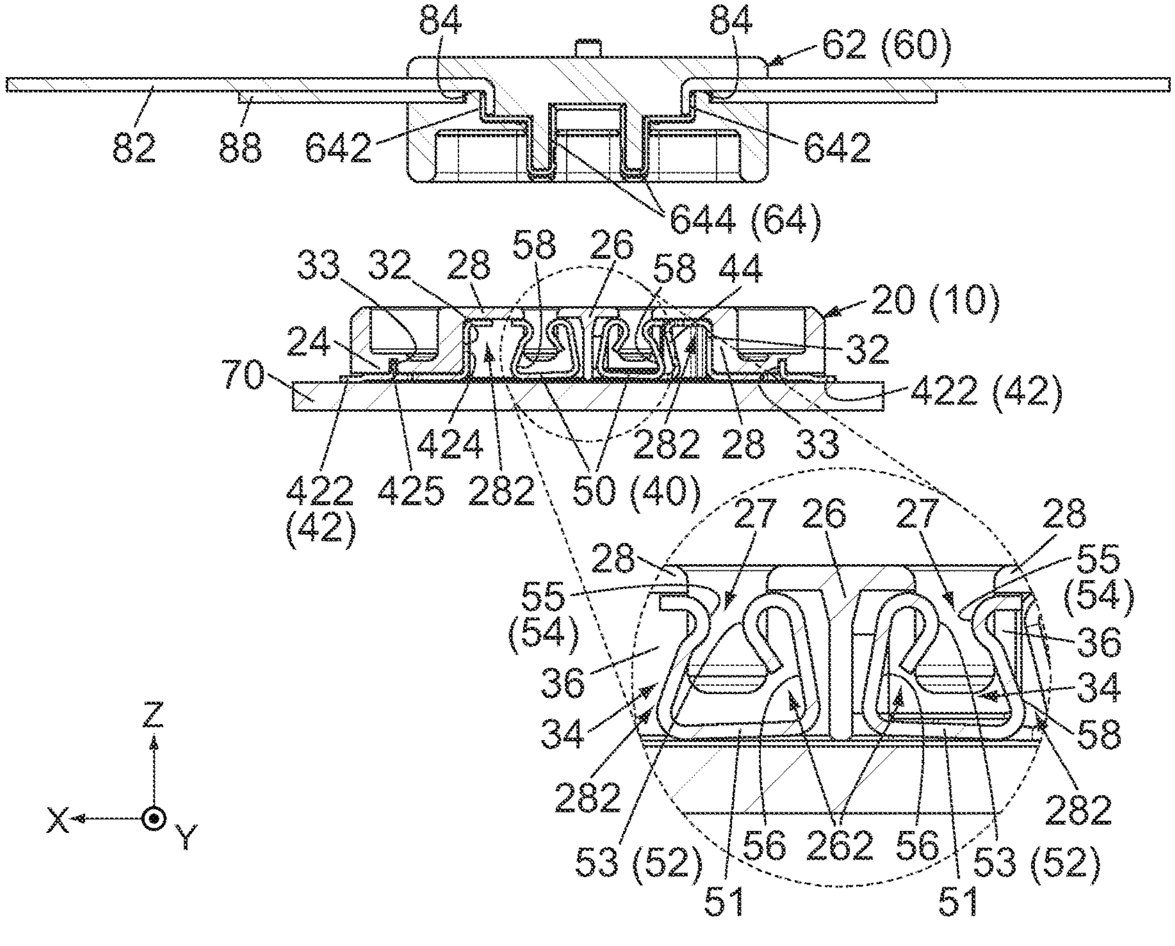
FIG. 4 is a cross-sectional view showing the connector and the mating connector of FIG. 1, taken along line IV-IV, wherein a part of the connector enclosed by dashed line is enlarged and illustrated.

Referring to FIG. 4, each of the mating terminals 64 of the present embodiment has a mating connected portion 642 and a mating contact portion 644.

The mating terminals 64 are provided so as to correspond to the conductive patterns 84, respectively. Each of the mating connected portions 642 is connected to the corresponding conductive pattern 84. Each of the mating contact portions 644 has a U-like shape in a vertical plane (XZ-plane) perpendicular to the second horizontal direction (Y-direction). Each of the mating contact portions 644 is attached to the mating housing 62 while a part of the mating housing 62 is sandwiched and held between two parts of the mating contact portion 644 in the first horizontal direction (X-direction). Thus, each of the mating contact portions 644 is fixed to the mating housing 62 so as to be unmovable relative to the mating housing 62.

Each of the mating contact portions 644, which is arranged as described above, can be brought into contact with another member on opposite sides thereof in the first horizontal direction. In particular, each of the mating contact portions 644 of the present embodiment has the opposite sides in the first horizontal direction (X-direction) each of which is electrically connectable with another member. However, the present invention is not limited thereto. For example, one of the opposite sides of each of the mating contact portions 644 in the first horizontal direction (X-direction) may be coated with insulator.

Figure 5:
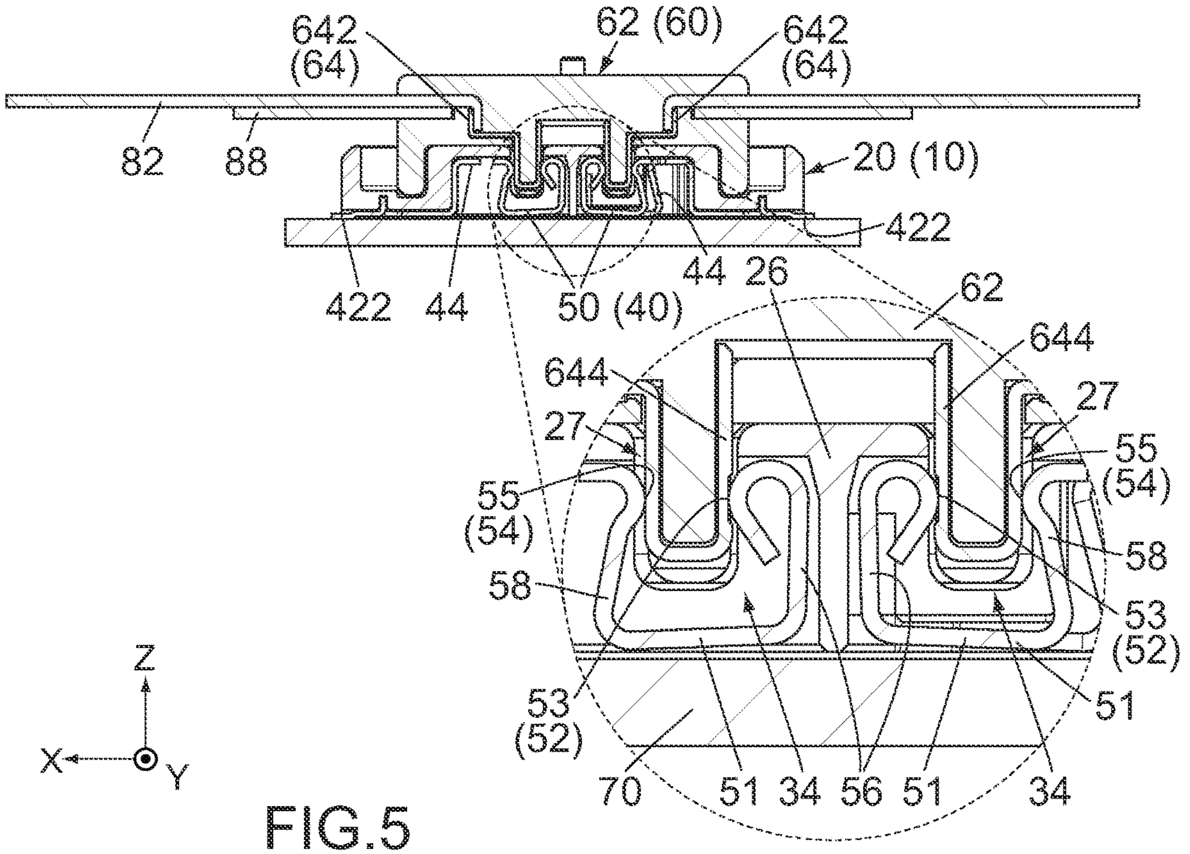
FIG. 5 is a cross-sectional view showing the connector and the mating connector of FIG. 3, taken along line IV-IV of FIG. 1, wherein a part of the connector and a part of the mating connector enclosed by dashed line is enlarged and illustrated.

Referring to FIG. 1, the connector 10 of the present embodiment is a so-called on-board connector. The connector 10 is configured to be attached to a connection object 70. The connection object 70 of the present embodiment is a circuit board 70 and is incorporated in an electronic device (not shown). Referring to FIG. 5, the electronic device works under a mated state where the connector 10 is mated with the mating connector 60. However, the present invention is not limited thereto but is applicable to various connectors. For example, the mating connector 60 may be an on-board connector which is configured to be mounted on a mating circuit board (not shown). In this instance, the connector 10 may be an on-board connector. Instead, the connector 10 may be attached to the sheet member 82 and the base member 88. Thus, the connection object 70 may be a set of the sheet member 82 and the base member 88.

Hereafter explanation will be made about the connector 10 of the present embodiment.

Figure 6:
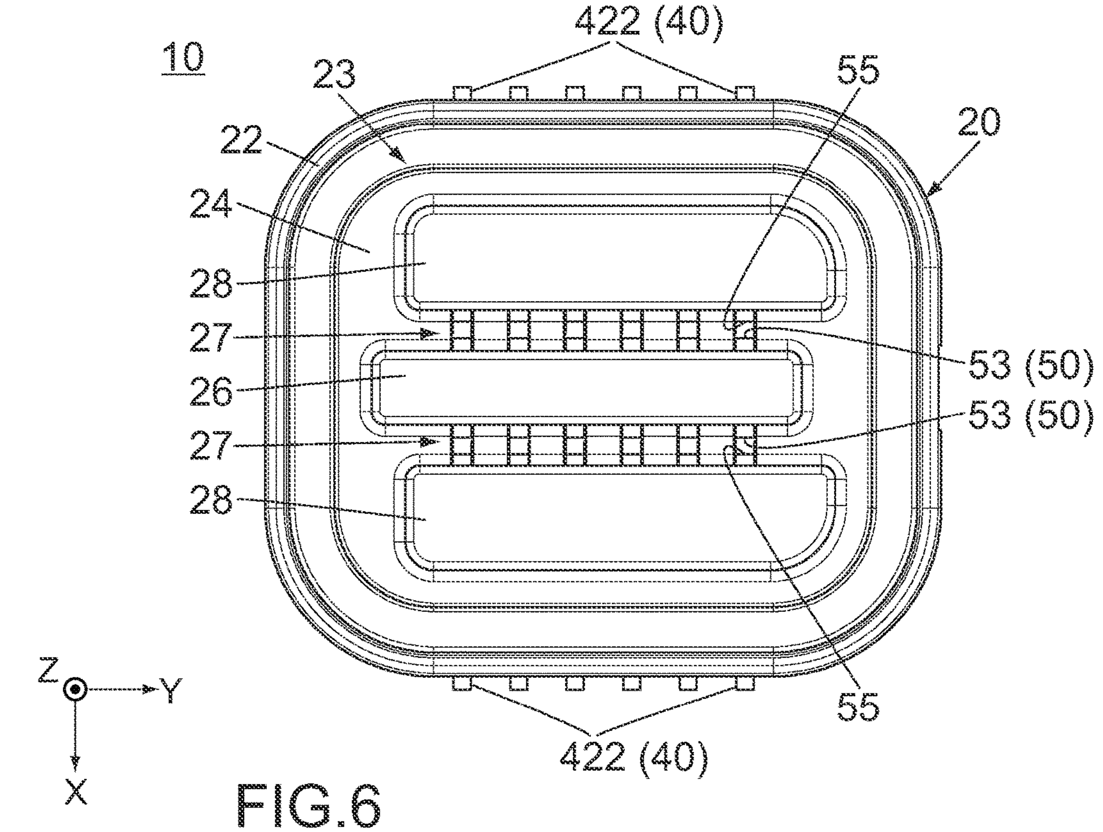
FIG. 6 is a top view showing the connector of FIG. 1.
Figure 7:
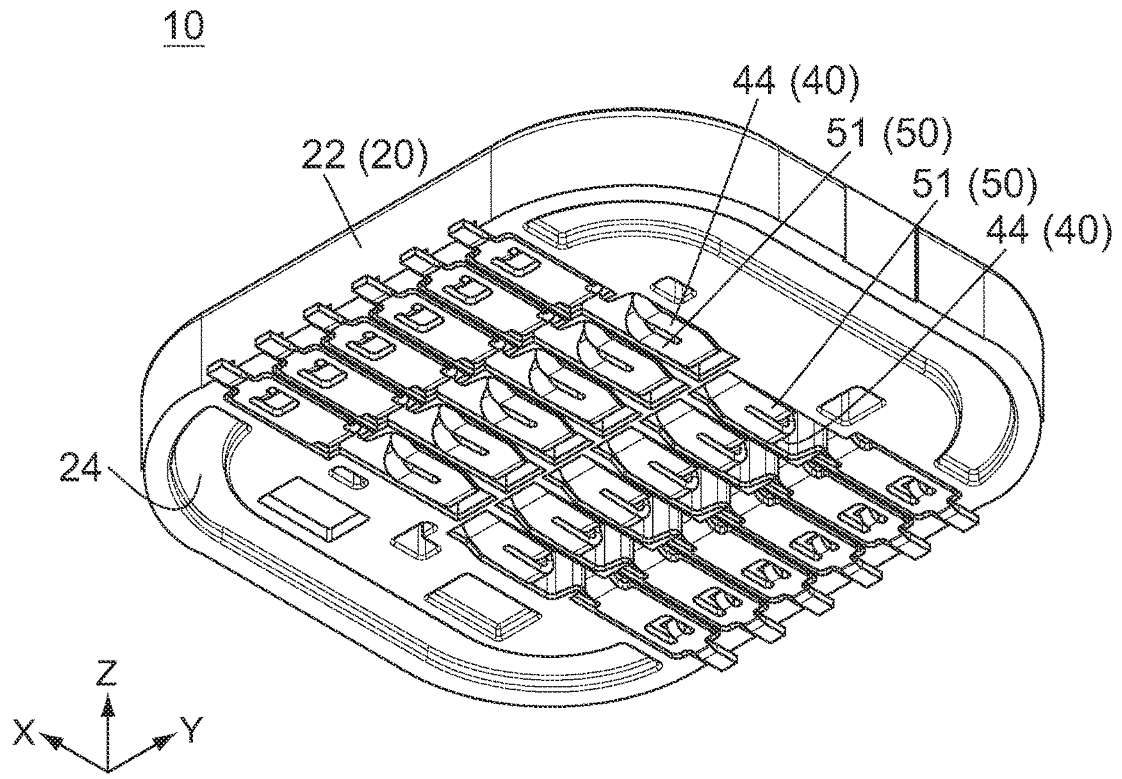
FIG. 7 is a perspective view showing the connector of FIG. 1.
Figure 8:
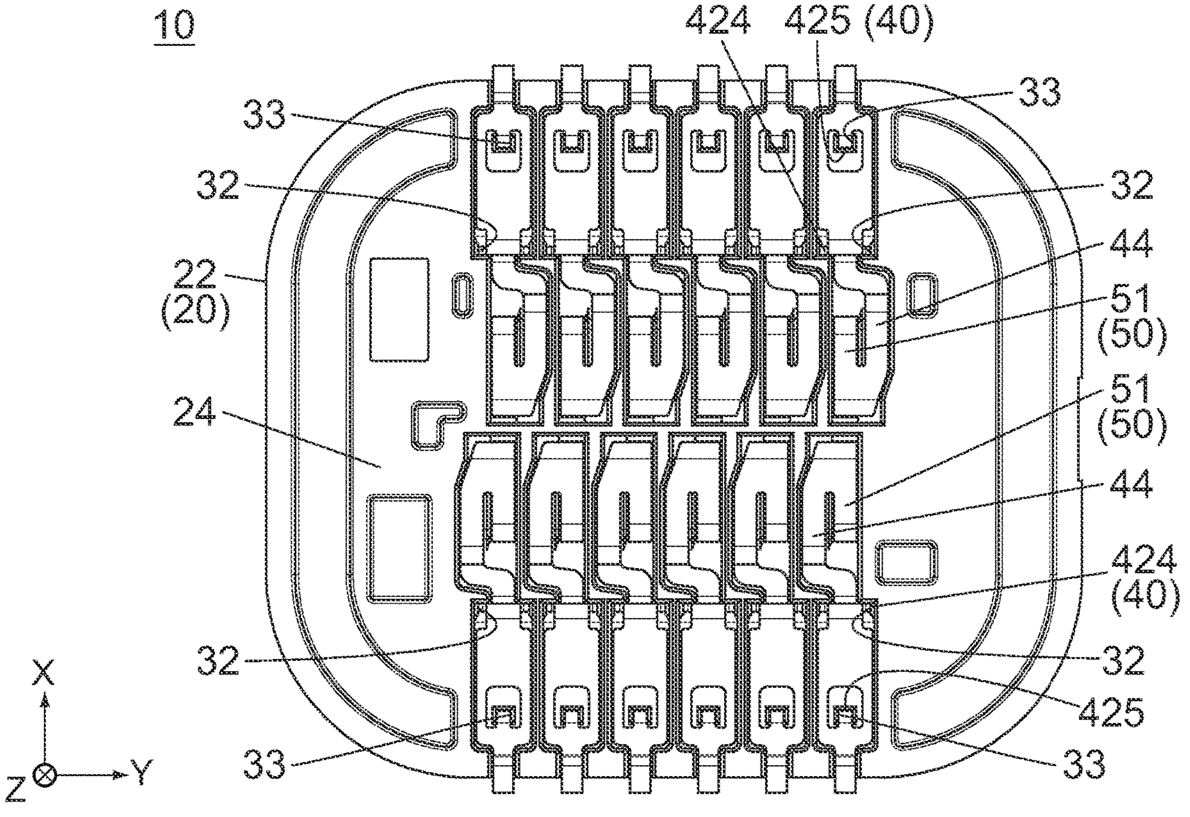
FIG. 8 is a bottom view showing the connector of FIG. 1.

Referring to FIGS. 6 to 8, the connector 10 of the present embodiment comprises a housing 20 made of insulator and a plurality of terminals 40 each made of conductor. The housing 20 of the present embodiment is a unitary member. Thus, the connector 10 is not a so-called floating connector. The housing 20 holds the terminals 40. The terminals 40 of the present embodiment have shapes same as each other. The terminals 40 are divided into two rows in the first horizontal direction (X-direction). The terminals 40 of each row is arranged in the second horizontal direction (Y-direction). Each of the terminals 40 of one of the two rows is arranged opposite to each of the terminals 40 of a remaining one of the two rows in the first horizontal direction. However, the present invention is not limited thereto. For example, the terminals 40 may be arranged along an imaginary circle.

The connector 10 of the present embodiment has only the aforementioned members. However, the present invention is not limited thereto. For example, the housing 20 may be formed of a plurality of members which are combined to each other. The terminals 40 may have shapes different from each other. The number of the terminals 40 may be one. The connector 10 may further have another member in addition to the aforementioned members.

Referring to FIG. 5, each of the terminals 40 of the present embodiment is a member for electrically connecting the connector 10 with the mating connector 60. The terminals 40 of the present embodiment are provided so as to correspond to the mating terminals 64, respectively. Under the mated state, each of the terminals 40 is brought into contact with the corresponding mating terminal 64 while the corresponding mating terminal 64 is sandwiched and held between two parts of the terminal 40 in the first horizontal direction (X-direction). As a result, the connector 10 is electrically connected with the mating connector 60 under the mated state.

Hereafter, explanation will be made about the housing 20 of the present embodiment.

Figure 9:
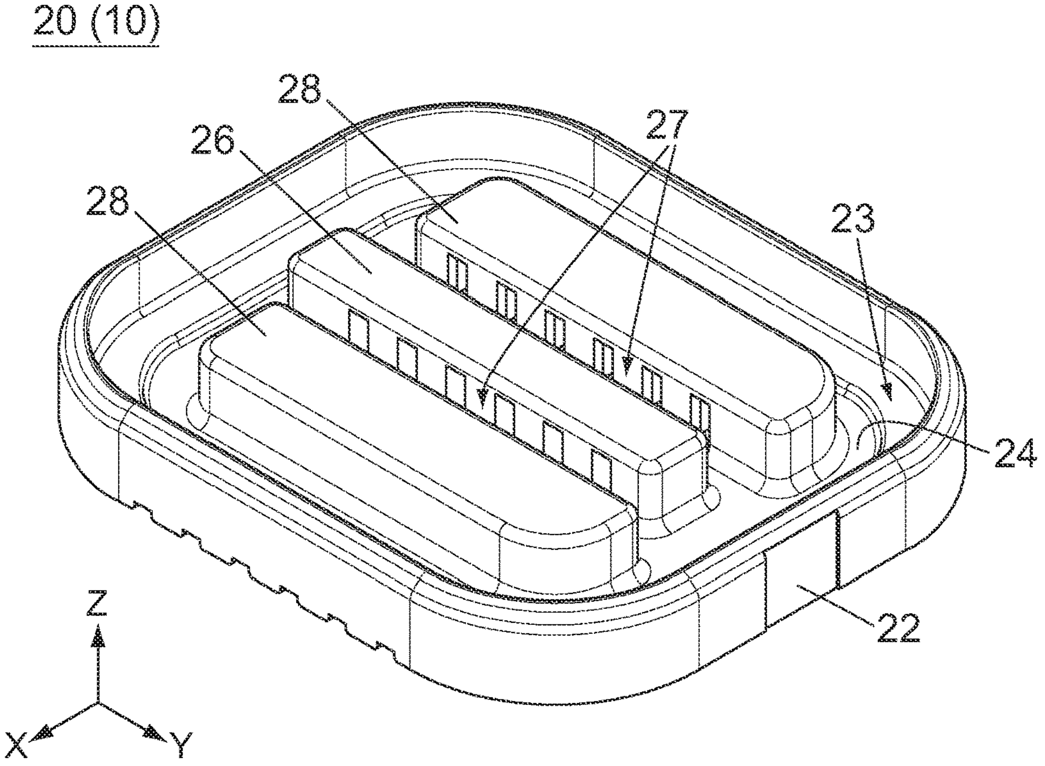
FIG. 9 is a perspective view showing a housing of the connector of FIG. 6.

Referring to FIG. 9, the housing 20 of the present embodiment has an outer wall 22, a bottom wall 24, a central projecting portion 26 and two side projecting portions 28. The bottom wall 24 is located at a lower end of the housing 20 and extends along the XY-plane. The outer wall 22 is located at an outer circumference of the housing 20 in the XY-plane and encloses the bottom wall 24 in the XY-plane. Each of the central projecting portion 26 and the side projecting portions 28 projects upward from the bottom wall 24. The central projecting portion 26 is located on the middle of the bottom wall 24 in the first horizontal direction (X-direction) and extends along the second horizontal direction (Y-direction). The central projecting portion 26 is located between the two side projecting portions 28 in the first horizontal direction. Each of the side projecting portions 28 is apart from the central projecting portion 26 in the first horizontal direction. Each of the side projecting portions 28 extends along the second horizontal direction.

The housing 20 is formed with an outer recess 23 and two receiving portions 27. The outer recess 23 is a space which is located inside the outer wall 22 in the XY-plane. The outer recess 23 extends along the outer wall 22. The two receiving portions 27 are formed so as to correspond to the two side projecting portions 28, respectively. Each of the receiving portions 27 is a space which is located between the corresponding side projecting portion 28 and the central projecting portion 26 in the first horizontal direction (X-direction). Each of the receiving portions 27 extends along the second horizontal direction (Y-direction) and has opposite ends in the second horizontal direction which communicate with the outer recess 23. Referring to FIG. 5, under the mated state, each of the mating contact portions 644 of the mating terminals 64 is received in a corresponding one of the receiving portions 27 and is brought into contact with the corresponding terminal 40.

The housing 20 of the present embodiment has the aforementioned basic structure. However, the basic structure of the housing 20 is not specifically limited, provided that each of the mating terminals 64 can be brought into contact with the corresponding terminal 40 under the mated state.

Referring to FIG. 4, each of the side projecting portions 28 is formed with a plurality of inner spaces 282 which correspond to the terminals 40, respectively. Each of the inner spaces 282 has opposite ends in the first horizontal direction (X-direction). One of the opposite ends of the inner space 282 opens toward the central projecting portion 26. A remaining one of the opposite ends of the inner space 282 is covered by a side wall of the side projecting portion 28. In addition, each of the inner spaces 282 is covered by an upper wall of the side projecting portion 28 from above.

The central projecting portion 26 is formed with a plurality of inner spaces 262 which correspond to the terminals 40, respectively. The inner spaces 262 is divided into two rows in the first horizontal direction. The two rows of the inner spaces 262 are separated from each other by a central wall of the central projecting portion 26 in the first horizontal direction. Each of the inner spaces 262 opens toward a corresponding one of the inner spaces 282 of the side projecting portions 28 in the first horizontal direction and is covered by an upper wall of the central projecting portion 26 from above.

Figure 10:
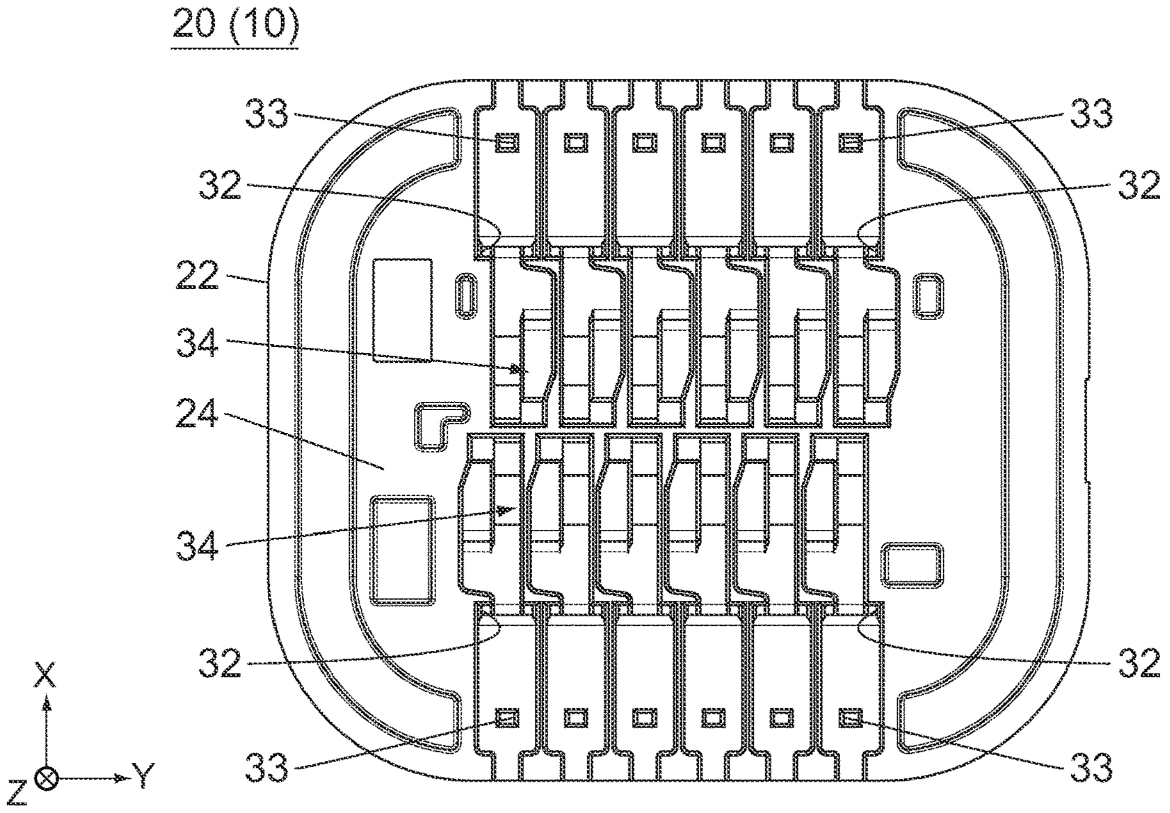
FIG. 10 is a bottom view showing the housing of FIG. 9.

Referring to FIGS. 4 and 10, the housing 20 of the present embodiment is formed with a plurality of accommodation portions 34 which correspond to the terminals 40, respectively. Referring to FIG. 4, each of the accommodation portions 34 is a space for accommodating a part of the corresponding terminal 40. Each of the accommodation portions 34 includes a predetermined inner space 282, which is a corresponding one of the inner spaces 282 of the side projecting portions 28, and a predetermined inner space 262, which is a corresponding one of the inner spaces 262 of the central projecting portion 26. Each of the accommodation portions 34 extends between the predetermined inner space 282 and the predetermined inner space 262 in the first horizontal direction (X-direction). Each of the accommodation portions 34 opens downward from the housing 20 while communicating with a corresponding one of the receiving portions 27 in the upper-lower direction.

Referring to FIGS. 4 and 10, the housing 20 of the present embodiment is formed with a plurality of holding portions 32 which correspond to the terminals 40, respectively, and a plurality of holding portions 33 which correspond to the terminals 40, respectively, in addition to the accommodation portions 34. Referring to FIG. 4, each of the holding portions 32 and 33 is a part for holding the corresponding terminal 40. Each of the holding portions 32 of the present embodiment is a part of a wall surface of the inner space 282 of the side projecting portion 28. Each of the holding portions 33 of the present embodiment is a wall surface of a hole formed in the bottom wall 24.

As described above, the housing 20 of the present embodiment has a plurality of the holding portions 32, a plurality of the holding portions 33 and a plurality of the accommodation portions 34. However, the present invention is not limited thereto. For example, in an instance where the number of the terminals 40 is one, the housing 20 may have one of the holding portions 32, one of the holding portions 33 and one of the accommodation portions 34. Moreover, the housing 20 may have none of the holding portions 32 and have only the holding portions 33. Instead, the housing 20 may have none of the holding portions 33 and have only the holding portions 32.

The housing 20 of the present embodiment has a plurality of partition walls 36. Each of the partition walls 36 is located between two of the terminals 40 adjacent to each other in the second horizontal direction (Y-direction). Each of the partition walls 36 separates the adjacent two of the terminals 40 from each other to prevent short-circuit between the terminals 40. In addition, the partition walls 36 regulate a movement of each of the terminals 40 in the second horizontal direction. However, the present invention is not limited thereto, and the partition walls 36 may be provided as necessary. For example, in an instance where the number of the terminals 40 is one, the partition walls 36 do not need to be provided.

Referring to FIGS. 4 to 8, as previously described, the terminals 40 of the present embodiment have shapes same as each other. In addition, the terminals 40 are held by the housing 20 (see FIG. 4) similarly to each other and work similarly to each other. Hereafter, explanation will be made about one of the terminals 40. The explanation described below is applicable to each of the terminals 40.

Referring to FIGS. 11 to 14, the terminal 40 of the present embodiment is formed by bending a single metal plate. In other words, the terminal 40 is a single metal plate with bends. The terminal 40 has a leg 42, an arm 44 and a contact portion 50. The leg 42, the arm 44 and the contact portion 50 are, on the whole, arranged in this order in the first horizontal direction (X-direction). The terminal 40 of the present embodiment has only the aforementioned portions. However, the present invention is not limited thereto. For example, the terminal 40 may further have another portion in addition to the aforementioned portions.

The leg 42 of the present embodiment has a connected portion 422, a held portion 424 and a held portion 425. Thus, the terminal 40 has the connected portion 422, the held portion 424 and the held portion 425. The most part of the leg 42 other than the connected portion 422 and the held portions 424 and 425, has a flat-plate shape which extends along the XY-plane. The flat-plate shaped portion of the leg 42 extends straight along the first horizontal direction (X-direction). The connected portion 422 and the held portion 424 are located at opposite ends of the leg 42 in the first horizontal direction, respectively. The held portion 425 is located between the connected portion 422 and the held portion 424 in the first horizontal direction. The connected portion 422 extends along the first horizontal direction so as to be away from the held portion 424. Each of the held portions 424 and 425 extends upward from the flat-plate shaped portion of the leg 42.

Figure 11:
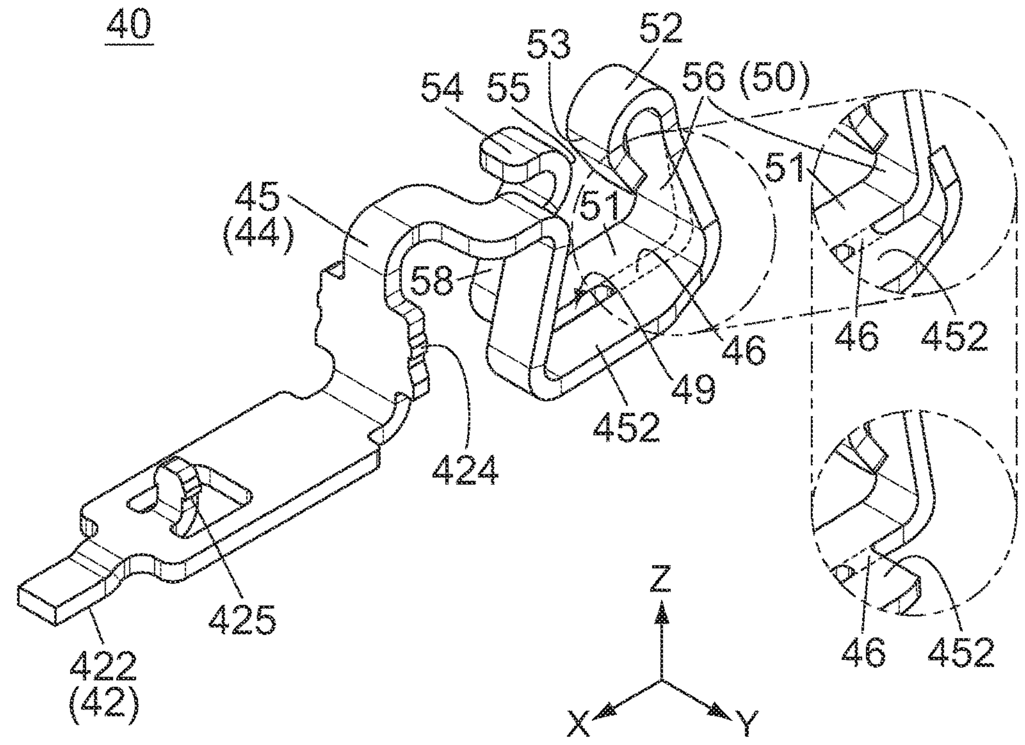
FIG. 11 is a perspective view showing a terminal of the connector of FIG. 6, wherein boundary lines of a coupling portion are illustrated with dashed line, and modifications of a part of the terminal enclosed by chain dotted lines are illustrated.
Figure 12:
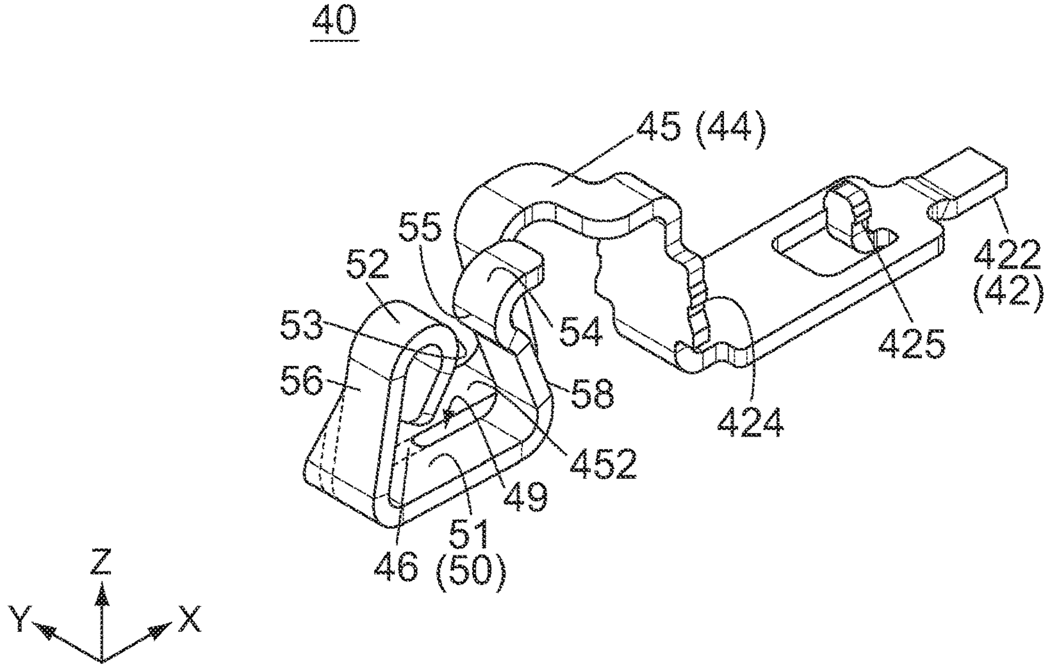
FIG. 12 is another perspective view showing the terminal of FIG. 11, wherein boundary lines of the coupling portion are illustrated with dashed line.

As shown in FIGS. 11 and 12, each of the held portions 424 and 425 of the present embodiment is formed with press-fit projections each of which projects in the second horizontal direction (Y-direction). Referring to FIG. 4, the held portions 424 and 425 are press-fit into and held by the holding portions 32 and 33 of the housing 20, respectively. In detail, the held portions 424 and 425 are press-fit into the holding portions 32 and 33, respectively, so as to be securely held. Thus, each of the held portions 424 and 425 is held by a strong holding force of the housing 20.

The accommodation portion 34 of the present embodiment has a size in the XY-plane larger than that of a part of the terminal 40 which includes the contact portion 50 and the arm 44. In addition, the whole accommodation portion 34 opens downward. According to this structure, the held portions 424 and 425 can be easily press-fit from below while the contact portion 50 and the arm 44 are inserted into the accommodation portion 34 from below.

The connected portion 422 is connected to the connection object 70 when the connector 10 is attached to the connection object 70. The connected portion 422 of the present embodiment is fixed on and connected to a conductive pad (not shown) of the connection object 70 via soldering, etc. In other words, the connected portion 422 is a surface mount technology (SMT) portion.

A part of the connected portion 422 protrudes outward from the housing 20 in the first horizontal direction (X-direction). The thus-arranged terminal 40 can be easily held by the housing 20 and can be easily fixed to the connection object 70. However, the present invention is not limited thereto, but the arrangement of the connected portion 422 can be modified as necessary.

The leg 42 of the present embodiment has the aforementioned structure and works as described above. However, the present invention is not limited thereto. For example, the leg 42 may have only one of the held portions 424 and 425. Each of the held portions 424 and 425 may be held in the housing 20 by a method other than press-fitting. Each of the held portions 424 and 425 may be held by a week holding force of the housing 20. The connected portion 422 may be a through-hole technology (THT) portion which is configured to be inserted into a through-hole provided in the connection object 70 and is configured to be fixed via soldering, etc.

As shown in FIGS. 11 and 12, the contact portion 50 of the present embodiment has a bottom portion 51, a first support portion 56, a second support portion 58, a first contact point 53 and a second contact point 55. The bottom portion 51 has a flat-plate shape which extends along the XY-plane. The bottom portion 51 is located at a lower end of the contact portion 50 and extends straight along the first horizontal direction (X-direction). The first support portion 56 and the second support portion 58 are connected to opposite ends of the bottom portion 51 in the first horizontal direction (X-direction), respectively. Each of the first support portion 56 and the second support portion 58 extends upward from the bottom portion 51. The contact portion 50 of the present embodiment has only the aforementioned portions. However, the present invention is not limited thereto. For example, the contact portion 50 may further have another portion in addition to the aforementioned portions.

The first support portion 56 has a first projection 52. The first projection 52 is an upper end part of the first support portion 56. The first projection 52 projects in an arc and toward the second support portion 58 and then extends downward. The first contact point 53 is a part of the first projection 52 which is close to the second support portion 58. The second support portion 58 has a second projection 54. The second projection 54 is an upper end part of the second support portion 58. The second projection 54 projects in an arc and toward the first support portion 56 and then extends along the first horizontal direction (X-direction) so as to be away from the first support portion 56. The second contact point 55 is a part of the second projection 54 which is close to the first support portion 56.

Figure 13:
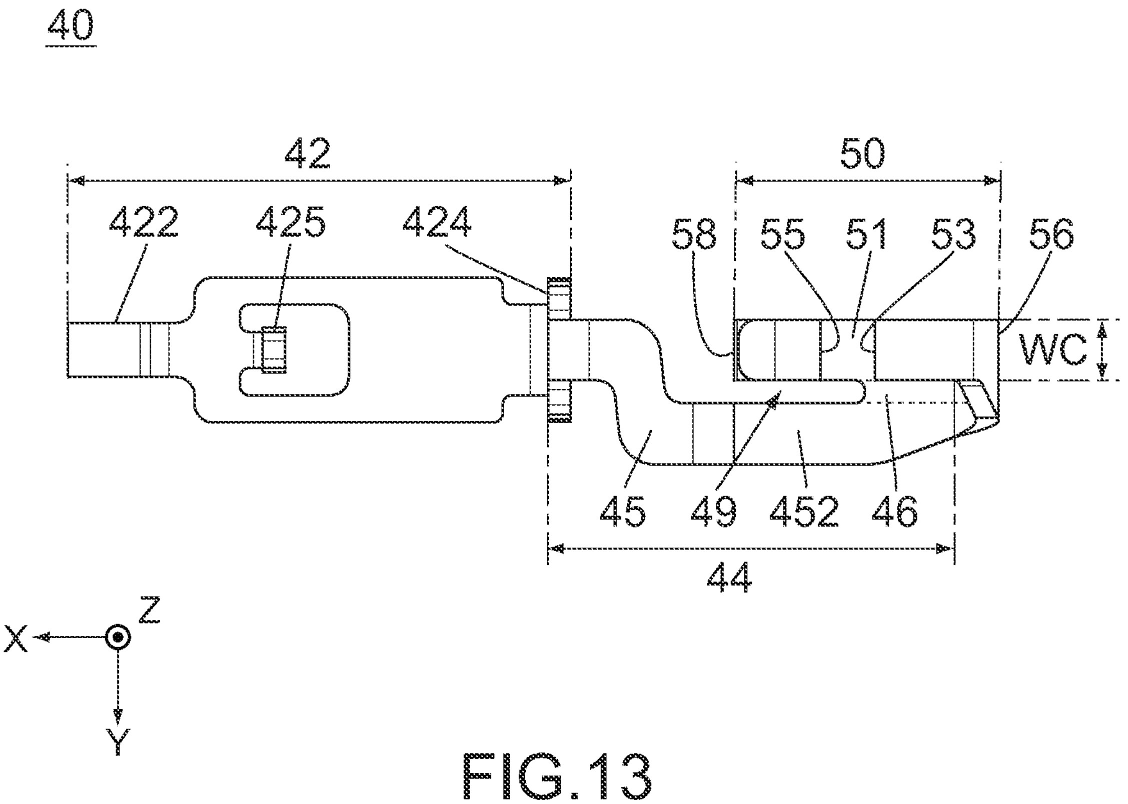
FIG. 13 is a top view showing the terminal of FIG. 11, wherein boundary lines of the coupling portion are illustrated with dashed line.
Figure 14:
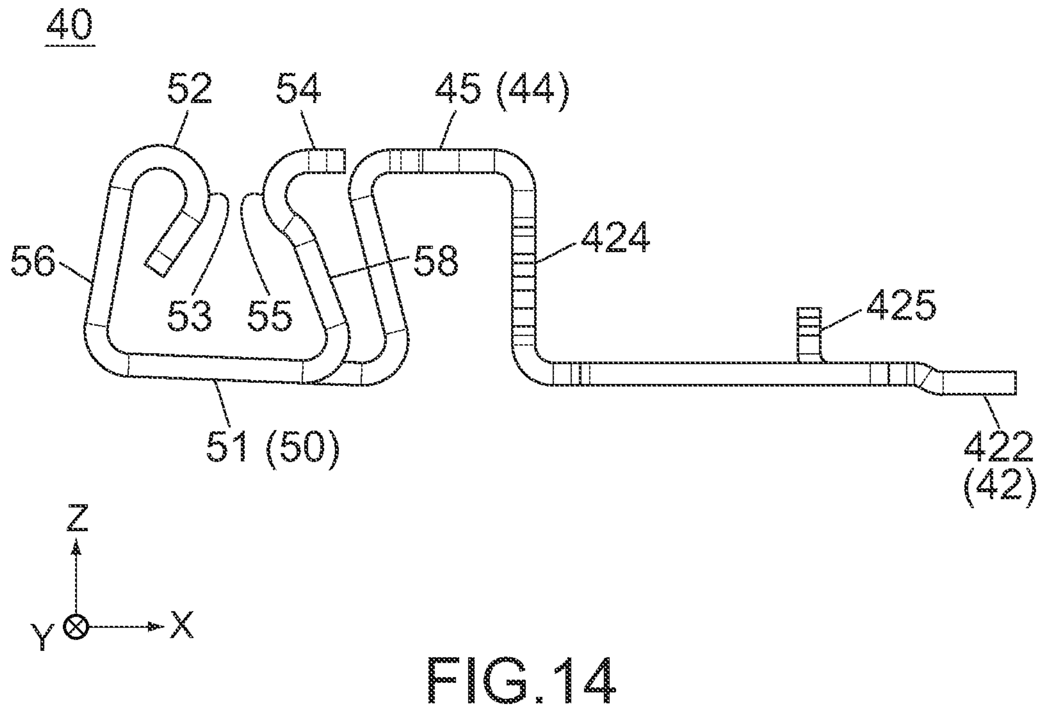
FIG. 14 is a side view showing the terminal of FIG. 11.

Referring to FIG. 14, when the terminal 40 is seen along the second horizontal direction (Y-direction), the contact portion 50 has a U-like shape. When the contact portion 50 is seen along the second horizontal direction, the first contact point 53 and the second contact point 55 are apart from each other and face each other in the first horizontal direction (X-direction). Referring to FIG. 13, the first contact point 53 and the second contact point 55 are located at positions same as each other in the second horizontal direction. The second contact point 55 is located between the first contact point 53 and the held portion 424 in the first horizontal direction. In other words, the first contact point 53 is more apart from the held portions 424 and 425 in the first horizontal direction than the second contact point 55 is.

Referring to FIGS. 11, 12 and 14, each of the first support portion 56 and the second support portion 58 of the present embodiment is resiliently deformable. The first contact point 53 is supported by the first support portion 56. The second contact point 55 is supported by the second support portion 58. The first contact point 53 is movable mainly in the first horizontal direction (X-direction) in accordance with resilient deformation of the first support portion 56. The second contact point 55 is movable mainly in the first horizontal direction in accordance with resilient deformation of the second support portion 58.

The first contact point 53 and the second contact point 55 of the present embodiment are movable independently of each other. In detail, the first support portion 56 is a soft spring and can be resiliently deformed easily regardless of whether the second support portion 58 is resiliently deformed or not. The second support portion 58 is a soft spring and can be resiliently deformed easily regardless of whether the first support portion 56 is resiliently deformed or not. The first contact point 53 is movable in accordance with resilient deformation of the first support portion 56 regardless of whether the second support portion 58 is resiliently deformed or not. The second contact point 55 is movable in accordance with resilient deformation of the second support portion 58 regardless of whether the first support portion 56 is resiliently deformed or not. However, the present invention is not limited thereto. For example, each of the first support portion 56 and the second support portion 58 may be a hard spring which is resiliently deformed hardly.

Referring to FIG. 14 together with FIG. 13, the whole of the contact portion 50 of the present embodiment extends in parallel to the XZ-plane without an inclination in the second horizontal direction and has a constant width WC in the second horizontal direction (Y-direction). Thus, each of the first support portion 56 and the second support portion 58 extends upward from the bottom portion 51 without being inclined in the second horizontal direction while having the constant width WC in the second horizontal direction. Therefore, the first contact point 53 is located at a position same as that of a lower end of the first support portion 56 in the second horizontal direction. The second contact point 55 is located at a position same as that of a lower end of the second support portion 58 in the second horizontal direction. According to the present embodiment, the contact portion 50 having a well-balanced shape can be obtained. However, the present invention is not limited thereto. For example, each of the first support portion 56 and the second support portion 58 may extend upward while being inclined in the second horizontal direction.

The contact portion 50 of the present embodiment is not coated with insulator such as resin. The first contact point 53 and the second contact point 55 are connected to each other through a single conductor without being interrupted by insulator. Thus, the first contact point 53 and the second contact point 55 are electrically connected with each other. The contact portion 50 of the present embodiment can be electrically connected with another conductive member at two contact points, or the first contact point 53 and the second contact point 55. However, the present invention is not limited thereto. For example, the terminal 40 may be partially coated with insulator. One of the first contact point 53 and the second contact point 55 may be a part of insulator which coats the terminal 40.

Referring to FIG. 4, the contact portion 50 is accommodated in the corresponding accommodation portion 34. The contact portion 50 is apart from any part of the housing 20, and the whole contact portion 50 is movable relative to the housing 20. In particular, each of the first support portion 56 and the second support portion 58 is apart from a wall surface of the housing 20 in the first horizontal direction (X-direction) and can be resiliently deformed easily in the accommodation portion 34.

The first contact point 53 and the second contact point 55 are located in the receiving portion 27 under a separated state where the connector 10 is not mated with the mating connector 60. Referring to FIG. 5, the first contact point 53 and the second contact point 55, which are arranged as described above, sandwich and hold the mating contact portion 644 of the corresponding mating terminal 64 in the first horizontal direction (X-direction) under the mated state. Thus, the two contact points of the terminal 40 are brought into contact with opposite sides of one of the mating contact portions 644, respectively, under the mated state. In other words, the mating terminal 64 is sandwiched and held between the first contact point 53 and the second contact point 55 under the mated state. As a result, the terminal 40 is electrically connected with the corresponding mating terminal 64.

The contact portion 50 of the present embodiment has the aforementioned structure and works as described above. However, the present invention is not limited thereto, but the structure of the contact portion 50 can be modified as necessary.

Referring to FIGS. 11 to 14, the arm 44 of the present embodiment is a portion for coupling the leg 42 and the contact portion 50 to each other. The arm 44 couples the held portion 424, which is held to be unmovable relative to the housing 20 (see FIG. 4), and the contact portion 50, which is arranged to be movable relative to the housing 20, to each other. The arm 44 of the present embodiment extends in a meander shape from an upper end of the held portion 424 to an edge of the contact portion 50. At least a part of the thus-formed arm 44 is resiliently deformable. The whole contact portion 50 is movable in accordance with resilient deformation of the arm 44. Thus, the arm 44 supports the contact portion 50 so that the contact portion 50 is movable.

Referring to FIG. 5, the mating terminal 64 applies an insertion force to the first contact point 53 and the second contact point 55 upon mating the mating connector 60 with the connector 10. The insertion force includes a downward force and a force extending along the first horizontal direction (X-direction). The mating terminal 64 applies this insertion force to the contact portion 50 upon mating. The mating connector 60 which is mated with the connector 10 can be removed upward from the connector 10. The mating terminal 64 applies a removal force to the first contact point 53 and the second contact point 55 upon removing the mating connector 60 from the connector 10. The removal force includes an upward force and a force extending along the first horizontal direction. The mating terminal 64 applies this removal force to the contact portion 50 upon removing.

As previously described, the terminal 40 of the present embodiment has the two contact points, or the first contact point 53 and the second contact point 55 provided on the contact portion 50. These two contact points are brought into contact with the mating terminal 64 of the mating connector 60 under the mated state. Under a supposed situation where the first contact point 53 or the second contact point 55 is supported by a hard spring which has a short spring length, each of the insertion force and the removal force tends to be large when the mating contact portion 644 is shifted toward the hard spring in the first horizontal direction (X-direction) because of tolerance, etc. When the insertion force and the removal force are excessively large, the terminal 40 might be plastically deformed. Moreover, a part of the terminal 40 such as the connected portion 422 might be damaged.

In contrast, the contact portion 50 of the present embodiment is supported by the resiliently deformable arm 44 so that the whole contact portion 50 is movable in the accommodation portion 34. In addition, the first contact point 53 is supported by the first support portion 56, and the second contact point 55 is supported by the second support portion 58. According to this structure, each of the first contact point 53 and the second contact point 55 can be supported by a soft spring which has a long spring length, and thereby the insertion force upon mating and the removal force upon removing can be made small. Thus, the present embodiment provides the new connector 10 having a structure which enables the insertion force upon mating and the removal force upon removing to be made small. In addition, the first contact point 53 and the second contact point 55 of the present embodiment can sandwich and hold the mating terminal 64 with contact forces substantially same as each other. Therefore. the first contact point 53 and the second contact point 55 can be stably brought into contact with the mating terminal 64 while a positional displacement of the mating connector 60 relative to the connector 10 is adjusted.

According to the present embodiment, the contact portions 50 of the terminals 40 which are adjacent to each other are movable and resiliently deformable independently of each other with no affection to each other. The first contact point 53 and the second contact point 55 of each of the terminals 40 are provided on the thus-formed contact portion 50 and are independently movable without being affected by a movement of the first contact point 53 and a movement the second contact point 55 of the other terminal 40. Therefore, the first contact point 53 and the second contact point 55 of each of the terminals 40 can be properly brought into contact with the corresponding mating terminal 64.

Referring to FIG. 4, the first projection 52 of the contact portion 50 is covered by the upper wall of the central projecting portion 26 from above except for a part thereof which is located in the vicinity of the first contact point 53. The second projection 54 of the contact portion 50 is covered by the upper wall of the side projecting portion 28 from above except for a part thereof which is located in the vicinity of the second contact point 55. In addition, the connection object 70 restricts a downward movement of the contact portion 50. The first contact point 53 and the second contact point 55 of the thus-arranged contact portion 50 are hardly movable in the upper-lower direction.

The first support portion 56 is apart from a wall surface of the central projecting portion 26 in the first horizontal direction (X-direction), and thereby the first contact point 53 is movable over a wide range in the first horizontal direction. Similarly, the second support portion 58 is apart from a wall surface of the side projecting portion 28 in the first horizontal direction, and thereby the second contact point 55 is movable over a wide range in the first horizontal direction. According to this structure, the insertion force upon mating and the removal force upon removing can be easily made small. Moreover, the arm 44 is apart from the wall surface of the side projecting portion 28 in the first horizontal direction and can be resiliently deformed easily. The contact portion 50 is accommodated in the accommodation portion 34 together with the arm 44, and the whole contact portion 50 is movable. However, the present invention is not limited thereto, but the arrangement of the contact portion 50 and the arm 44 can be modified as necessary.

Referring to FIG. 13, when the terminal 40 of the present embodiment is seen from above along the upper-lower direction, the held portion 424, the first contact point 53 and the second contact point 55 are arranged in a straight line along the first horizontal direction (X-direction). Referring to FIG. 5, according to this arrangement, the mating contact portion 644 of the mating terminal 64 receives a contact force which extends straight along the first horizontal direction, and thereby the mating terminal 64 can be prevented from being moved obliquely to the second horizontal direction (Y-direction).

Referring to FIG. 13, the held portions 424 and 425 are located between the contact portion 50 and the connected portion 422 in the first horizontal direction (X-direction). Referring to FIG. 5, according to this arrangement, the insertion force and the removal force applied to the contact portion 50 are received by the held portions 424 and 425 and are not applied to the connected portion. More specifically, even if each of the insertion force and the removal force is large, damage of the connected portion 422 such as detachment from the connection object 70 can be prevented. However, the present invention is not limited thereto. For example, the connected portion 422 may be located between the contact portion 50 and the held portion 425 in the first horizontal direction.

As shown in FIG. 8, the bottom portion 51 of the contact portion 50 is visible when the connector 10 of the present embodiment is seen from below along the upper-lower direction. Referring to FIG. 4, under the separated state, the bottom portion 51 is located over the connection object 70 and is slightly apart from the connection object 70.

Referring to FIG. 5, upon mating the mating connector 60 with the connector 10, the contact portion 50 receives a downward force from the mating terminal 64, and thereby the bottom portion 51 is moved downward. The bottom portion 51 which has been moved downward is brought into abutment with the connection object 70 so that the posture of the contact portion 50 becomes stable. As a result, each of the first contact point 53 and the second contact point 55 is brought into contact with the mating terminal 64 at the designed position with the designed contact force. Since the bottom portion 51 of the present embodiment has a flat shape in parallel to the XY-plane, the posture of the contact portion 50 can be easily made stable. However, the present invention is not limited thereto. For example, the shape of the bottom portion 51 can be modified as necessary.

Referring to FIGS. 11 to 13, the terminal 40 of the present embodiment is formed with a gap 49. The arm 44 and the contact portion 50 are partially arranged in the second horizontal direction (Y-direction). The gap 49 of the present embodiment is located between the arm 44 and the contact portion 50 in the second horizontal direction and extends along the first horizontal direction (X-direction). Thus, a part of the arm 44 and a part of the contact portion 50 extend along the first horizontal direction in parallel to each other while the gap 49 is located therebetween in the second horizontal direction. According to this structure, the spring length of the arm 44 can be made large while the size of the whole terminal 40 in the first horizontal direction is not made large. However, the present invention is not limited thereto, but the gap 49 may be formed as necessary.

In detail, the arm 44 of the present embodiment has a base portion 452. The base portion 452 is located at a lower end of the arm 44 and has a flat-plate shape which extends along the XY-plane. The base portion 452 and the bottom portion 51 of the contact portion 50 extend along the first horizontal direction (X-direction) in parallel to each other while the gap 49 is partially located therebetween in the second horizontal direction.

The arm 44 of the present embodiment is connected to an edge of the contact portion 50 in the second horizontal direction (Y-direction). This edge of the contact portion 50 defines a boundary between the arm 44 and the contact portion 50 in the second horizontal direction. The thus-defined boundary extends from the bottom portion 51 to the first support portion 56 along the XZ-plane. Thus, the arm 44 of the present embodiment is connected to the bottom portion 51 and the first support portion 56. However, the present invention is not limited thereto. For example, the gap 49 may extend along the whole side of the bottom portion 51. In this instance, the arm 44 is connected only to the first support portion 56. Instead, the gap 49 may extend along a side of the bottom portion 51 and extend along the whole side of the first support portion 56 (see the modification illustrated in chain dotted lines of FIG. 11). The modification illustrated in chain dotted lines of FIG. 11 may be further modified to the modification illustrated in two-dot chain line of FIG. 11. In this instance, the arm 44 is connected only to the bottom portion 51. Thus, the arm 44 may be connected at least one of the bottom portion 51 and the first support portion 56.

Referring to FIGS. 11 and 12, according to the present embodiment, a part of the arm 44 is located below the second contact point 55 and is connected to the contact portion 50. However, the present invention is not limited thereto. For example, a structure for connecting the arm 44 and the contact portion 50 to each other can be modified as necessary. For example, the whole arm 44 may be located above the second contact point 55 and may be connected to the first support portion 56 of the contact portion 50. Instead, similarly to the present embodiment, at least a part of the arm 44 may be located below the second contact point 55 and may be connected to the contact portion 50.

Referring to FIGS. 11 to 13, the arm 44 has a main portion 45 and a coupling portion 46. The coupling portion 46 is a part of the arm 44 which is located in the vicinity of the boundary between the arm 44 and the contact portion 50. The main portion 45 is another part of the arm 44 which extends from the upper end of the held portion 424 to the coupling portion 46. As can be seen from this structure, at least a part of the main portion 45 is resiliently deformable. The coupling portion 46 which is defined as described above couples the main portion 45 and the contact portion 50 to each other in the second horizontal direction (Y-direction).

The illustrated coupling portion 46 has a size same as that of the gap 49 in the second horizontal direction (Y-direction) and extends along the boundary formed between the arm 44 and the contact portion 50. However, the present invention is not limited thereto. The position and the shape of the coupling portion 46 can be variously defined based on consideration about a position of the boundary between the arm 44 and the contact portion 50. In the present embodiment, the position of the boundary between the arm 44 and the contact portion 50 is defined based on consideration that the bottom portion 51 of the contact portion 50 has the constant width WC in the second horizontal direction. In each modification of the terminal 40 described later, the position of the boundary will be similarly defined. However, the position of the boundary may be defined based on consideration different from the aforementioned consideration. Moreover, even when the position of the boundary is defined based on the aforementioned consideration, the shape of the coupling portion 46 is not specifically limited, provided that the coupling portion 46 extends along the whole boundary between the arm 44 and the contact portion 50.

The arm 44 of the present embodiment has the aforementioned structure and works as described above. However, the present invention is not limited thereto, but the structure of the arm 44 can be modified as necessary. Hereafter, explanation will be made about various modifications of the terminal 40 each of which has a modification of the arm 44. The explanation will be mainly made about a structure different from that of the terminal 40.

Referring to FIG. 4, each modification of the terminal 40 described below is held by the housing 20 or a modification of the housing 20. Each modification of the housing 20 has a structure substantially same as that of the housing 20 even when a size or an arrangement of each portion thereof is slightly different from that of the housing 20. Thus, the explanation about each portion of the modification of the housing 20 is same as the explanation about each portion of the housing 20. Hereafter, explanation will not be made about the modification of the housing 20 unless specifically required. The explanation described below will be made while referring to the portion of the housing 20 as necessary.

Comparing FIGS. 15 to 18 with FIGS. 11 to 14, a terminal 40A of a first modification has a size in the first horizontal direction (X-direction) larger than another size of the terminal 40 in the first horizontal direction. However, the terminal 40A has a basic structure same as that of the terminal 40 and works similarly to the terminal 40. For example, the terminal 40A is formed by bending a single metal plate. In other words, the terminal 40A is a single metal plate with bends. The terminal 40A has a leg 42A, an arm 44A and a contact portion 50A. The leg 42A, the arm 44A and the contact portion 50A are, on the whole, arranged in this order in the first horizontal direction (X-direction). The arm 44A couples the leg 42A and the contact portion 50A to each other.

As shown in FIGS. 15 to 18, the leg 42A of the present modification has a connected portion 422A, a held portion 424A and a held portion 425A. Thus, the terminal 40A has the connected portion 422A, the held portion 424A and the held portion 425A. The most part of the leg 42A other than the connected portion 422A and the held portions 424A and 425A, has a flat-plate shape which extends along the XY-plane. The flat-plate shaped portion of the leg 42A extends from the connected portion 422A along the first horizontal direction (X-direction) and then protrudes in the second horizontal direction (Y-direction). Then, the flat-plate shaped portion of the leg 42A extends straight along the first horizontal direction. This structure allows the size of the space formed between the contact portion 50A and the leg 42A in the first horizontal direction to be made large and provides more flexibility in the shape of the contact portion 50A when the contact portion 50A is formed by bending a metal plate.

The leg 42A has a structure similar to that of the leg 42 except for the aforementioned differences and can be modified similarly to the leg 42. For example, the connected portion 422A and the held portion 424A are located at opposite ends of the leg 42A in the first horizontal direction (X-direction), respectively. The held portions 424A and 425A are located between the contact portion 50A and the connected portion 422A in the first horizontal direction. Referring to FIG. 4 together with FIG. 15, the held portion 425A is formed with a press-fit projection (bulge) which projects in the first horizontal direction. The held portions 424A and 425A are press-fit into and held by the holding portions 32 and 33 of the housing 20, respectively. The connected portion 422A is connected to the connection object 70 when the connector 10 is attached to the connection object 70.

Figure 15:
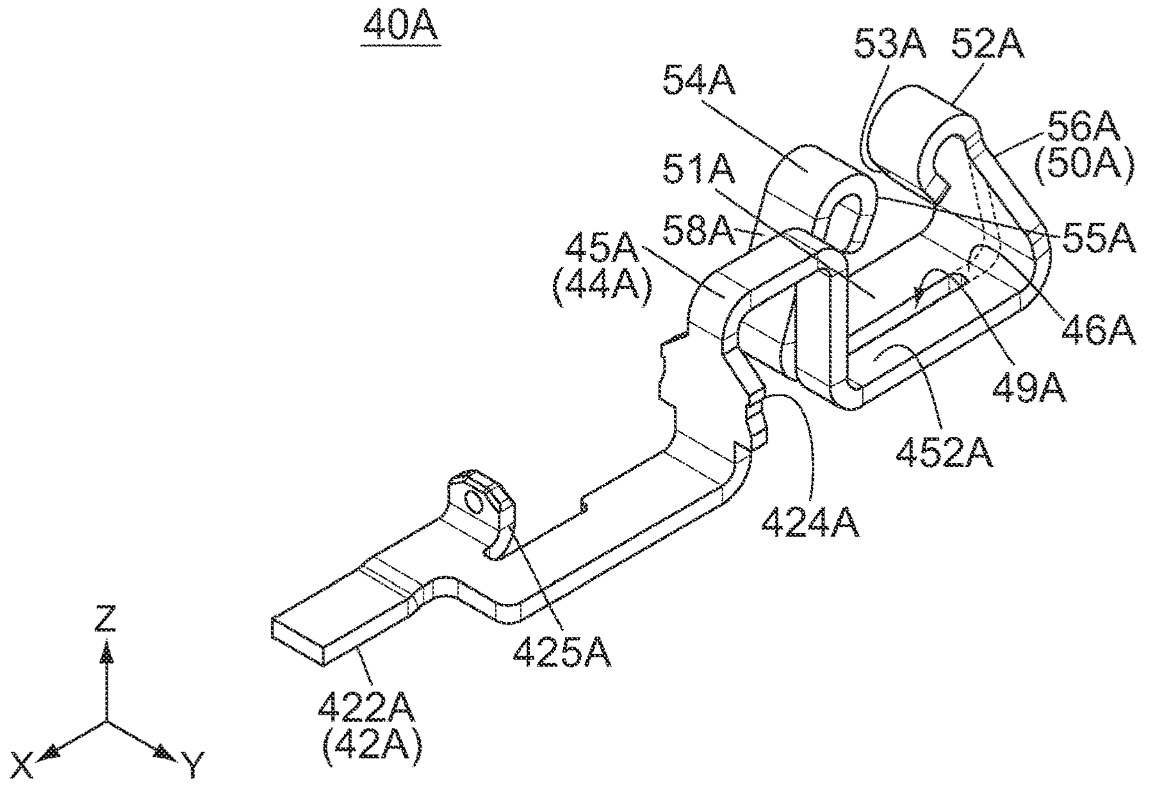
FIG. 15 is a perspective view showing a first modification of the terminal of FIG. 11, wherein boundary lines of a coupling portion are illustrated with dashed line.
Figure 16:
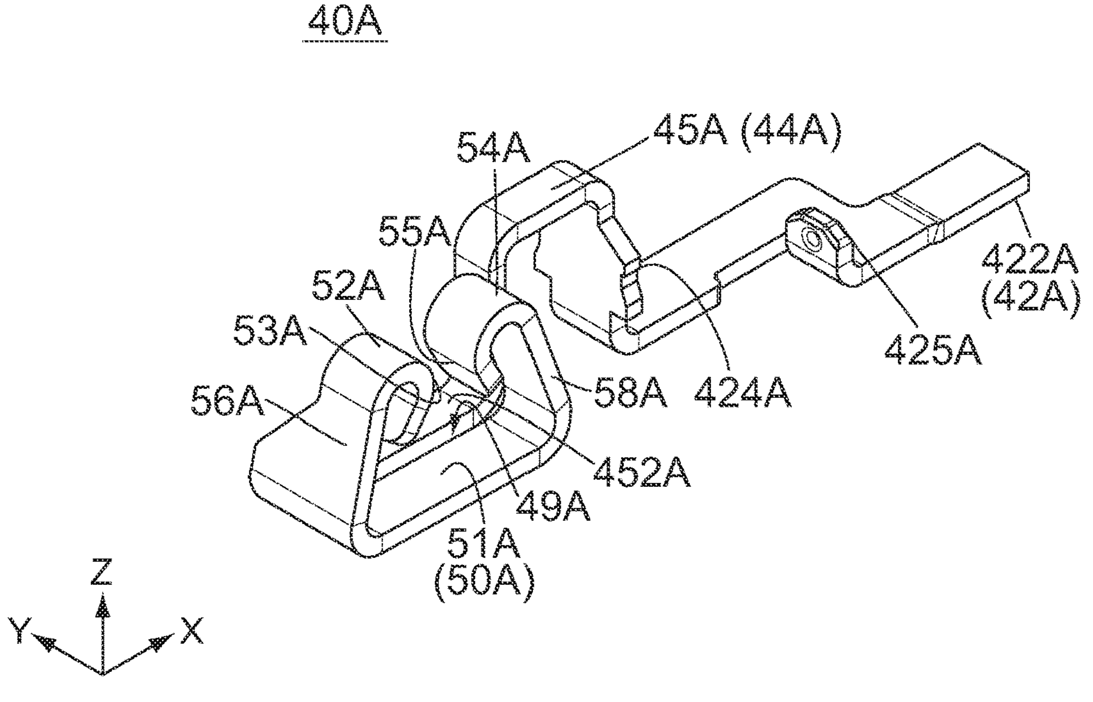
FIG. 16 is another perspective view showing the terminal of FIG. 15.

As shown in FIGS. 15 and 16, the contact portion 50A of the present modification has a bottom portion 51A, a first support portion 56A, a second support portion 58A, a first contact point 53A and a second contact point 55A. The bottom portion 51A has a flat-plate shape which extends along the XY-plane. The bottom portion 51A is located at a lower end of the contact portion 50A and extends straight along the first horizontal direction (X-direction). The first support portion 56A and the second support portion 58A are connected to opposite ends of the bottom portion 51A in the first horizontal direction, respectively. Each of the first support portion 56A and the second support portion 58A extends upward from the bottom portion 51A.

The first support portion 56A has a first projection 52A. The first projection 52A is an upper end part of the first support portion 56A. The first projection 52A projects in an arc and toward the second support portion 58A and then extends downward. The first contact point 53A is a part of the first projection 52A which is close to the second support portion 58A. The second support portion 58A has a second projection 54A. The second projection 54A is an upper end part of the second support portion 58A. The second projection 54A projects in an arc and toward the first support portion 56A and then extends downward. The second contact point 55A is a part of the second projection 54A which is close to the first support portion 56A.

According to the present modification, the second projection 54A can be formed in a shape similar to that of the first projection 52A, and thereby the spring length of the second support portion 58A can be made longer. In other word, a softer spring can be obtained by the second support portion 58A of the present modification.

Figure 17:
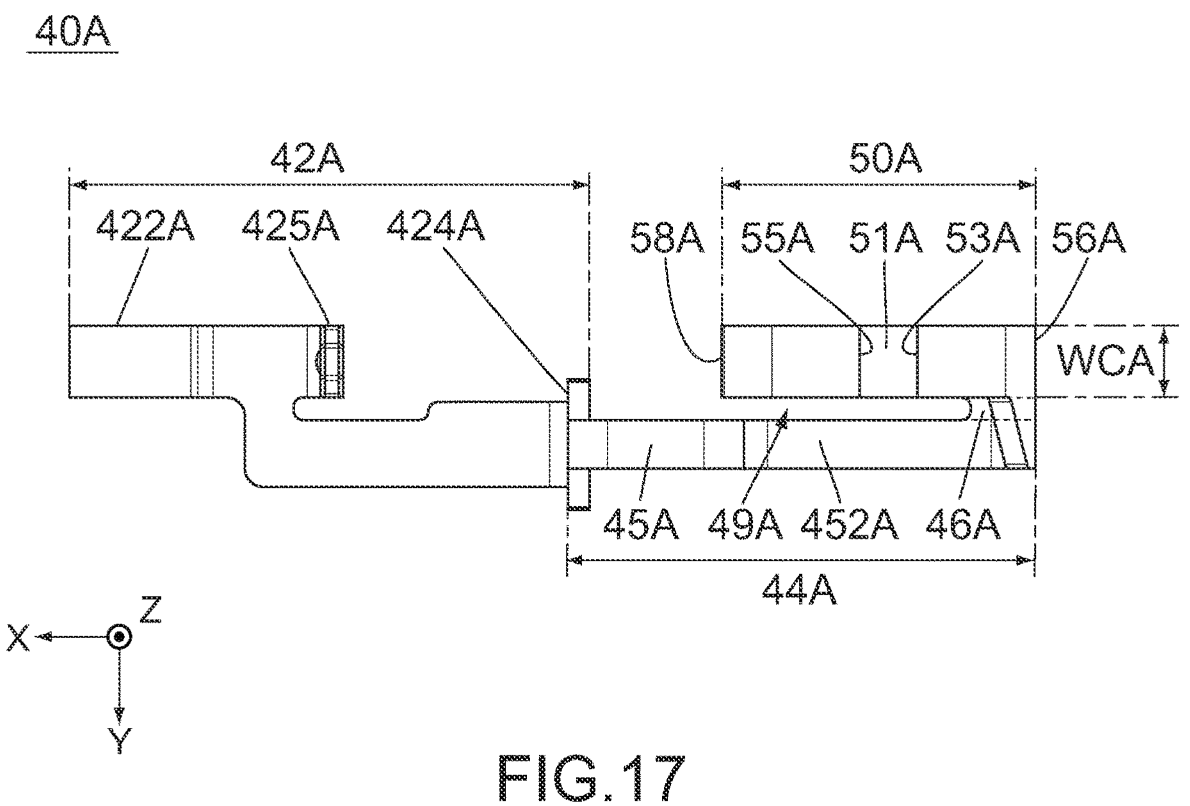
FIG. 17 is a top view showing the terminal of FIG. 15, wherein boundary lines of the coupling portion are illustrated with dashed line.
Figure 18:
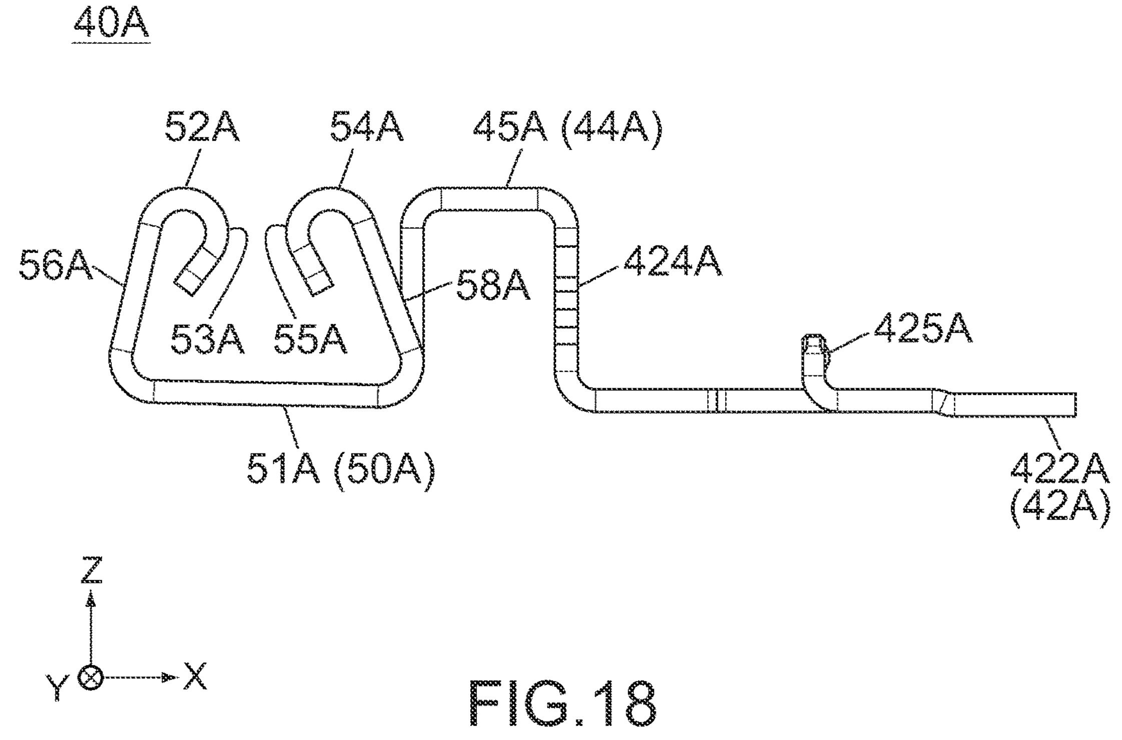
FIG. 18 is a side view showing the terminal of FIG. 15.

Comparing FIG. 18 with FIG. 14, the contact portion 50A has a structure similar to that of the contact portion 50 except for the aforementioned differences and can be modified similarly to the contact portion 50. For example, when the contact portion 50A is seen along the second horizontal direction (Y-direction), the first contact point 53A and the second contact point 55A are apart from each other and face each other in the first horizontal direction (X-direction). Referring to FIG. 17, the first contact point 53A and the second contact point 55A are located at positions same as each other in the second horizontal direction. The second contact point 55A is located between the first contact point 53A and the held portion 424A in the first horizontal direction. Referring to FIG. 18, the first contact point 53A is supported by the first support portion 56A. The second contact point 55A is supported by the second support portion 58A. Each of the first support portion 56A and the second support portion 58A is resiliently deformable. The first contact point 53A and the second contact point 55A are movable independently of each other.

Referring to FIG. 18 together with FIG. 17, the whole of the contact portion 50A extends in parallel to the XZ-plane without an inclination in the second horizontal direction and has a constant width WCA in the second horizontal direction (Y-direction). Thus, each of the first support portion 56A and the second support portion 58A extends upward from the bottom portion 51A without being inclined in the second horizontal direction while having the constant width WCA in the second horizontal direction. Therefore, the first contact point 53A is located at a position same as that of a lower end of the first support portion 56A in the second horizontal direction. The second contact point 55A is located at a position same as that of a lower end of the second support portion 58A in the second horizontal direction. The first contact point 53A and the second contact point 55A are electrically connected with each other.

Referring to FIG. 4 together with FIG. 15, the contact portion 50A is accommodated in the accommodation portion 34 of the housing 20 similarly to the contact portion 50, and the whole contact portion 50A is movable relative to the housing 20. Referring to FIG. 5 together with FIG. 15, the mating terminal 64 is sandwiched and held between the first contact point 53A and the second contact point 55A under the mated state. As a result, the two contact points, or the first contact point 53A and the second contact point 55A, of the terminal 40A are electrically connected with the corresponding mating terminal 64.

Referring to FIGS. 15 to 18 together with FIG. 11, the arm 44A of the present modification has a structure similar to that of the arm 44 and can be modified similarly to the arm 44. For example, at least a part of the arm 44A is resiliently deformable. The arm 44A couples the held portion 424A and the contact portion 50A to each other and supports the contact portion 50A so that the contact portion 50A is movable. The present modification provides the new connector 10 (see FIG. 5) having: the contact portion 50A which can be stably brought into contact with the mating terminal 64 (see FIG. 5); and a structure which enables the insertion force upon mating and the removal force upon removing to be made small.

Referring to FIG. 8 together with FIG. 15, the bottom portion 51A of the contact portion 50A is visible when the connector 10 is seen from below along the upper-lower direction. Referring to FIG. 4 together with FIG. 15, under the separated state, the bottom portion 51A is located over the connection object 70 and is slightly apart from the connection object 70. Referring to FIG. 5 together with FIG. 15, upon mating the mating connector 60 with the connector 10, the bottom portion 51A which has been moved downward is brought into abutment with the connection object 70 so that the posture of the contact portion 50A becomes stable. Since the bottom portion 51A has a flat shape in parallel to the XY-plane, the posture of the contact portion 50A can be easily made stable.

As shown in FIGS. 15 to 17, the terminal 40A is formed with a gap 49A. The arm 44A and the contact portion 50A are partially arranged in the second horizontal direction (Y-direction). The gap 49A is located between the arm 44A and the contact portion 50A in the second horizontal direction and extends along the first horizontal direction (X-direction). In detail, the arm 44A has a base portion 452A. The base portion 452A is located at a lower end of the arm 44A and has a flat-plate shape which extends along the XY-plane. The base portion 452A and the bottom portion 51A of the contact portion 50A extend along the first horizontal direction in parallel to each other while the gap 49A is partially located therebetween in the second horizontal direction.

The arm 44A is connected to an edge of the contact portion 50A in the second horizontal direction (Y-direction). This edge of the contact portion 50A defines a boundary between the arm 44A and the contact portion 50A in the second horizontal direction. The thus-defined boundary extends from the bottom portion 51A to the first support portion 56A along the XZ-plane. Thus, the arm 44A of the present modification is connected to the bottom portion 51A and the first support portion 56A. However, the arm 44A may be connected to at least one of the bottom portion 51A and the first support portion 56A.

Referring to FIGS. 15 and 16, at least a part of the arm 44A is located below the second contact point 55A and is connected to the contact portion 50A. Referring to FIGS. 15 to 17, the arm 44A has a main portion 45A and a coupling portion 46A. The coupling portion 46A is a part of the arm 44A which is located in the vicinity of the boundary between the arm 44A and the contact portion 50A. The main portion 45A is another part of the arm 44A which extends from an upper end of the held portion 424A to the coupling portion 46A. As can be seen from this structure, at least a part of the main portion 45A is resiliently deformable. The coupling portion 46A which is defined as described above couples the main portion 45A and the contact portion 50A to each other in the second horizontal direction (Y-direction).

Comparing FIGS. 19 to 22 with FIGS. 11 to 14, a terminal 40B of a second modification has a basic structure same as that of the terminal 40 and works similarly to the terminal 40. For example, the terminal 40B is formed by bending a single metal plate. In other words, the terminal 40B is a single metal plate with bends. The terminal 40B has a leg 42B, an arm 44B and a contact portion 50B. The leg 42B, the arm 44B and the contact portion 50B are, on the whole, arranged in this order in the first horizontal direction (X-direction). The arm 44B couples the leg 42B and the contact portion 50B to each other.

The leg 42B has a size in the first horizontal direction (X-direction) smaller than another size of the leg 42 in the first horizontal direction. In addition, the leg 42B has a size in the upper-lower direction smaller than another size of the leg 42 in the upper-lower direction. The leg 42B has a structure same as that of the leg 42 except for these differences and can be modified similarly to the leg 42.

Comparing FIGS. 19 to 22 with FIGS. 11 to 14, the leg 42B of the present modification has portions same as those of the leg 42. More specifically, the leg 42B has the connected portion 422, the held portion 424 and the held portion 425. Thus, the terminal 40B has the connected portion 422, the held portion 424 and the held portion 425. Referring to FIGS. 19 to 22, the held portions 424 and 425 are located between the contact portion 50B and the connected portion 422 in the first horizontal direction (X-direction). Referring to FIG. 4 together with FIG. 19, the held portions 424 and 425 of the terminal 40B are press-fit into and held by the holding portions 32 and 33 of the housing 20, respectively. the connected portion 422 of the terminal 40B is connected to the connection object 70 when the connector 10 is attached to the connection object 70.

Figure 19:
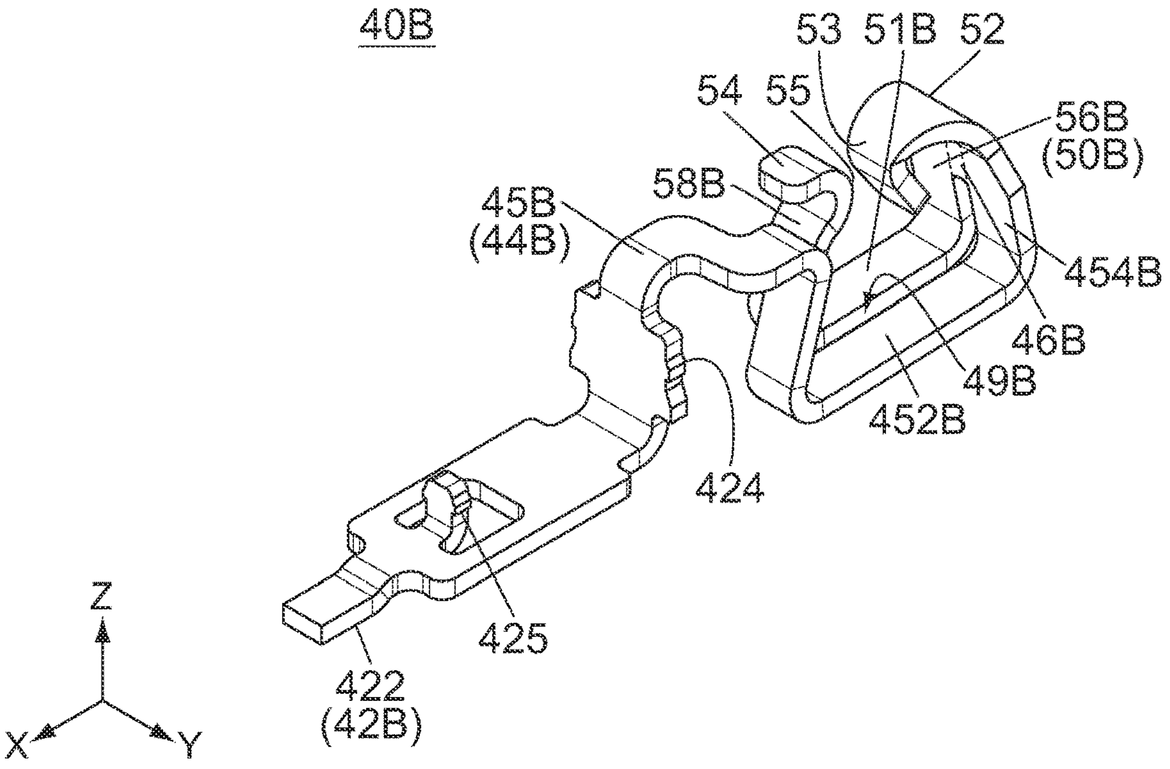
FIG. 19 is a perspective view showing a second modification of the terminal of FIG. 11, wherein boundary lines of a coupling portion are illustrated with dashed line.
Figure 20:
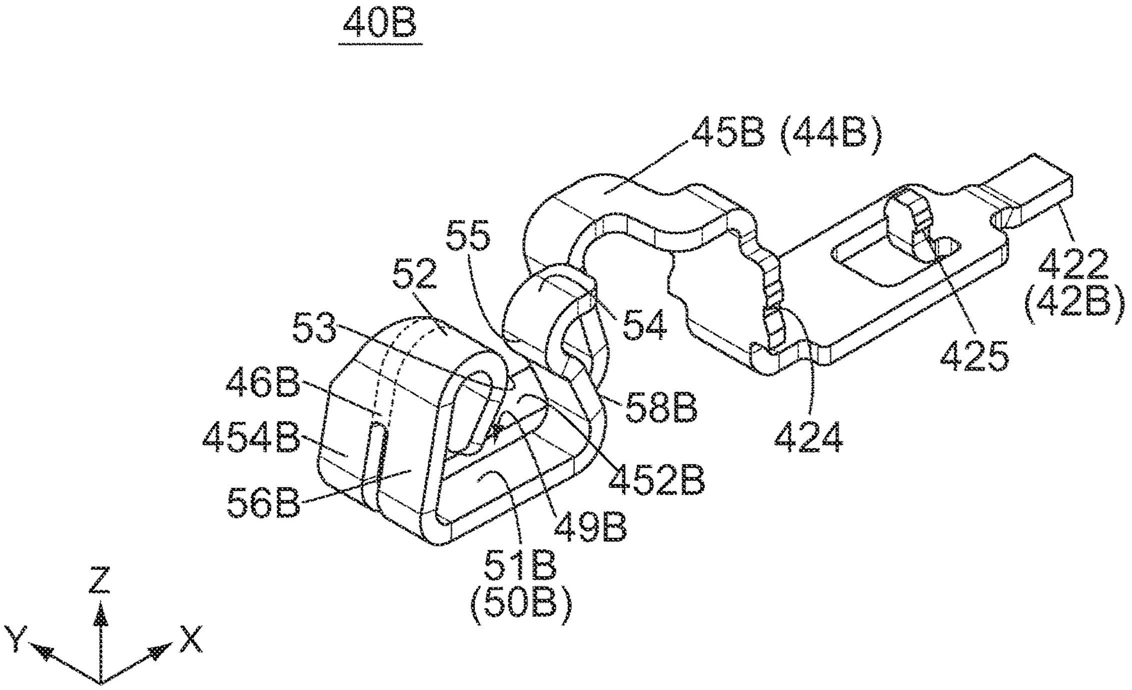
FIG. 20 is another perspective view showing the terminal of FIG. 19, wherein boundary lines of the coupling portion are illustrated with dashed line.

Comparing FIGS. 19 and 20 with FIGS. 11 and 12, the contact portion 50B of the present modification has a bottom portion 51B, a first support portion 56B, a second support portion 58B, the first contact point 53 same as that of the contact portion 50 and the second contact point 55 same as that of the contact portion 50. The bottom portion 51B has a flat-plate shape which extends along the XY-plane. The bottom portion 51B is located at a lower end of the contact portion 50B and extends straight along the first horizontal direction (X-direction). The first support portion 56B and the second support portion 58B are connected to opposite ends of the bottom portion 51B in the first horizontal direction, respectively. Each of the first support portion 56B and the second support portion 58B extends upward from the bottom portion 51B.

The first support portion 56B has the first projection 52 same as that of the contact portion 50. The first projection 52 is an upper end part of the first support portion 56B. The first projection 52 projects in an arc and toward the second support portion 58B and then extends downward. The first contact point 53 is a part of the first projection 52 which is close to the second support portion 58B. The second support portion 58B has the second projection 54 same as that of the contact portion 50. The second projection 54 is an upper end part of the second support portion 58B. The second projection 54 projects in an arc and toward the first support portion 56B and then extends along the first horizontal direction (X-direction) so as to be away from the first support portion 56B. The second contact point 55 is a part of the second projection 54 which is close to the first support portion 56B.

Figure 21:
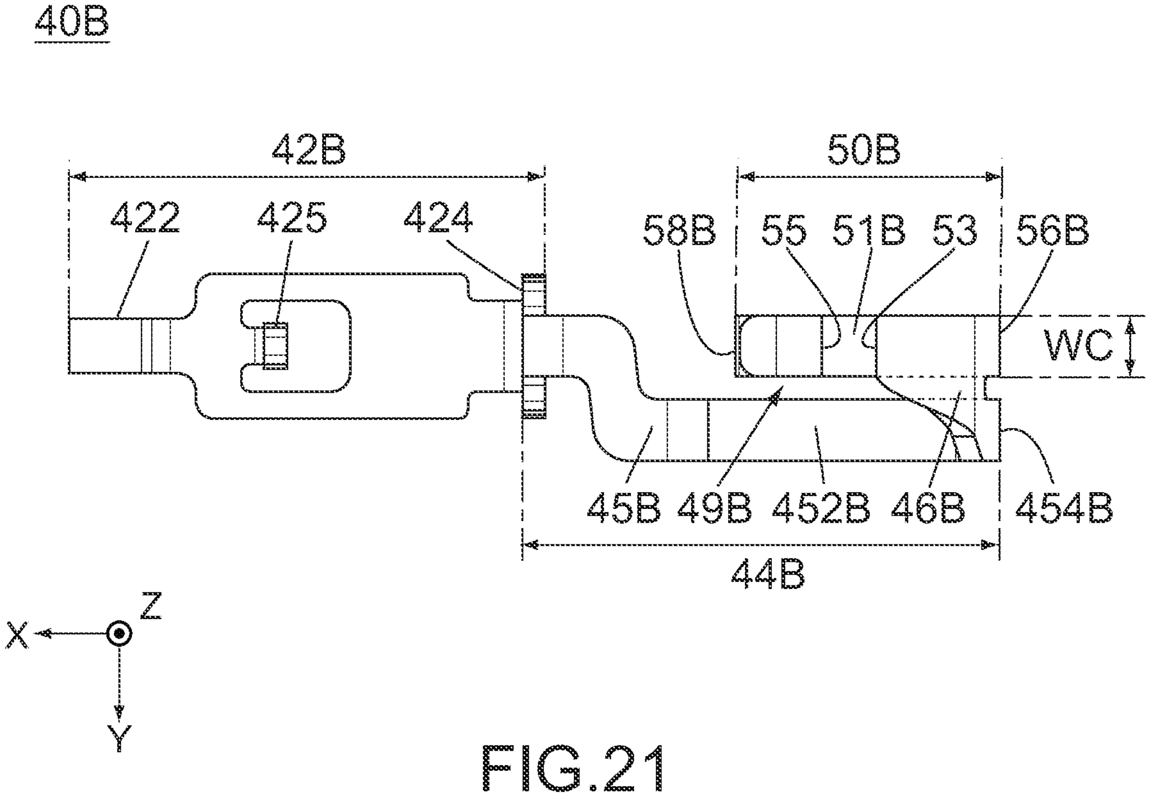
FIG. 21 is a top view showing the terminal of FIG. 19, wherein boundary lines of the coupling portion are illustrated with dashed line.
Figure 22:
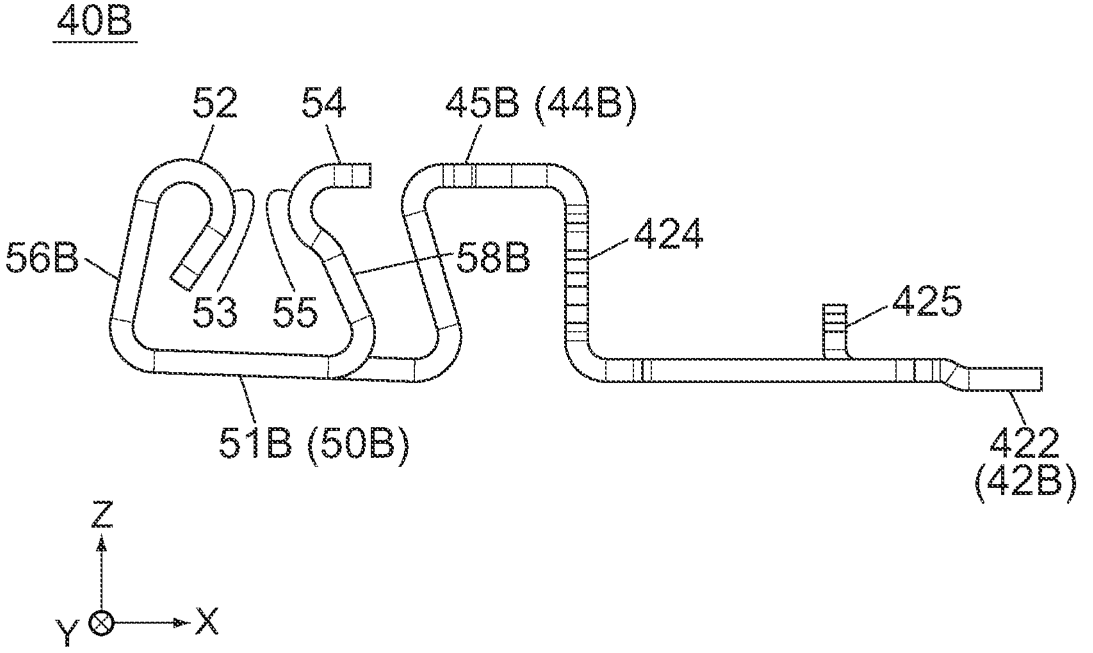
FIG. 22 is a side view showing the terminal of FIG. 19.

Comparing FIGS. 21 and 22 with FIGS. 13 and 14, the terminal 40B has a size (length) in the first horizontal direction (X-direction) same as another size (length) of the terminal 40 in the first horizontal direction. In particular, the contact portion 50B has a length same as another length of the contact portion 50. On the other hand, the arm 44B has a length longer than another length of the arm 44. Moreover, the terminal 40B has a size in the upper-lower direction smaller than another size of the terminal 40 in the upper-lower direction. According to the aforementioned structure, the spring length of each of the first support portion 56B and the second support portion 58B is made short while the spring length of the arm 44B is made long. Therefore, the first contact point 53 and the second contact point 55 can be supported by a soft spring similarly to the contact portion 50. However, the connector 10 (see FIG. 4) can be reduced in height.

Comparing FIG. 22 with FIG. 14, the contact portion 50B has a structure similar to that of the contact portion 50 and can be modified similarly to the contact portion 50. For example, when the contact portion 50B is seen along the second horizontal direction (Y-direction), the first contact point 53 and the second contact point 55 are apart from each other and face each other in the first horizontal direction (X-direction). Referring to FIG. 21, the first contact point 53 and the second contact point 55 are located at positions same as each other in the second horizontal direction. The second contact point 55 is located between the first contact point 53 and the held portion 424 in the first horizontal direction.

Referring to FIG. 22, the first contact point 53 is supported by the first support portion 56B. The second contact point 55 is supported by the second support portion 58B. Each of the first support portion 56B and the second support portion 58B is resiliently deformable. The first contact point 53 and the second contact point 55 are movable independently of each other. Referring to FIG. 21, when the terminal 40B of the present modification is seen from above along the upper-lower direction, the held portion 424, the first contact point 53 and the second contact point 55 are arranged in a straight line along the first horizontal direction (X-direction).

Referring to FIG. 22 together with FIG. 21, the whole of the contact portion 50B extends in parallel to the XZ-plane without an inclination in the second horizontal direction and has the constant width WC same as that of the contact portion 50 (see FIG. 13) in the second horizontal direction (Y-direction). Thus, each of the first support portion 56B and the second support portion 58B extends upward from the bottom portion 51B without being inclined in the second horizontal direction while having the constant width WC in the second horizontal direction. Therefore, the first contact point 53 is located at a position same as that of a lower end of the first support portion 56B in the second horizontal direction. The second contact point 55 is located at a position same as that of a lower end of the second support portion 58B in the second horizontal direction. The first contact point 53 and the second contact point 55 are electrically connected with each other.

Referring to FIG. 4 together with FIG. 19, the contact portion 50B is accommodated in the accommodation portion 34 of the housing 20 similarly to the contact portion 50, and the whole contact portion 50B is movable relative to the housing 20. Referring to FIG. 5 together with FIG. 19, the mating terminal 64 is sandwiched and held between the first contact point 53 and the second contact point 55 under the mated state. As a result, the two contact points, or the first contact point 53 and the second contact point 55, of the terminal 40B are electrically connected with the corresponding mating terminal 64.

Referring to FIGS. 19 to 22 together with FIG. 11, the arm 44B of the present modification has a structure similar to that of the arm 44 and can be modified similarly to the arm 44. For example, at least a part of the arm 44B is resiliently deformable. The arm 44B couples the held portion 424 and the contact portion 50B to each other and supports the contact portion 50B so that the contact portion 50B is movable. The present modification provides the new connector 10 (see FIG. 5) having: the contact portion 50B which can be stably brought into contact with the mating terminal 64 (see FIG. 5); and a structure which enables the insertion force upon mating and the removal force upon removing to be made small.

Referring to FIG. 8 together with FIG. 19, the bottom portion 51B of the contact portion 50B is visible when the connector 10 is seen from below along the upper-lower direction. Referring to FIG. 4 together with FIG. 19, under the separated state, the bottom portion 51B is located over the connection object 70 and is slightly apart from the connection object 70. Referring to FIG. 5 together with FIG. 19, upon mating the mating connector 60 with the connector 10, the bottom portion 51B which has been moved downward is brought into abutment with the connection object 70 so that the posture of the contact portion 50B becomes stable. Since the bottom portion 51B has a flat shape in parallel to the XY-plane, the posture of the contact portion 50B can be easily made stable.

As shown in FIGS. 19 to 21, the terminal 40B is formed with a gap 49B. The arm 44B and the contact portion 50B are partially arranged in the second horizontal direction (Y-direction). The gap 49B is located between the arm 44B and the contact portion 50B in the second horizontal direction. The gap 49B extends along the whole side of the bottom portion 51B of the contact portion 50B in the first horizontal direction (X-direction) and then extends upward.

The arm 44B is connected to an edge of the first support portion 56B of the contact portion 50B in the second horizontal direction (Y-direction). This edge of the first support portion 56B defines a boundary between the arm 44B and the contact portion 50B in the second horizontal direction. The thus-defined boundary extends along the XZ-plane. Thus, the arm 44B is connected to at least one of the bottom portion 51B and the first support portion 56B. In particular, the arm 44B of the present modification is connected only to the first support portion 56B.

In detail, the arm 44B has a base portion 452B and a standing portion 454B. The base portion 452B is located at a lower end of the arm 44B and has a flat-plate shape which extends along the XY-plane. The base portion 452B is completely separated from the bottom portion 51B of the contact portion 50B by the gap 49B. The base portion 452B extends straight along the first horizontal direction (X-direction) in parallel to the bottom portion 51B. The standing portion 454B extends upward from an end of the base portion 452B in the first horizontal direction. The standing portion 454B extends in parallel to the first support portion 56B while the gap 49B is located between the standing portion 454B and the first support portion 56B. Then, the standing portion 454B is connected to the first support portion 56B.

Referring to FIG. 22, when the terminal 40B is seen along the second horizontal direction (Y-direction), the standing portion 454B overlaps with the first support portion 56B. More specifically, when the terminal 40B is seen along the second horizontal direction, the whole standing portion 454B of the present modification is located in the first support portion 56B in the XZ-plane. Therefore, when the terminal 40B is seen along the second horizontal direction from a side on which the first support portion 56B is located, the standing portion 454B is wholly hidden behind the first support portion 56B to be invisible. However, the present invention is not limited thereto, but the arrangement of the standing portion 454B can be modified as necessary.

Referring to FIGS. 19 and 20, at least a part of the arm 44B is located below the second contact point 55 and is connected to the contact portion 50B. Referring to FIGS. 19 to 21, the arm 44B has a main portion 45B and a coupling portion 46B. The coupling portion 46B is a part of the arm 44B which is located in the vicinity of the boundary between the arm 44B and the first support portion 56B of the contact portion 50B. The main portion 45B is another part of the arm 44B which extends from an upper end of the held portion 424 to the coupling portion 46B. As can be seen from this structure, at least a part of the main portion 45B is resiliently deformable. The coupling portion 46B which is defined as described above couples the main portion 45B and the contact portion 50B to each other in the second horizontal direction (Y-direction).

Comparing FIGS. 23 to 26 with FIGS. 19 to 22, a terminal 40C of a third modification has a basic structure same as that of the terminal 40B and works similarly to the terminal 40B. For example, the terminal 40C is formed by bending a single metal plate. In other words, the terminal 40C is a single metal plate with bends. The terminal 40C has the leg 42B same as that of the terminal 40B, an arm 44C different from the arm 44B and a contact portion 50C different from the contact portion 50B. The leg 42B, the arm 44C and the contact portion 50C are, on the whole, arranged in this order in the first horizontal direction (X-direction). The arm 44C couples the leg 42B and the contact portion 50C to each other.

As shown in FIGS. 23 to 26, the leg 42B of the terminal 40C has the connected portion 422, the held portion 424 and the held portion 425. Thus, the terminal 40C has the connected portion 422, the held portion 424 and the held portion 425. The held portions 424 and 425 are located between the contact portion 50C and the connected portion 422 in the first horizontal direction (X-direction). Referring to FIG. 4 together with FIG. 23, the held portions 424 and 425 of the terminal 40C are press-fit into and held by the holding portions 32 and 33 of the housing 20, respectively. The connected portion 422 of the terminal 40C is connected to the connection object 70 when the connector 10 is attached to the connection object 70.

Figure 23:
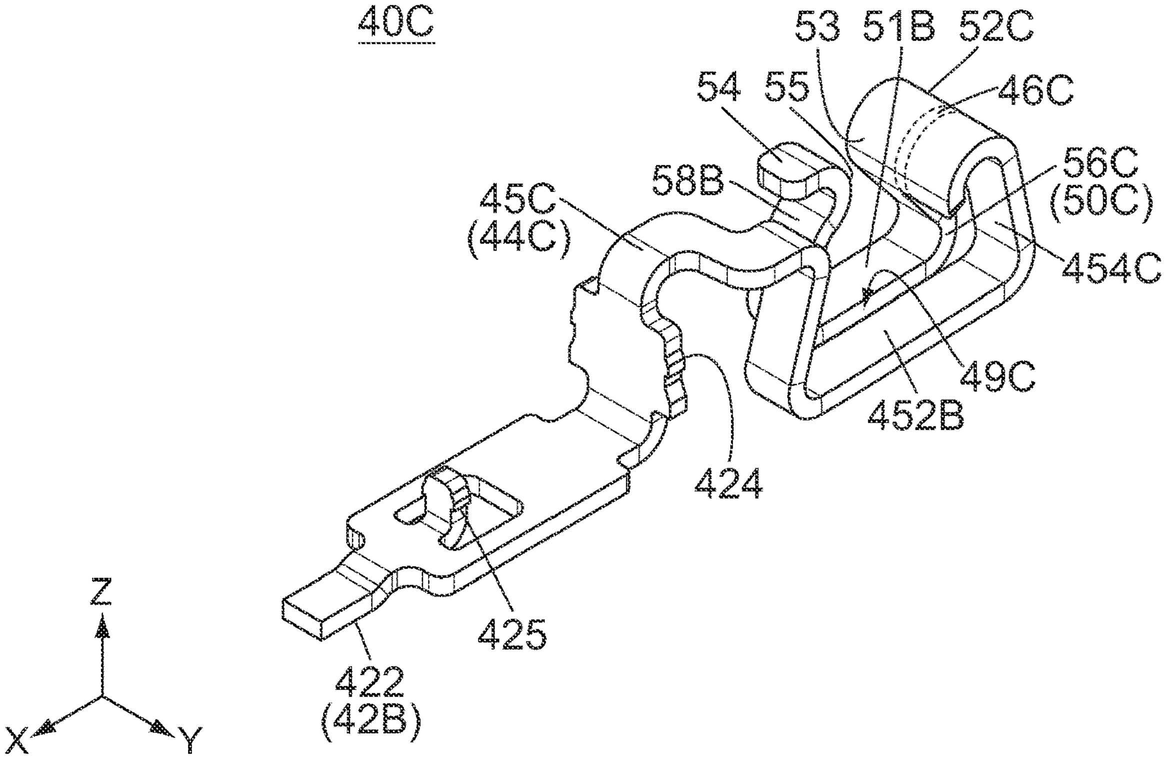
FIG. 23 is a perspective view showing a third modification of the terminal of FIG. 11, wherein boundary lines of a coupling portion are illustrated with dashed line.
Figure 24:
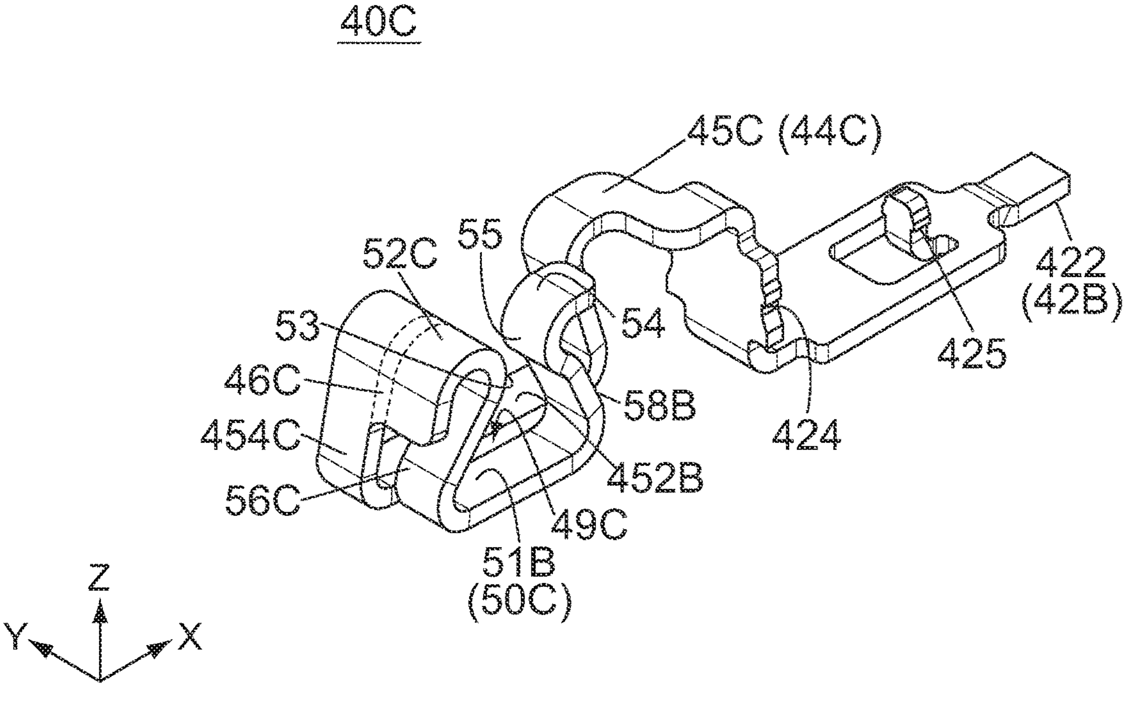
FIG. 24 is another perspective view showing the terminal of FIG. 23, wherein boundary lines of the coupling portion are illustrated with dashed line.

Comparing FIGS. 23 and 24 with FIGS. 19 and 20, the contact portion 50C of the present modification has the bottom portion 51B same as that of the contact portion 50B, a first support portion 56C different from the first support portion 56B, the second support portion 58B same as that of the contact portion 50B, the first contact point 53 same as that of the contact portion 50B and the second contact point 55 same as that of the contact portion 50B. The bottom portion 51B has a flat-plate shape which extends along the XY-plane. The bottom portion 51B is located at a lower end of the contact portion 50C and extends straight along the first horizontal direction (X-direction). The first support portion 56C and the second support portion 58B are connected to opposite ends of the bottom portion 51B in the first horizontal direction, respectively. Each of the first support portion 56C and the second support portion 58B extends upward from the bottom portion 51B.

The first support portion 56C has a first projection 52C. The first projection 52C is an upper end part of the first support portion 56C. The first projection 52C extends upward and then projects in an arc so as to be away from the second support portion 58B. Then, the first projection 52C extends downward. The first contact point 53 is a part of the first projection 52C which is close to the second support portion 58B.

The second support portion 58B has the second projection 54 same as that of the contact portion 50B. The second projection 54 is an upper end part of the second support portion 58B. The second projection 54 projects in an arc and toward the first support portion 56C and then extends along the first horizontal direction (X-direction) so as to be away from the first support portion 56C. The second contact point 55 is a part of the second projection 54 which is close to the first support portion 56C.

Figure 25:
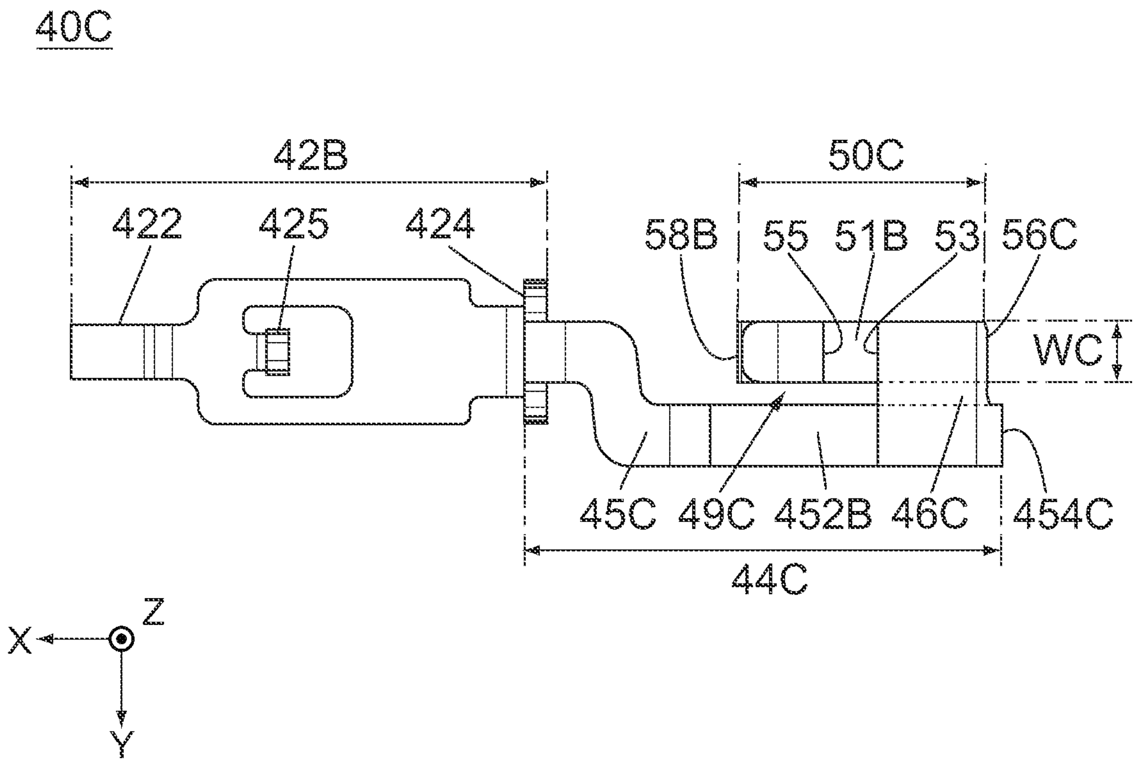
FIG. 25 is a top view showing the terminal of FIG. 23, wherein boundary lines of the coupling portion are illustrated with dashed line.
Figure 26:
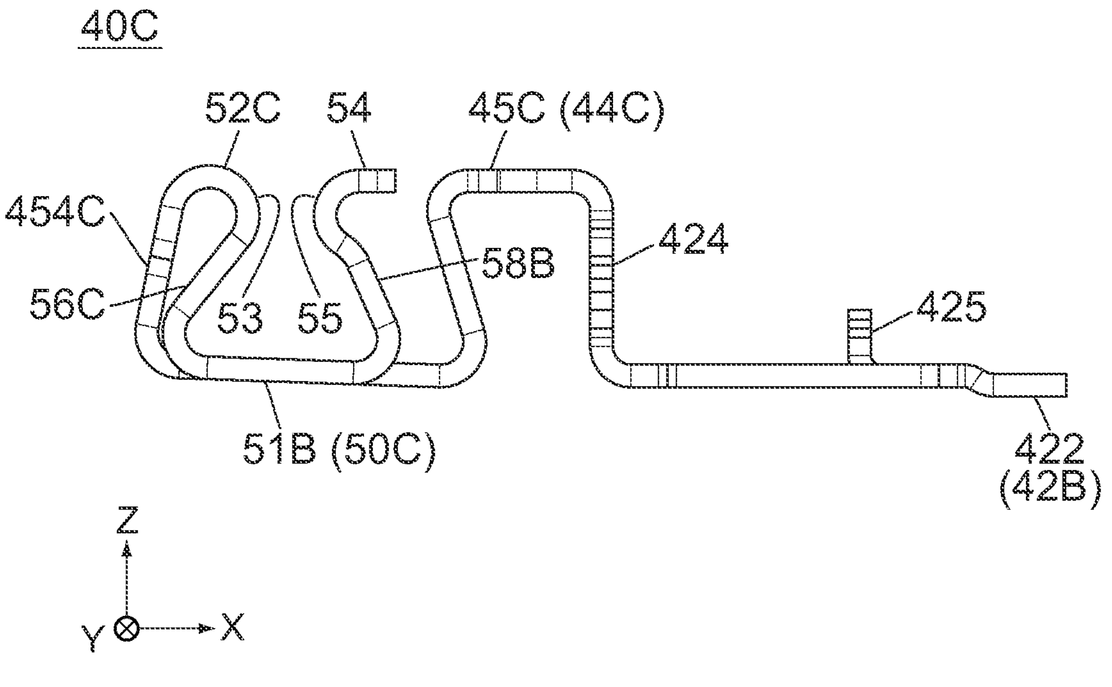
FIG. 26 is a side view showing the terminal of FIG. 23.

Comparing FIG. 26 with FIG. 22, the contact portion 50C has a structure similar to that of the contact portion 50B except for the aforementioned differences and can be modified similarly to the contact portion 50B. For example, when the contact portion 50C is seen along the second horizontal direction (Y-direction), the first contact point 53 and the second contact point 55 are apart from each other and face each other in the first horizontal direction (X-direction). Referring to FIG. 25, the first contact point 53 and the second contact point 55 are located at positions same as each other in the second horizontal direction. The second contact point 55 is located between the first contact point 53 and the held portion 424 in the first horizontal direction.

Referring to FIG. 26, the first contact point 53 is supported by the first support portion 56C. The second contact point 55 is supported by the second support portion 58B. Each of the first support portion 56C and the second support portion 58B is resiliently deformable. The first contact point 53 and the second contact point 55 are movable independently of each other. Referring to FIG. 25, when the terminal 40C of the present modification is seen from above along the upper-lower direction, the held portion 424, the first contact point 53 and the second contact point 55 are arranged in a straight line along the first horizontal direction (X-direction).

Referring to FIG. 26 together with FIG. 25, the whole of the contact portion 50C extends in parallel to the XZ-plane without an inclination in the second horizontal direction and has the constant width WC same as that of the contact portion 50B (see FIG. 21) in the second horizontal direction (Y-direction). Thus, each of the first support portion 56C and the second support portion 58B extends upward from the bottom portion 51B without being inclined in the second horizontal direction while having the constant width WC in the second horizontal direction. Therefore, the first contact point 53 is located at a position same as that of a lower end of the first support portion 56C in the second horizontal direction. The second contact point 55 is located at a position same as that of a lower end of the second support portion 58B in the second horizontal direction. The first contact point 53 and the second contact point 55 are electrically connected with each other.

Referring to FIG. 4 together with FIG. 23, the contact portion 50C is accommodated in the accommodation portion 34 of the housing 20 similarly to the contact portion 50, and the whole contact portion 50C is movable relative to the housing 20. Referring to FIG. 5 together with FIG. 23, the mating terminal 64 is sandwiched and held between the first contact point 53 and the second contact point 55 under the mated state. As a result, the two contact points, or the first contact point 53 and the second contact point 55, of the terminal 40C are electrically connected with the corresponding mating terminal 64.

Referring to FIGS. 23 to 26 together with FIG. 19, the arm 44C of the present modification has a structure similar to that of the arm 44B and can be modified similarly to the arm 44B. For example, at least a part of the arm 44C is resiliently deformable. The arm 44C couples the held portion 424 and the contact portion 50C to each other and supports the contact portion 50C so that the contact portion 50C is movable. The present modification provides the new connector 10 (see FIG. 5) having: the contact portion 50C which can be stably brought into contact with the mating terminal 64 (see FIG. 5); and a structure which enables the insertion force upon mating and the removal force upon removing to be made small.

Referring to FIG. 8 together with FIG. 23, the bottom portion 51B of the contact portion 50C is visible when the connector 10 is seen from below along the upper-lower direction. Referring to FIG. 4 together with FIG. 23, under the separated state, the bottom portion 51B is located over the connection object 70 and is slightly apart from the connection object 70. Referring to FIG. 5 together with FIG. 23, upon mating the mating connector 60 with the connector 10, the bottom portion 51B which has been moved downward is brought into abutment with the connection object 70 so that the posture of the contact portion 50C becomes stable. Since the bottom portion 51B has a flat shape in parallel to the XY-plane, the posture of the contact portion 50C can be easily made stable.

Referring to FIGS. 23 to 25, the terminal 40C is formed with a gap 49C. The arm 44C and the contact portion 50C are partially arranged in the second horizontal direction (Y-direction). The gap 49C is located between the arm 44C and the contact portion 50C in the second horizontal direction. The gap 49C extends along the whole side of the bottom portion 51B of the contact portion 50C along the first horizontal direction (X-direction) and then extends upward.

The arm 44C is connected to an edge of the first support portion 56C of the contact portion 50C in the second horizontal direction (Y-direction). This edge of the first support portion 56C defines a boundary between the arm 44C and the contact portion 50C in the second horizontal direction. The thus-defined boundary extends along the XZ-plane. Thus, the arm 44C is connected to at least one of the bottom portion 51B and the first support portion 56C. In particular, the arm 44C of the present modification is connected only to the first support portion 56C.

In detail, the arm 44C has the base portion 452B and a standing portion 454C. The base portion 452B is located at a lower end of the arm 44C and has a flat-plate shape which extends along the XY-plane. The base portion 452B is completely separated from the bottom portion 51B of the contact portion 50C by the gap 49C. The base portion 452B extends straight along the first horizontal direction (X-direction) in parallel to the bottom portion 51B. The standing portion 454C extends upward from an end of the base portion 452B in the first horizontal direction. The standing portion 454C is apart from the first support portion 56C in each of the first horizontal direction and the second horizontal direction (Y-direction). The standing portion 454C extends so that the gap 49C is located between the standing portion 454C and the first support portion 56C and thereafter is connected to the first support portion 56C.

Referring to FIG. 26, when the terminal 40C is seen along the second horizontal direction (Y-direction), the standing portion 454C is apart from the first support portion 56C. In detail, when the terminal 40C is seen along the second horizontal direction, the most part of the standing portion 454C is apart from the first support portion 56C while a remaining part of the standing portion 454C overlaps with the first support portion 56C.

Referring to FIGS. 25 and 26, at least a part of the arm 44C is located below the second contact point 55 and is connected to the contact portion 50C. Referring to FIGS. 23 to 25, the arm 44C has a main portion 45C and a coupling portion 46C. The coupling portion 46C is a part of the arm 44C which is located in the vicinity of the boundary between the arm 44C and the first support portion 56C of the contact portion 50C. The main portion 45C is another part of the arm 44C which extends from an upper end of the held portion 424 to the coupling portion 46C. As can be seen from this structure, at least a part of the main portion 45C is resiliently deformable. The coupling portion 46C which is defined as described above couples the main portion 45C and the contact portion 50C to each other in the second horizontal direction (Y-direction).

Comparing FIGS. 25 and 26 with FIGS. 21 and 22, the terminal 40C has a size in the first horizontal direction (X-direction) same as another size of the terminal 40B in the first horizontal direction. The terminal 40C has a size in the second horizontal direction (Y-direction) same as another size of the terminal 40B in the second horizontal direction. The terminal 40C has a size in the upper-lower direction same as another size of the terminal 40B in the upper-lower direction. However, the arm 44C has a spring length longer than another spring length of the arm 44B. According to the aforementioned structure, the contact portion 50C can be supported by a softer spring without making the size of the terminal 40C larger.

Comparing FIGS. 27 to 30 with FIGS. 11 to 14, a terminal 40D of a fourth modification has a basic structure same as that of the terminal 40 and works similarly to the terminal 40. For example, the terminal 40D is formed by bending a single metal plate. In other words, the terminal 40D is a single metal plate with bends. The terminal 40D has a leg 42D, an arm 44D and a contact portion 50D. The leg 42D, the arm 44D and the contact portion 50D are, on the whole, arranged in this order in the first horizontal direction (X-direction). The arm 44D couples the leg 42D and the contact portion 50D to each other.

The leg 42D has a structure similar to that of the leg 42 and can be modified similarly to the leg 42. For example, the leg 42D has the connected portion 422, a held portion 424D and the held portion 425. Thus, the terminal 40D has the connected portion 422, the held portion 424D and the held portion 425. The held portions 424D and 425 are located between the contact portion 50D and the connected portion 422 in the first horizontal direction (X-direction). Referring to FIG. 4 together with FIG. 27, the held portions 424D and 425 are press-fit into and held by the holding portions 32 and 33 of the housing 20, respectively. The connected portion 422 is connected to the connection object 70 when the connector 10 is attached to the connection object 70.

Figure 27:
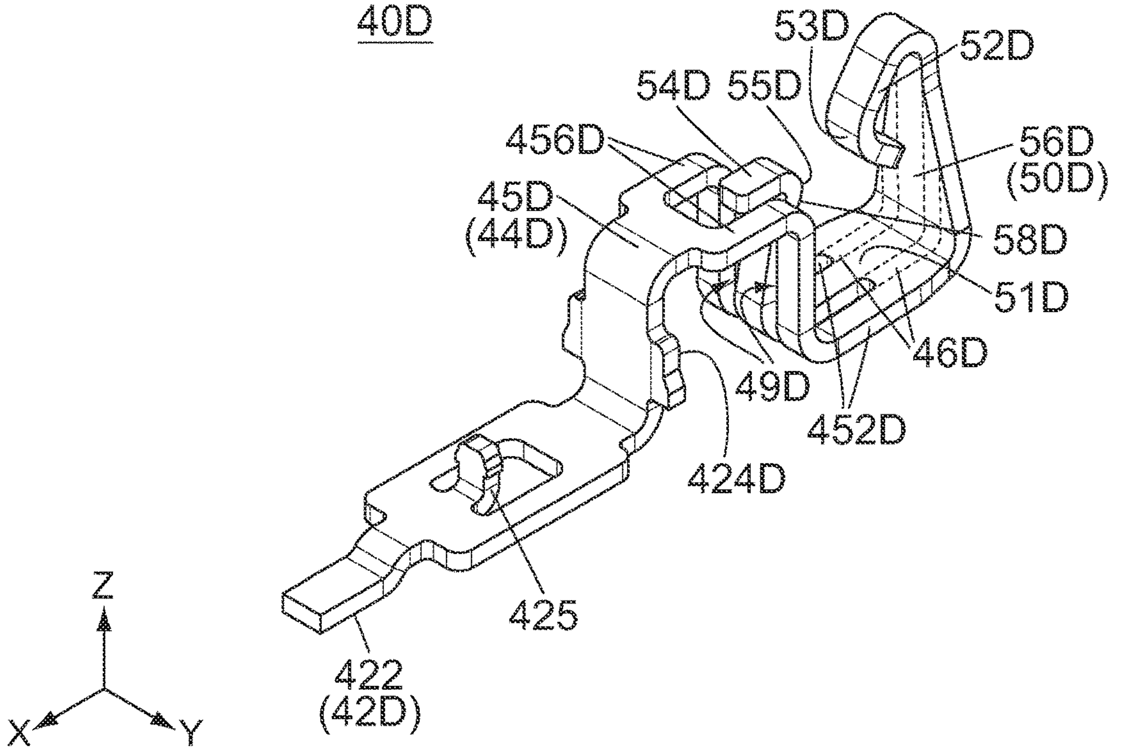
FIG. 27 is a perspective view showing a fourth modification of the terminal of FIG. 11, wherein boundary lines of coupling portions are illustrated with dashed line.
Figure 28:
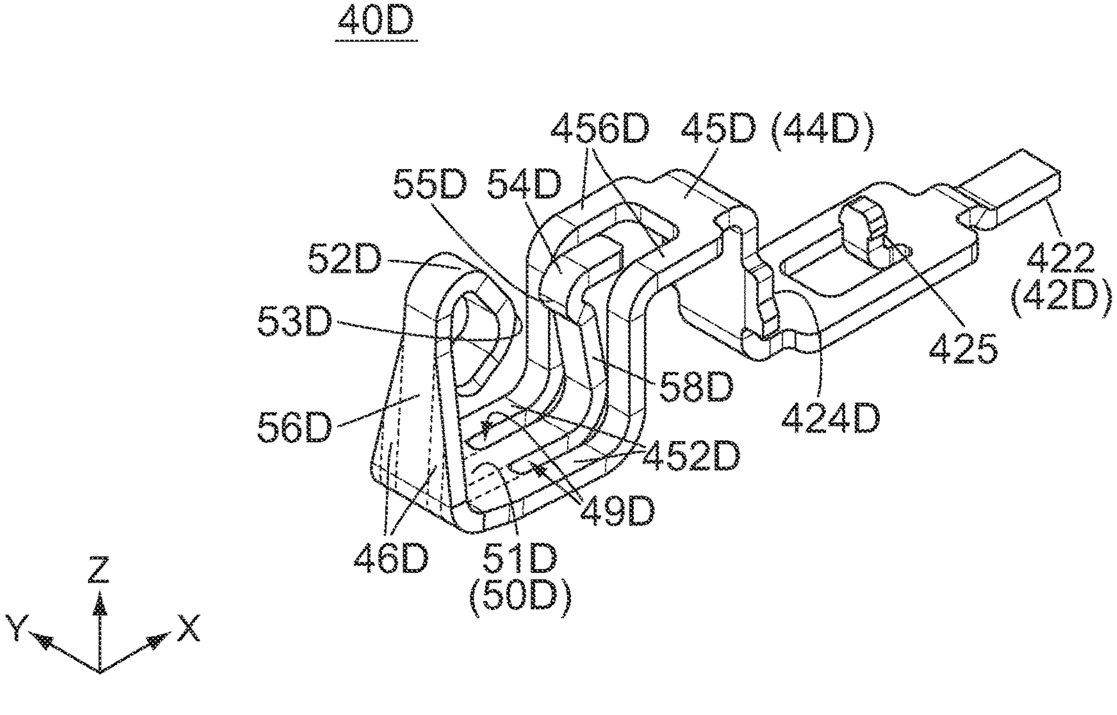
FIG. 28 is another perspective view showing the terminal of FIG. 27, wherein boundary lines of the coupling portions are illustrated with dashed line.

Comparing FIGS. 27 and 28 with FIGS. 11 to 14, the contact portion 50D of the present modification has a structure similar to that of the contact portion 50 and can be modified similarly to the contact portion 50. For example, the contact portion 50D has a bottom portion 51D, a first support portion 56D, a second support portion 58D, a first contact point 53D and a second contact point 55D. The bottom portion 51D has a flat-plate shape which extends along the XY-plane. The bottom portion 51D is located at a lower end of the contact portion 50D and extends straight along the first horizontal direction (X-direction). The first support portion 56D and the second support portion 58D are connected to opposite ends of the bottom portion 51D in the first horizontal direction, respectively. Each of the first support portion 56D and the second support portion 58D extends upward from the bottom portion 51D.

The first support portion 56D has a first projection 52D. The first projection 52D is an upper end part of the first support portion 56D. The first projection 52D projects in an arc and toward the second support portion 58D and then extends downward. The first contact point 53D is a part of the first projection 52D which is close to the second support portion 58D. The second support portion 58D has a second projection 54D. The second projection 54D is an upper end part of the second support portion 58D. The second projection 54D projects in an arc and toward the first support portion 56D and then extends along the first horizontal direction (X-direction) so as to be away from the first support portion 56D. The second contact point 55D is a part of the second projection 54D which is close to the first support portion 56D.

Figure 29:
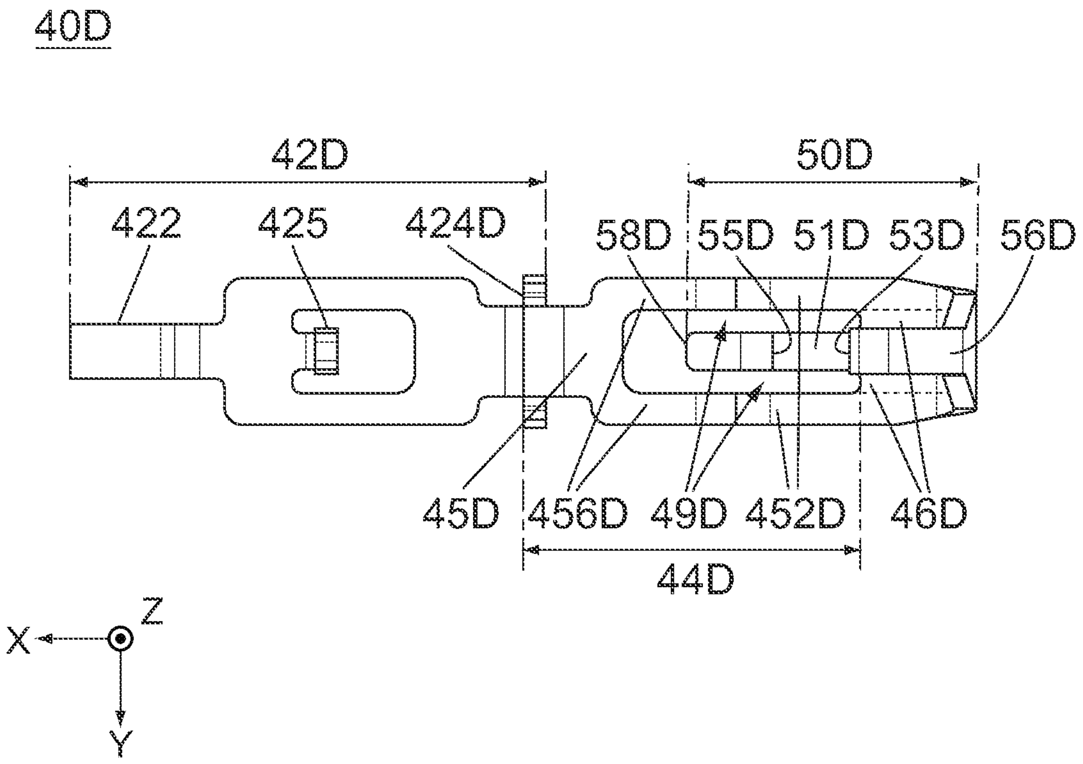
FIG. 29 is a top view showing the terminal of FIG. 27, wherein boundary lines of the coupling portions are illustrated with dashed line.
Figure 30:
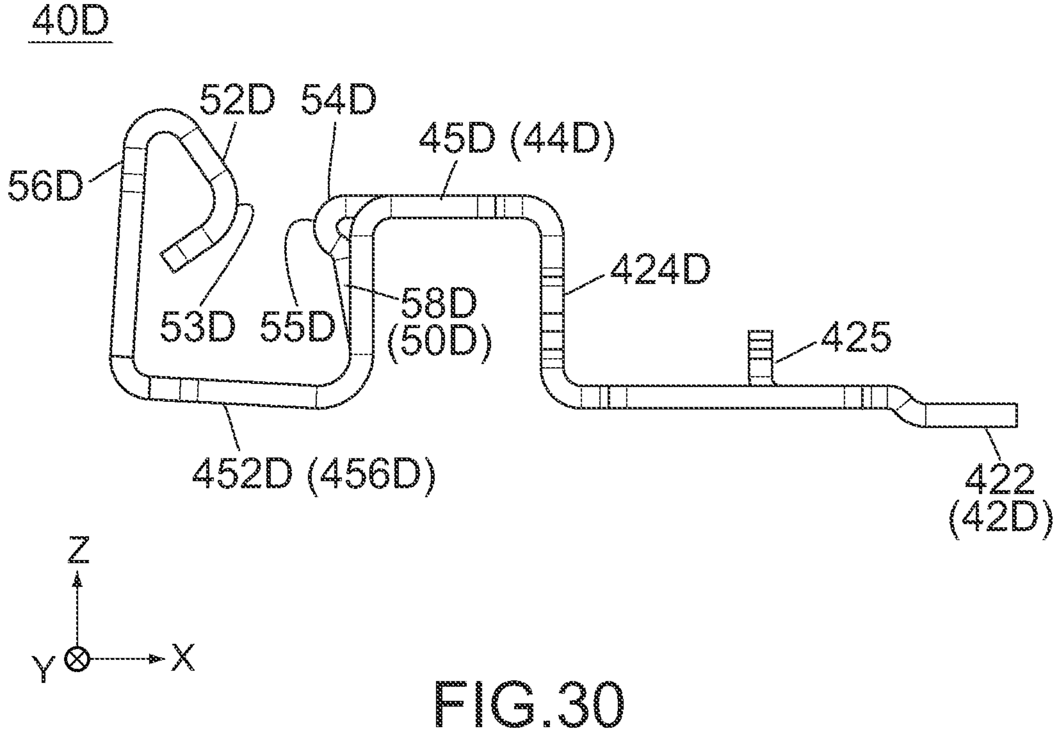
FIG. 30 is a side view showing the terminal of FIG. 27.

Referring to FIG. 30, when the contact portion 50D is seen along the second horizontal direction (Y-direction), the first contact point 53D and the second contact point 55D are apart from each other and face each other in the first horizontal direction (X-direction). Referring to FIG. 29, the first contact point 53D and the second contact point 55D are located at positions same as each other in the second horizontal direction. The second contact point 55D is located between the first contact point 53D and the held portion 424D in the first horizontal direction.

Referring to FIG. 30, the first contact point 53D is supported by the first support portion 56D. The second contact point 55D is supported by the second support portion 58D. Each of the first support portion 56D and the second support portion 58D is resiliently deformable. The first contact point 53D and the second contact point 55D are movable independently of each other. Referring to FIG. 29, when the terminal 40D of the present modification is seen from above along the upper-lower direction, the held portion 424D, the first contact point 53D and the second contact point 55D are arranged in a straight line along the first horizontal direction (X-direction).

Referring to FIG. 30 together with FIG. 29, the whole of the contact portion 50D extends in parallel to the XZ-plane without an inclination in the second horizontal direction (Y-direction). Thus, each of the first support portion 56D and the second support portion 58D extends upward from the bottom portion 51D without being inclined in the second horizontal direction. Therefore, the first contact point 53D is located at a position same as that of a lower end of the first support portion 56D in the second horizontal direction. The second contact point 55D is located at a position same as that of a lower end of the second support portion 58D in the second horizontal direction. The first contact point 53D and the second contact point 55D are electrically connected with each other.

Referring to FIG. 4 together with FIG. 27, the contact portion 50D is accommodated in the accommodation portion 34 of the housing 20 similarly to the contact portion 50, and the whole contact portion 50D is movable relative to the housing 20. Referring to FIG. 5 together with FIG. 27, the mating terminal 64 is sandwiched and held between the first contact point 53D and the second contact point 55D under the mated state. As a result, the two contact points, or the first contact point 53D and the second contact point 55D, of the terminal 40D are electrically connected with the corresponding mating terminal 64.

Referring to FIGS. 27 to 30 together with FIG. 11, the arm 44D of the present modification has a structure similar to that of the arm 44 and can be modified similarly to the arm 44. For example, at least a part of the arm 44D is resiliently deformable. The arm 44D couples the held portion 424D and the contact portion 50D to each other and supports the contact portion 50D so that the contact portion 50D is movable. The present modification provides the new connector 10 (see FIG. 5) having: the contact portion 50D which can be stably brought into contact with the mating terminal 64 (see FIG. 5); and a structure which enables the insertion force upon mating and the removal force upon removing to be made small.

Referring to FIG. 8 together with FIG. 27, the bottom portion 51D of the contact portion 50D is visible when the connector 10 is seen from below along the upper-lower direction. Referring to FIG. 4 together with FIG. 27, under the separated state, the bottom portion 51D is located over the connection object 70 and is slightly apart from the connection object 70. Referring to FIG. 5 together with FIG. 27, upon mating the mating connector 60 with the connector 10, the bottom portion 51D which has been moved downward is brought into abutment with the connection object 70 so that the posture of the contact portion 50D becomes stable. Since the bottom portion 51D has a flat shape in parallel to the XY-plane, the posture of the contact portion 50D can be easily made stable.

Referring to FIGS. 27 to 29, the arm 44D has two branches 456D. Each of the branches 456D is resiliently deformable. The two branches 456D extend along the XZ-plane while the contact portion 50D is partially located therebetween in the second horizontal direction (Y-direction). The second support portion 58D is located between the two branches 456D in the second horizontal direction. Each of the branches 456D is connected to the contact portion 50D. According to the present modification, the contact portion 50D can be supported in a well-balanced manner by two springs which are located at opposite sides of the contact portion 50D, respectively.

The terminal 40D is formed with two gaps 49D which correspond to the branches 456D, respectively. Each of the gaps 49D is located between the corresponding branch 456D (arm 44D) and the contact portion 50D in the second horizontal direction (Y-direction) and extends along the first horizontal direction (X-direction). In detail, each of the branches 456D has a base portion 452D. Each of the base portions 452D is located at a lower end of the branch 456D and has a flat-plate shape which extends along the XY-plane. Each of the gaps 49D is located between the base portion 452D of the corresponding branch 456D and the bottom portion 51D in the second horizontal direction. Thus, the contact portion 50D and the corresponding branch 456D (arm 44D) are partially arranged in the second horizontal direction.

The branches 456D are connected to opposite edges of the contact portion 50D in the second horizontal direction (Y-direction), respectively. In other words, these opposite edges of the contact portion 50D define boundaries between the arm 44D and the contact portion 50D in the second horizontal direction. The thus-defined boundaries extend from the bottom portion 51D to the first support portion 56D along the XZ-plane. Thus, the arm 44D is connected to the bottom portion 51D and the first support portion 56D. However, the arm 44D may be connected to at least one of the bottom portion 51D and the first support portion 56D.

Referring to FIGS. 29 and 30, at least a part of the arm 44D is located below the second contact point 55D and is connected to the contact portion 50D. Referring to FIGS. 27 to 29, the arm 44D has a main portion 45D and two coupling portions 46D. Each of the coupling portions 46D is a part of the arm 44D which is located in the vicinity of the boundary between the branch 456D of the arm 44D and the contact portion 50D. The main portion 45D is another part of the arm 44D which extends from an upper end of the held portion 424D to the coupling portions 46D and includes the two branches 456D. As can be seen from this structure, at least a part of the main portion 45D is resiliently deformable. Each of the coupling portions 46D which are defined as described above couples the main portion 45D and the contact portion 50D to each other in the second horizontal direction (Y-direction).

Comparing FIGS. 31 to 34 with FIGS. 15 to 18, a terminal 40E of a fifth modification has a basic structure same as that of the terminal 40A and works similarly to the terminal 40A. For example, the terminal 40E is formed by bending a single metal plate. In other words, the terminal 40E is a single metal plate with bends. The terminal 40E has a leg 42E, an arm 44E and a contact portion 50E. The leg 42E, the arm 44E and the contact portion 50E are, on the whole, arranged in this order in the first horizontal direction (X-direction). The arm 44E couples the leg 42E and the contact portion 50E to each other.

As shown in FIGS. 31 to 34, the leg 42E of the present modification has the connected portion 422 and a held portion 424E. Thus, the terminal 40E has the connected portion 422 and the held portion 424E. The connected portion 422 has a flat-plate shape which extends along the XY-plane.

The connected portion 422 extends straight along the first horizontal direction (X-direction). The held portion 424E extends upward from an end of the connected portion 422 in the first horizontal direction. The held portion 424E is located between the contact portion 50E and the connected portion 422 in the first horizontal direction. Referring to FIG. 4 together with FIG. 31, the held portion 424E is press-fit into and held by the holding portion 32 of the housing 20. The connected portion 422 is connected to the connection object 70 when the connector 10 is attached to the connection object 70.

According to the present modification, the leg 42E is provided with only the one held portion 424E, and thereby the terminal 40E has a size (length) in the first horizontal direction (X-direction) smaller than another size (length) of the terminal 40 in the first horizontal direction. Thus, the terminal 40E of the present modification can be reduced in size in the first horizontal direction.

Figure 31:
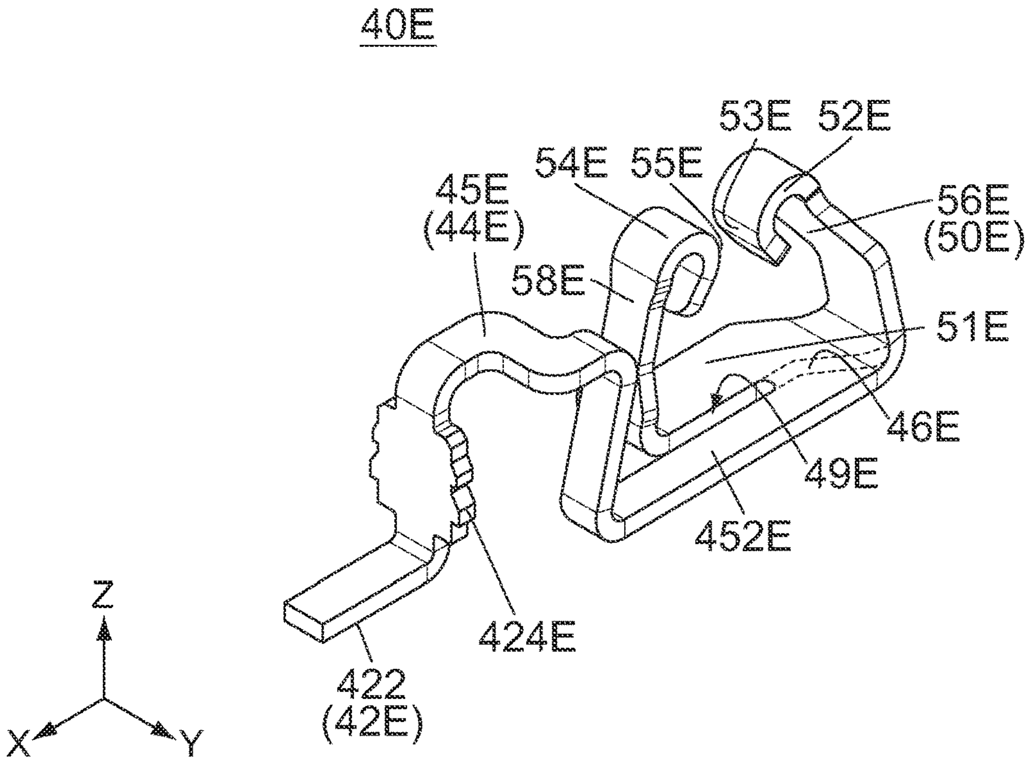
FIG. 31 is a perspective view showing a fifth modification of the terminal of FIG. 11, wherein boundary lines of a coupling portion are illustrated with dashed line.
Figure 32:
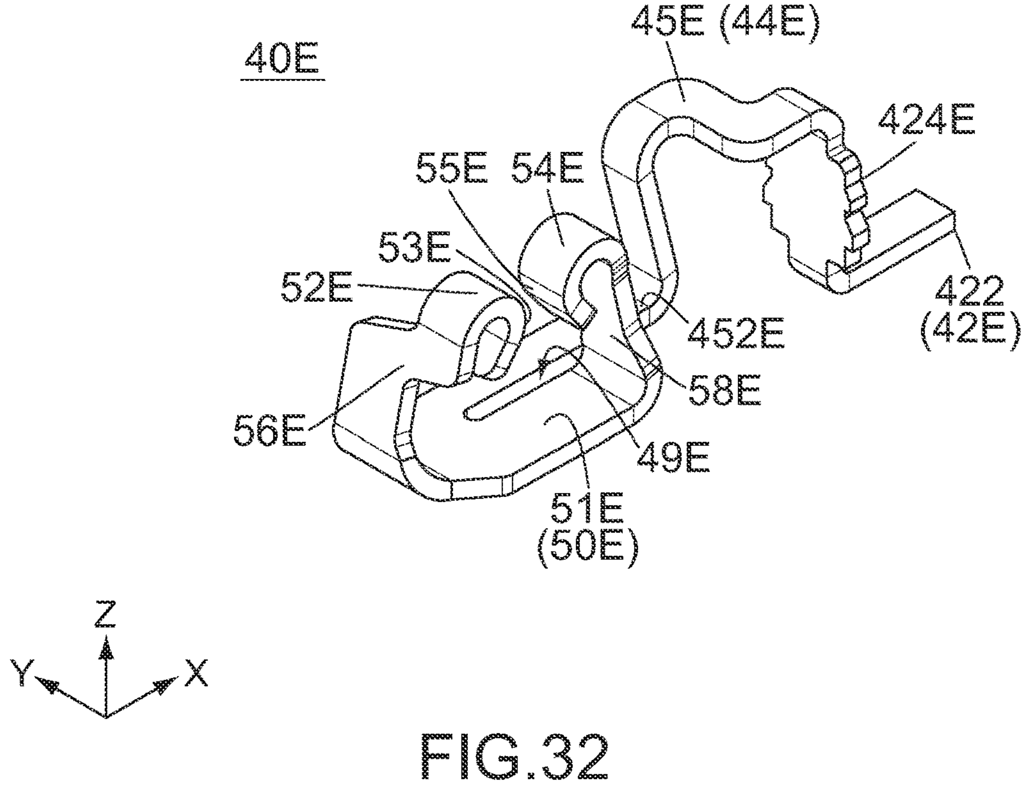
FIG. 32 is another perspective view showing the terminal of FIG. 31.

As shown in FIGS. 31 and 32, the contact portion 50E of the present modification has a bottom portion 51E, a first support portion 56E, a second support portion 58E, a first contact point 53E and a second contact point 55E. The bottom portion 51E has a flat-plate shape which extends along the XY-plane. The bottom portion 51E is located at a lower end of the contact portion 50E. The bottom portion 51E has a part which extends straight along the first horizontal direction (X-direction) and another part which extends along a direction oblique to the first horizontal direction. The first support portion 56E and the second support portion 58E are connected to opposite ends of the bottom portion 51E in the first horizontal direction, respectively. Each of the first support portion 56E and the second support portion 58E extends upward from the bottom portion 51E. The first support portion 56E extends upward from the bottom portion 51E as a whole while being inclined in the second horizontal direction.

The first support portion 56E has a first projection 52E. The first projection 52E is an upper end part of the first support portion 56E. The first projection 52E projects in an arc and toward the second support portion 58E and then extends downward. The first contact point 53E is a part of the first projection 52E which is close to the second support portion 58E. The second support portion 58E has a second projection 54E. The second projection 54E is an upper end part of the second support portion 58E. The second projection 54E projects in an arc and toward the first support portion 56E and then extends downward. The second contact point 55E is a part of the second projection 54E which is close to the first support portion 56E.

Figure 33:
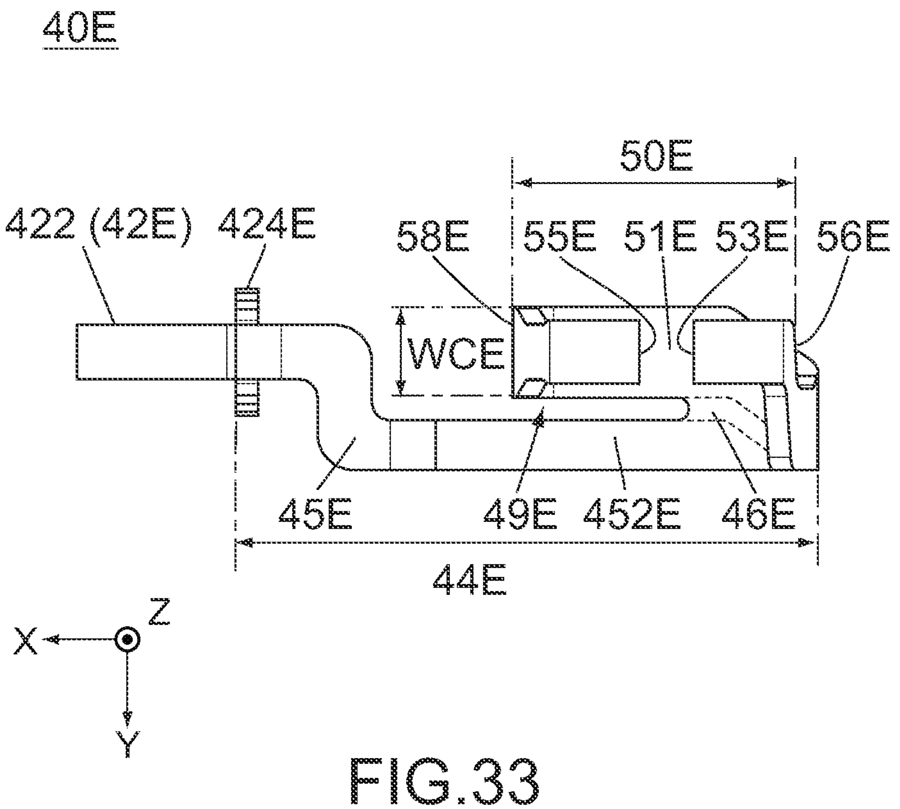
FIG. 33 is a top view showing the terminal of FIG. 31, wherein boundary lines of the coupling portion are illustrated with dashed line.
Figure 34:
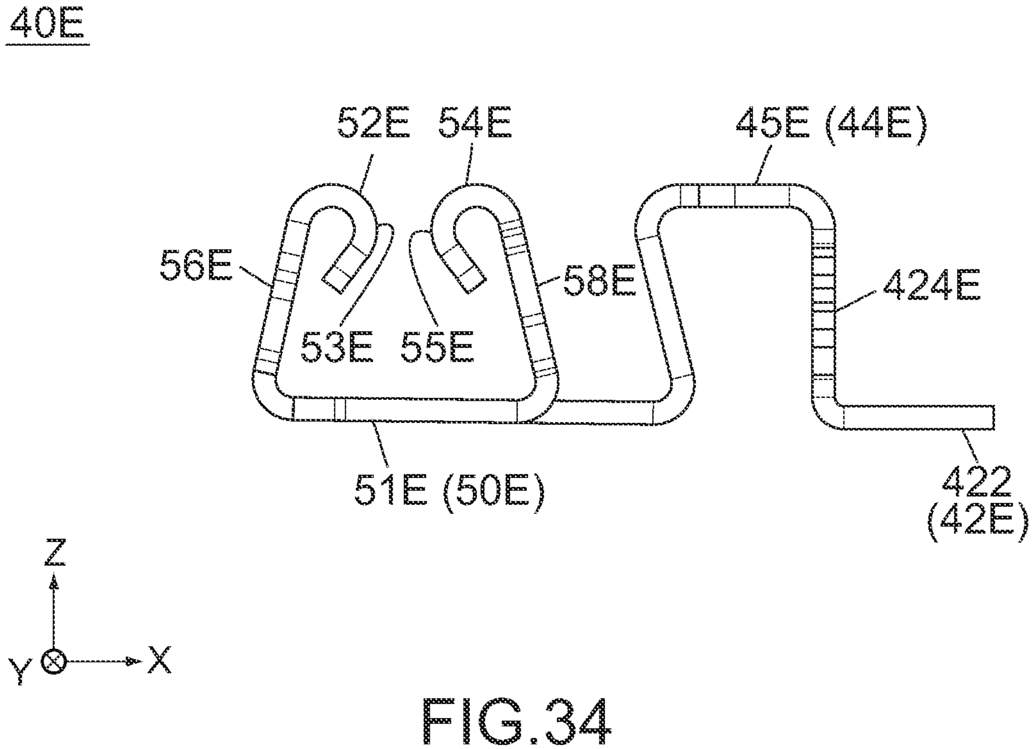
FIG. 34 is a side view showing the terminal of FIG. 31.

Comparing FIG. 34 with FIG. 18, the contact portion 50E has a structure similar to that of the contact portion 50A except for the aforementioned differences and can be modified similarly to the contact portion 50A. For example, when the contact portion 50E is seen along the second horizontal direction (Y-direction), the first contact point 53E and the second contact point 55E are apart from each other and face each other in the first horizontal direction (X-direction). Referring to FIG. 33, the first contact point 53E and the second contact point 55E are located at positions same as each other in the second horizontal direction. The second contact point 55E is located between the first contact point 53E and the held portion 424E in the first horizontal direction.

Referring to FIG. 34, the first contact point 53E is supported by the first support portion 56E. The second contact point 55E is supported by the second support portion 58E. Each of the first support portion 56E and the second support portion 58E is resiliently deformable. The first contact point 53E and the second contact point 55E are movable independently of each other. Referring to FIG. 33, when the terminal 40E of the present modification is seen from above along the upper-lower direction, the held portion 424E, the first contact point 53E and the second contact point 55E are arranged in a straight line along the first horizontal direction (X-direction). The first contact point 53E and the second contact point 55E are electrically connected with each other.

Referring to FIG. 34 together with FIG. 33, the most part of the contact portion 50E extends in parallel to the XZ-plane without an inclination in the second horizontal direction and has a constant width WCE in the second horizontal direction (Y-direction). However, a part of the contact portion 50E is inclined in the second horizontal direction to extend obliquely relative to the XZ-plane. In detail, the second support portion 58E extends upward from the bottom portion 51E without being inclined in the second horizontal direction. Therefore, the second contact point 55E is located at a position same as that of a lower end of the second support portion 58E in the second horizontal direction. In contrast, the first support portion 56E extends upward from the bottom portion 51E while being inclined in the second horizontal direction. As a result, the first contact point 53E is located at a position different from that of a lower end of the first support portion 56E in the second horizontal direction. According to the present modification, the spring length of the first support portion 56E can be made long while the size of the terminal 40E in the upper-lower direction is not made large.

Referring to FIG. 4 together with FIG. 31, the contact portion 50E is accommodated in the accommodation portion 34 of the housing 20 similarly to the contact portion 50, and the whole contact portion 50E is movable relative to the housing 20. Referring to FIG. 5 together with FIG. 31, the mating terminal 64 is sandwiched and held between the first contact point 53E and the second contact point 55E under the mated state. As a result, the two contact points, or the first contact point 53E and the second contact point 55E, of the terminal 40E are electrically connected with the corresponding mating terminal 64.

Referring to FIGS. 31 to 34 together with FIG. 15, the arm 44E of the present modification has a structure similar to that of the arm 44A and can be modified similarly to the arm 44A. For example, at least a part of the arm 44E is resiliently deformable. The arm 44E couples the held portion 424E and the contact portion 50E to each other and supports the contact portion 50E so that the contact portion 50E is movable. The present modification provides the new connector 10 (see FIG. 5) having: the contact portion 50E which can be stably brought into contact with the mating terminal 64 (see FIG. 5); and a structure which enables the insertion force upon mating and the removal force upon removing to be made small.

Referring to FIG. 8 together with FIG. 31, the bottom portion 51E of the contact portion 50E is visible when the connector 10 is seen from below along the upper-lower direction. Referring to FIG. 4 together with FIG. 31, under the separated state, the bottom portion 51E is located over the connection object 70 and is slightly apart from the connection object 70. Referring to FIG. 5 together with FIG. 31, upon mating the mating connector 60 with the connector 10, the bottom portion 51E which has been moved downward is brought into abutment with the connection object 70 so that the posture of the contact portion 50E becomes stable. Since the bottom portion 51E has a flat shape in parallel to the XY-plane, the posture of the contact portion 50E can be easily made stable.

Referring to FIGS. 31 to 33, the terminal 40E is formed with a gap 49E. The arm 44E and the contact portion 50E are partially arranged in the second horizontal direction (Y-direction). The gap 49E is located between the arm 44E and the contact portion 50E in the second horizontal direction and extends along the first horizontal direction (X-direction). In detail, the arm 44E has a base portion 452E. The base portion 452E is located at a lower end of the arm 44E and has a flat-plate shape which extends along the XY-plane. The base portion 452E and the bottom portion 51E of the contact portion 50E extend along the first horizontal direction in parallel to each other while the gap 49E is partially located therebetween in the second horizontal direction.

The arm 44E is connected to an edge of the contact portion 50E in the second horizontal direction (Y-direction). This edge of the contact portion 50E defines a boundary between the arm 44E and the contact portion 50E in the second horizontal direction. The thus-defined boundary has a part which extends along the XZ-plane and another part which extends along a plane oblique to the XZ-plane. The boundary between the arm 44E and the contact portion 50E extends from the bottom portion 51E to the first support portion 56E. Thus, the arm 44E of the present modification is connected to the bottom portion 51E and the first support portion 56E. However, the arm 44E may be connected to at least one of the bottom portion 51E and the first support portion 56E.

Referring to FIGS. 31 and 32, at least a part of the arm 44E is located below the second contact point 55E and is connected to the contact portion 50E. Referring to FIGS. 31 to 33, the arm 44E has a main portion 45E and a coupling portion 46E. The coupling portion 46E is a part of the arm 44E which is located in the vicinity of the boundary between the arm 44E and the contact portion 50E. The main portion 45E is another part of the arm 44E which extends from an upper end of the held portion 424E to the coupling portion 46E. As can be seen from this structure, at least a part of the main portion 45E is resiliently deformable. The coupling portion 46E which is defined as described above couples the main portion 45E and the contact portion 50E to each other in each of the second horizontal direction (Y-direction) and a direction oblique to the second horizontal direction.

Comparing FIGS. 35 to 38 with FIGS. 31 to 34, a terminal 40F of a sixth modification has a basic structure same as that of the terminal 40E and works similarly to the terminal 40E. For example, the terminal 40F is formed by bending a single metal plate. In other words, the terminal 40F is a single metal plate with bends. The terminal 40F has a leg 42F, an arm 44F and a contact portion 50F. The leg 42F, the arm 44F and the contact portion 50F are, on the whole, arranged in this order in the first horizontal direction (X-direction). The arm 44F couples the leg 42F and the contact portion 50F to each other.

As shown in FIGS. 35 to 38, the leg 42F of the present modification has the connected portion 422A same as that of the terminal 40A (see FIG. 15) and a held portion 424F. Thus, the terminal 40F has the connected portion 422A and the held portion 424F. The connected portion 422A has a flat-plate shape which extends along the XY-plane. According to the present modification, the terminal 40F can be reduced in size in the first horizontal direction (X-direction) similarly to the terminal 40E (see FIG. 31).

The connected portion 422A extends straight along the first horizontal direction (X-direction). The held portion 424F extends upward from an end of the connected portion 422A in the first horizontal direction. The held portion 424F is located between the contact portion 50F and the connected portion 422A in the first horizontal direction. Referring to FIG. 4 together with FIG. 34, the held portion 424F is press-fit into and held by the holding portion 32 of the housing 20. The connected portion 422A is connected to the connection object 70 when the connector 10 is attached to the connection object 70.

Figure 35:
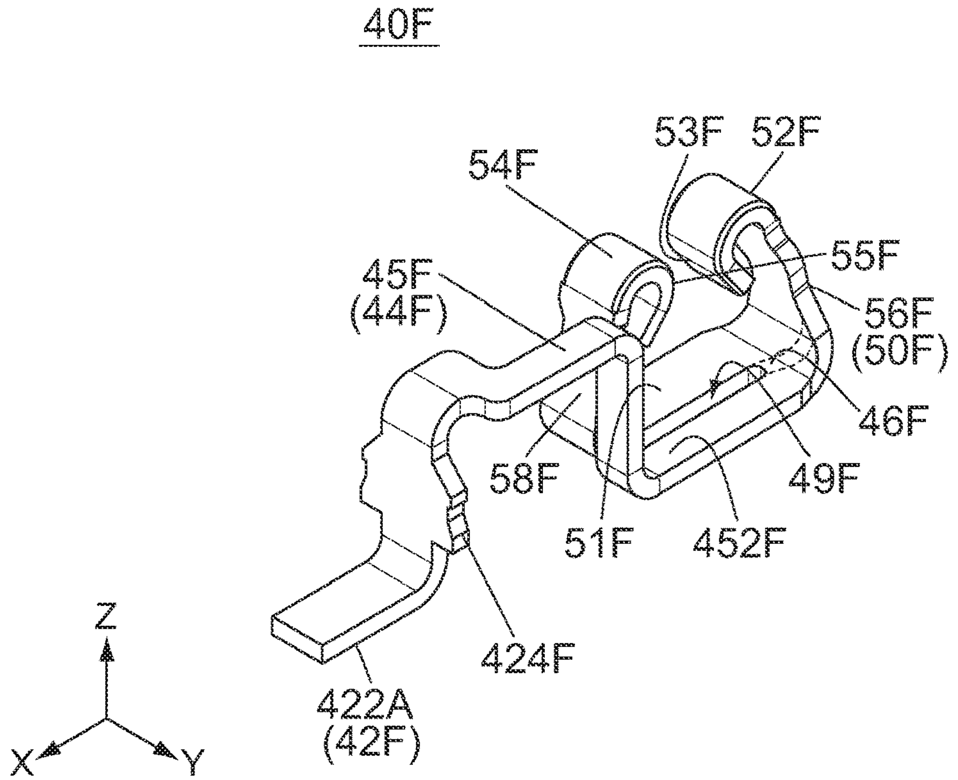
FIG. 35 is a perspective view showing a sixth modification of the terminal of FIG. 11, wherein boundary lines of a coupling portion are illustrated with dashed line.
Figure 36:
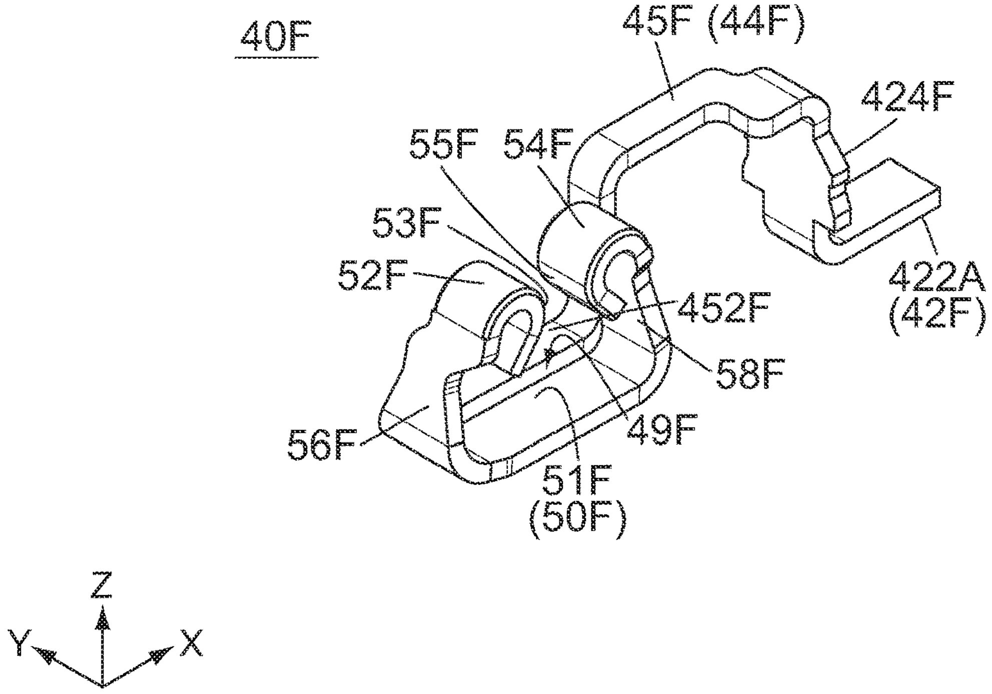
FIG. 36 is another perspective view showing the terminal of FIG. 35.

Comparing FIGS. 35 and 36 with FIGS. 31 and 32, the contact portion 50F of the present modification has a structure similar to that of the contact portion 50E and can be modified similarly to the contact portion 50E. For example, the contact portion 50F has a bottom portion 51F, a first support portion 56F, a second support portion 58F, a first contact point 53F and a second contact point 55F. The bottom portion 51F has a flat-plate shape which extends along the XY-plane. The bottom portion 51F is located at a lower end of the contact portion 50F. The bottom portion

51F has a part which extends straight along the first horizontal direction (X-direction) and another part which extends along a direction oblique to the first horizontal direction. The first support portion 56F and the second support portion 58F are connected to opposite ends of the bottom portion 51F in the first horizontal direction, respectively. Each of the first support portion 56F and the second support portion 58F extends upward from the bottom portion 51F. The first support portion 56F extends upward as a whole while being inclined in the second horizontal direction.

The first support portion 56F has a first projection 52F. The first projection 52F is an upper end part of the first support portion 56F. The first projection 52F projects in an arc and toward the second support portion 58F and then extends downward. The first contact point 53F is a part of the first projection 52F which is close to the second support portion 58F. The second support portion 58F has a second projection 54F. The second projection 54F is an upper end part of the second support portion 58F. The second projection 54F projects in an arc and toward the first support portion 56F and then extends downward. The second contact point 55F is a part of the second projection 54F which is close to the first support portion 56F.

Figure 37:
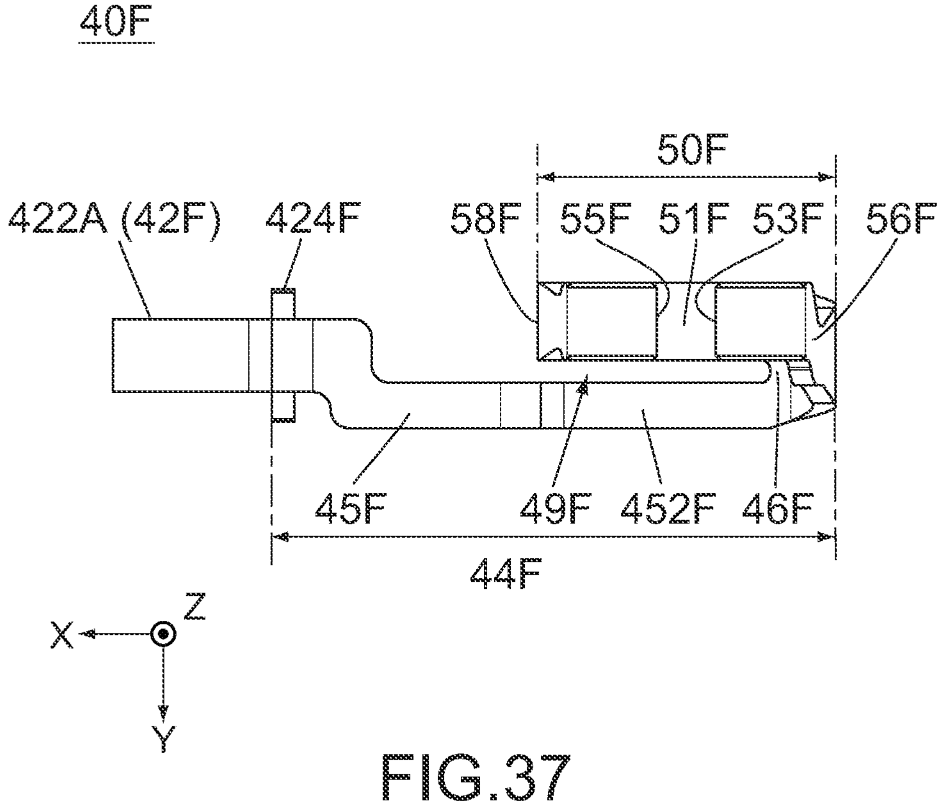
FIG. 37 is a top view showing the terminal of FIG. 35.
Figure 38:
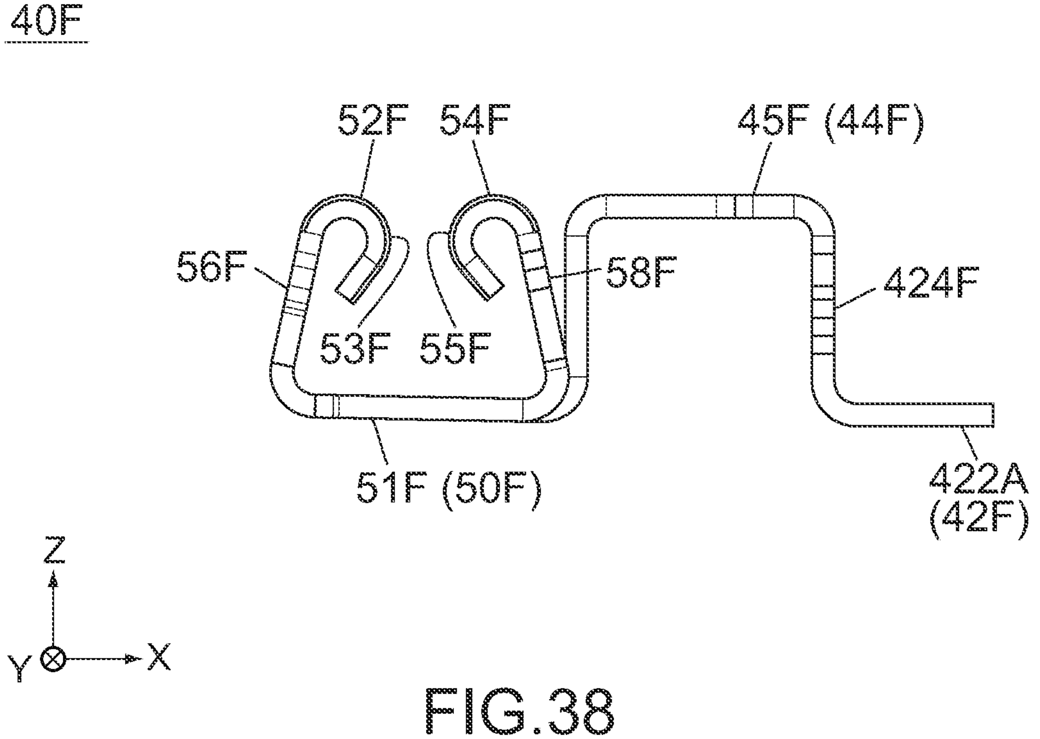
FIG. 38 is a side view showing the terminal of FIG. 35.

Referring to FIG. 38, when the contact portion 50F is seen along the second horizontal direction (Y-direction), the first contact point 53F and the second contact point 55F are apart from each other and face each other in the first horizontal direction (X-direction). Referring to FIG. 37, the first contact point 53F and the second contact point 55F are located at positions same as each other in the second horizontal direction. The second contact point 55F is located between the first contact point 53F and the held portion 424F in the first horizontal direction. Referring to FIG. 38, the first contact point 53F is supported by the first support portion 56F. The second contact point 55F is supported by the second support portion 58F. Each of the first support portion 56F and the second support portion 58F is resiliently deformable. The first contact point 53F and the second contact point 55F are movable independently of each other. The first contact point 53F and the second contact point 55F are electrically connected with each other.

Referring to FIG. 38 together with FIG. 37, the most part of the contact portion 50F of the present modification extends in parallel to the XZ-plane without an inclination in the second horizontal direction (Y-direction). However, a part of the contact portion 50F is inclined in the second horizontal direction to extend obliquely relative to the XZ-plane. In detail, the second support portion 58F extends upward from the bottom portion 51F without being inclined in the second horizontal direction. Therefore, the second contact point 55F is located at a position same as that of a lower end of the second support portion 58F in the second horizontal direction. In contrast, the first support portion 56F extends upward from the bottom portion 51F while being inclined in the second horizontal direction. As a result, the first contact point 53F is located at a position different from that of a lower end of the first support portion 56F in the second horizontal direction. According to the present modification, the spring length of the first support portion 56F can be made long while the size of the terminal 40F in the upper-lower direction is not made large.

Referring to FIG. 4 together with FIG. 35, the contact portion 50F is accommodated in the accommodation portion 34 of the housing 20 similarly to the contact portion 50, and the whole contact portion 50F is movable relative to the housing 20. Referring to FIG. 5 together with FIG. 35, the mating terminal 64 is sandwiched and held between the first contact point 53F and the second contact point 55F under the mated state. As a result, the two contact points, or the first contact point 53F and the second contact point 55F, of the terminal 40F are electrically connected with the corresponding mating terminal 64.

Referring to FIGS. 35 to 38 together with FIG. 31, the arm 44F of the present modification has a structure similar to that of the arm 44E and can be modified similarly to the arm 44E. For example, at least a part of the arm 44F is resiliently deformable. The arm 44F couples the held portion 424F and the contact portion 50F to each other and supports the contact portion 50F so that the contact portion 50F is movable. The present modification provides the new connector 10 (see FIG. 5) having: the contact portion 50F which can be stably brought into contact with the mating terminal 64 (see FIG. 5); and a structure which enables the insertion force upon mating and the removal force upon removing to be made small.

Referring to FIG. 8 together with FIG. 35, the bottom portion 51F of the contact portion 50F is visible when the connector 10 is seen from below along the upper-lower direction. Referring to FIG. 4 together with FIG. 35, under the separated state, the bottom portion 51F is located over the connection object 70 and is slightly apart from the connection object 70. Referring to FIG. 5 together with FIG. 35, upon mating the mating connector 60 with the connector 10, the bottom portion 51F which has been moved downward is brought into abutment with the connection object 70 so that the posture of the contact portion 50F becomes stable. Since the bottom portion 51F has a flat shape in parallel to the XY-plane, the posture of the contact portion 50F can be easily made stable.

Referring to FIGS. 35 to 37, the terminal 40F is formed with a gap 49F. The arm 44F and the contact portion 50F are partially arranged in the second horizontal direction (Y-direction). The gap 49F is located between the arm 44F and the contact portion 50F in the second horizontal direction and extends along the first horizontal direction (X-direction). In details, the arm 44F has a base portion 452F. The base portion 452F is located at a lower end of the arm 44F and has a flat-plate shape which extends along the XY-plane. The base portion 452F and the bottom portion 51F of the contact portion 50F extend along the first horizontal direction in parallel to each other while the gap 49F is partially located therebetween in the second horizontal direction.

The arm 44F is connected to an edge of the contact portion 50F in the second horizontal direction (Y-direction). This edge of the contact portion 50F defines a boundary between the arm 44F and the contact portion 50F in the second horizontal direction. The thus-defined boundary extends along a plane oblique to the XZ-plane. The boundary between the arm 44F and the contact portion 50F extends from the bottom portion 51F to the first support portion 56F. Thus, the arm 44F of the present modification is connected to the bottom portion 51F and the first support portion 56F. However, the arm 44F may be connected to at least one of the bottom portion 51F and the first support portion 56F.

Referring to FIGS. 35 and 36, at least a part of the arm 44F is located below the second contact point 55F and is connected to the contact portion 50F. Referring to FIGS. 35 to 37, the arm 44F has a main portion 45F and a coupling portion 46F. The coupling portion 46F is a part of the arm 44F which is located in the vicinity of the boundary between the arm 44F and the contact portion 50F. The main portion 45F is another part of the arm 44F which extends from an upper end of the held portion 424F to the coupling portion 46F. As can be seen from this structure, at least a part of the main portion 45F is resiliently deformable. The coupling portion 46F which is defined as described above couples the main portion 45F and the contact portion 50F to each other in a direction oblique to the second horizontal direction (Y-direction).

Figure 39:
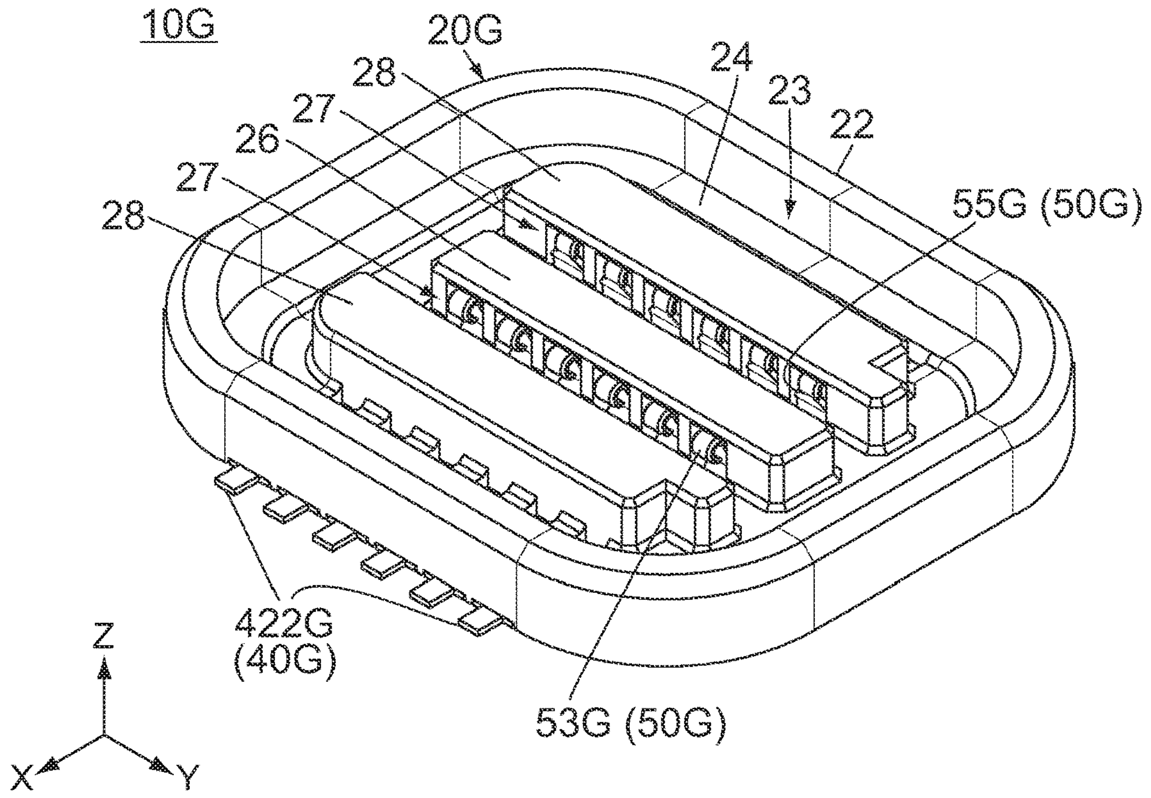
FIG. 39 is a perspective view showing a modification of the connector of FIG. 6, wherein the connector comprises terminals each of which is a seventh modification of the terminal of FIG. 11.
Figure 42:
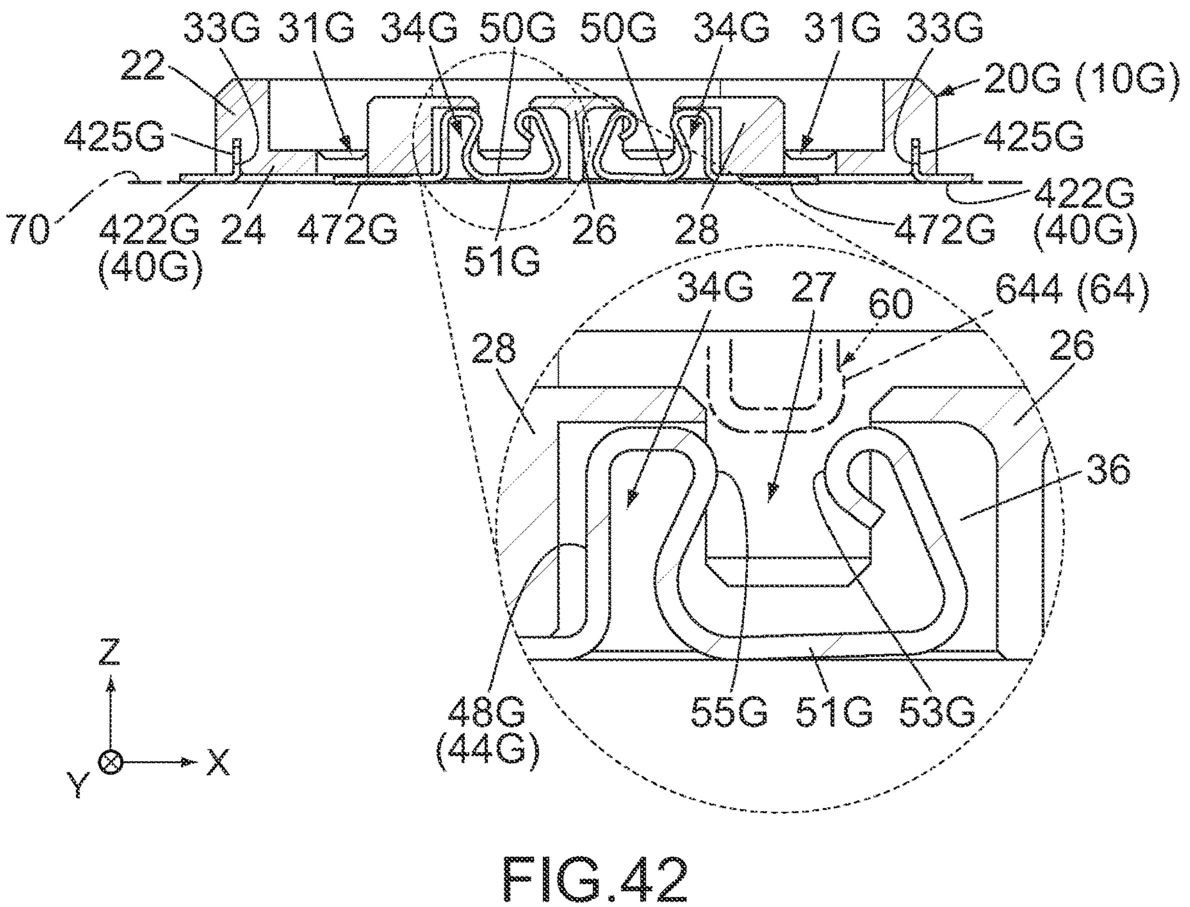
FIG. 42 is a cross-sectional view showing the connector of FIG. 41, wherein a part of the connector enclosed by dashed line is enlarged and illustrated, and an outline of a part of the circuit board and an outline of a part of a mating terminal of the mating connector in a mating process are illustrated with chain dotted lines.

Referring to FIG. 39, a terminal 40G of a seventh modification is a member of a connector 10G. The connector 10G comprises a housing 20G made of insulator and a plurality of the terminals 40G each made of conductor. Referring to FIG. 42, the connector 10G is configured to be attached to the connection object 70 similarly to the connector 10 (see FIG. 4). Referring to FIGS. 1 to 3 together with FIG. 39, the connector 10G is mateable with the mating connector 60 along the upper-lower direction similarly to the connector 10, the mating connector 60 comprising the mating terminals 64.

Hereafter, explanation will be made about the housing 20G.

Figure 40:
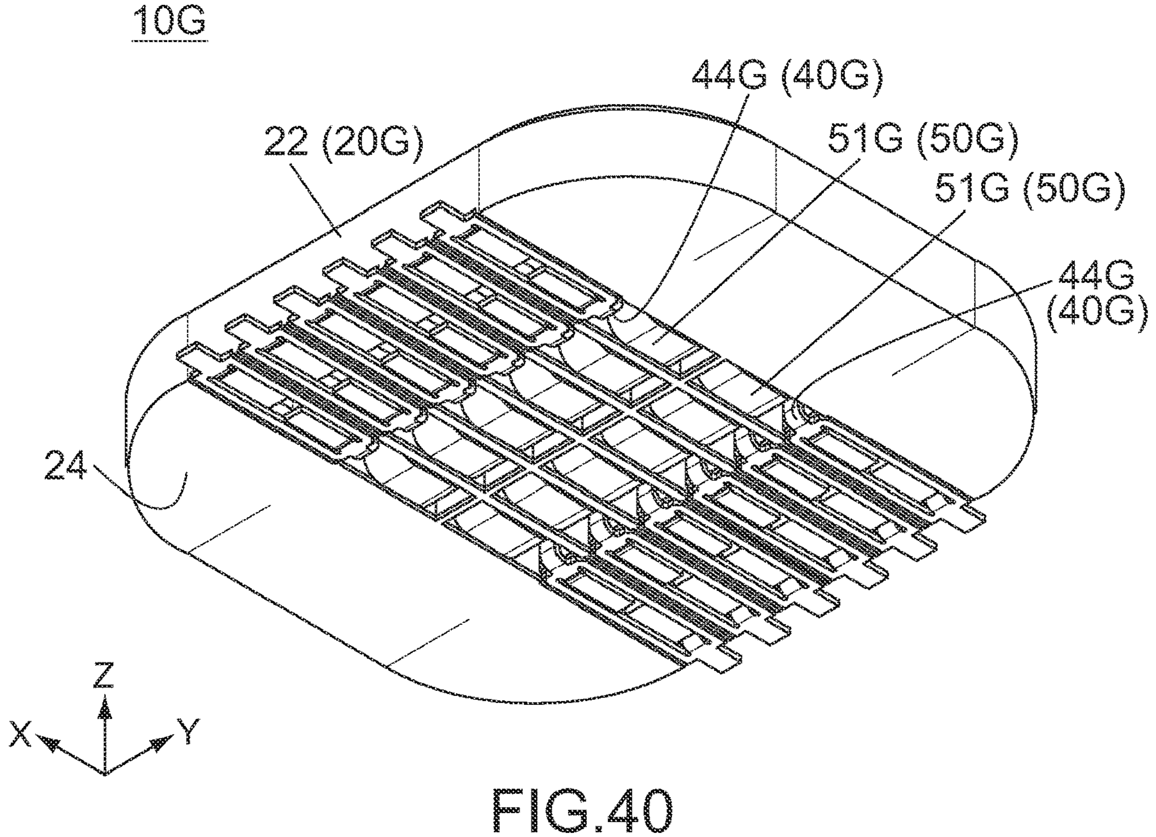
FIG. 40 is another perspective view showing the connector of FIG. 39.

Comparing FIGS. 39 and 40 with FIGS. 6 and 7, the housing 20G has various portions which correspond to the portions of the housing 20, respectively. Each portion of the housing 20G has a structure and a function substantially same as those of the corresponding portion of the housing 20 and can be modified similarly to the corresponding portion of the housing 20. In the explanation described below, except for the portions which are provided so as to correspond to the terminals 40G, respectively, each portion of the housing 20G will be referred by a reference sign same as that of the corresponding portion of the housing 20, and specific explanation thereof will not be made.

Figure 41:
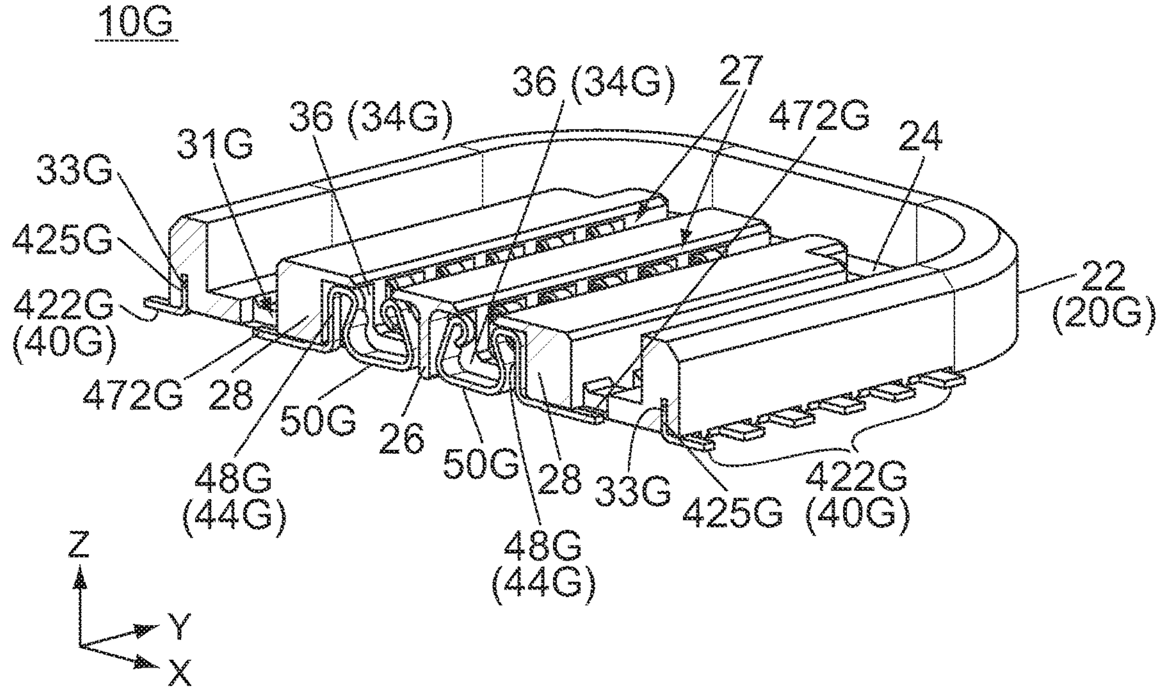
FIG. 41 is a partially cut-away, perspective view showing the connector of FIG. 39.
Figure 43:
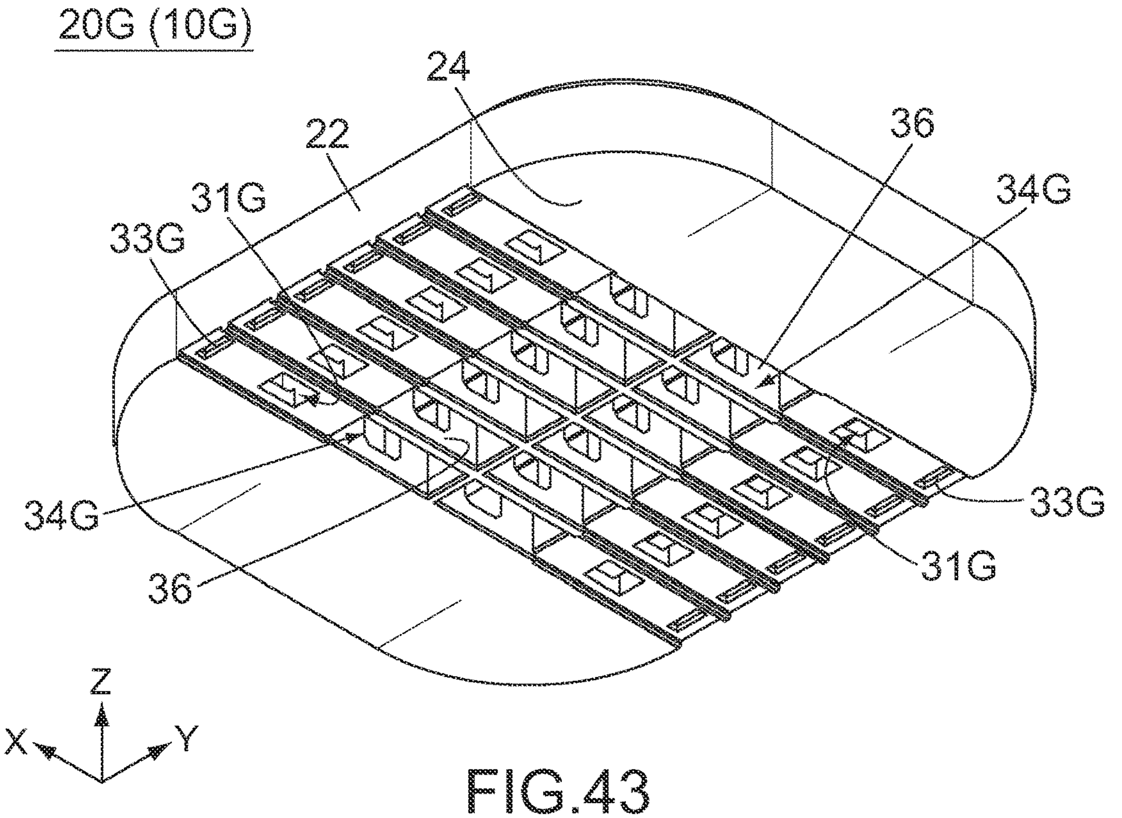
FIG. 43 is a perspective view showing a housing of the connector of FIG. 39.

Comparing FIGS. 41 to 43 with FIGS. 9 and 10, the housing 20G has a basic structure same as that of the housing 20. For example, the housing 20G has the outer wall 22, the bottom wall 24, the central projecting portion 26 and the two side projecting portions 28. The housing 20G is formed with the outer recess 23 and the two receiving portions 27. Referring to FIGS. 41 and 42, the housing 20G is formed with a plurality of accommodation portions 34G which correspond to the terminals 40G, respectively, a plurality of holding portions 33G which correspond to the terminals 40G, respectively, and a plurality of hole portions 31G which correspond to the terminals 40G, respectively.

Each of the accommodation portions 34G is a space for accommodating a part of the corresponding terminal 40G. Each of the accommodation portions 34G extends, similarly to the accommodation portion 34 (see FIG. 4), from a corresponding one of the inner spaces 282 (see FIG. 4) of the side projecting portions 28 to a corresponding one of the inner spaces 262 (see FIG. 4) of the central projecting portion 26 in the first horizontal direction (X-direction). Each of the accommodation portions 34G opens downward from the housing 20G and communicates with a corresponding one of the receiving portions 27 in the upper-lower direction. Each of the holding portions 33G is a part for holding the corresponding terminal 40G. Each of the holding portions 33G of the present modification is a wall surface of a hole formed in the bottom wall 24. Each of the hole portions 31G is a hole which passes through the bottom wall 24 and opens upward and downward.

The housing 20G has a plurality of the partition walls 36. Each of the partition walls 36 is located between two of the terminals 40G adjacent to each other in the second horizontal direction (Y-direction). Each of the partition walls 36 separates the adjacent two of the terminals 40G from each other to prevent short-circuit between the terminals 40G. In addition, the partition walls 36 regulate a movement of each of the terminals 40G in the second horizontal direction.

Referring to FIGS. 44 to 47, the terminals 40G of the present modification have shapes same as each other. The terminals 40G are held by the housing 20G (see FIG. 41) similarly to each other and work similarly to each other. Hereafter, explanation will be made about one of the terminals 40G. The explanation described below is applicable to each of the terminals 40G.

Comparing FIGS. 44 to 47 with FIGS. 11 to 14, the terminal 40G of the seventh modification has a basic structure same as that of the terminal 40 and works similarly to the terminal 40. For example, the terminal 40G is formed by bending a single metal plate. In other words, the terminal 40G is a single metal plate with bends. The terminal 40G has a leg 42G, an arm 44G and a contact portion 50G. The leg 42G, the arm 44G and the contact portion 50G are, on the whole, arranged in this order in the first horizontal direction (X-direction). The arm 44G couples the leg 42G and the contact portion 50G to each other.

As shown in FIGS. 44 to 47, the leg 42G of the present modification has a connected portion 422G and a held portion 425G. Thus, the terminal 40G has the connected portion 422G and the held portion 425G. The connected portion 422G has a flat-plate shape which extends along the XY-plane.

The connected portion 422G extends straight along the first horizontal direction (X-direction). The held portion 425G extends upward from an end of the connected portion 422G in the first horizontal direction. The held portion 425G is located between the contact portion 50G and the connected portion 422G in the first horizontal direction. Referring to FIGS. 41 and 42, the held portion 425G is press-fit into and held by the holding portion 33G of the housing 20G. The connected portion 422G is fixed on and connected to the connection object 70 via soldering, etc. when the connector 10G is attached to the connection object 70.

Figure 44:
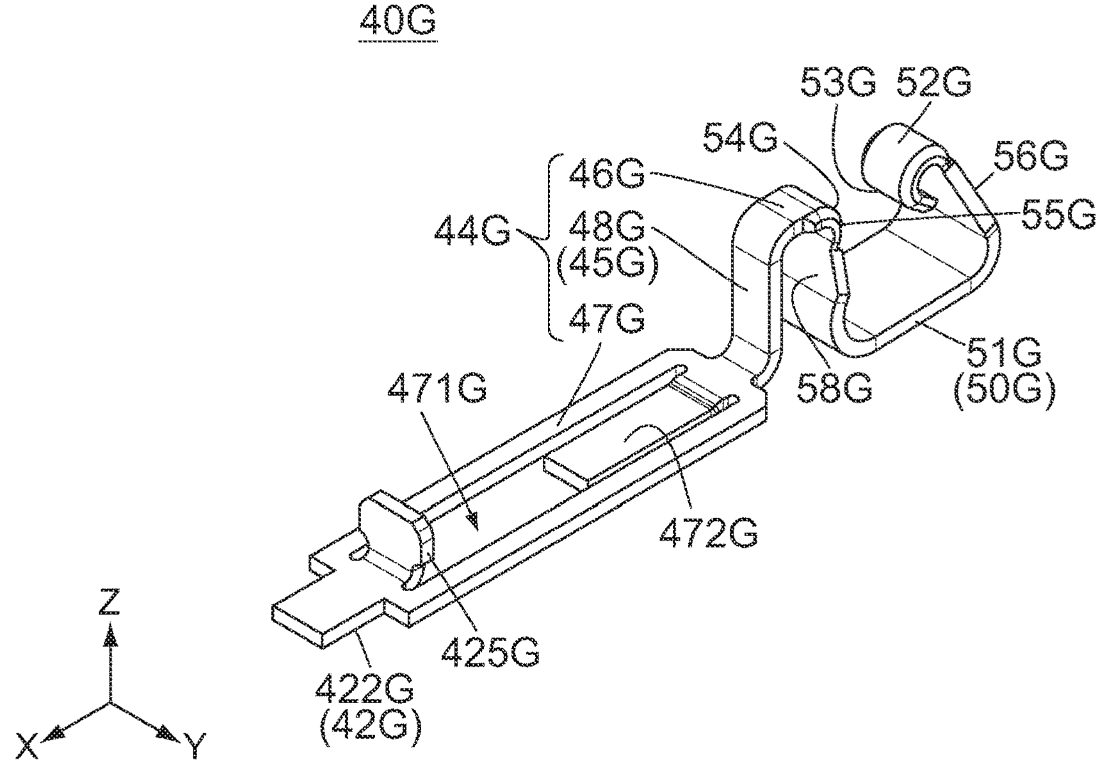
FIG. 44 is a perspective view showing the terminal of the connector of FIG. 39.
Figure 45:
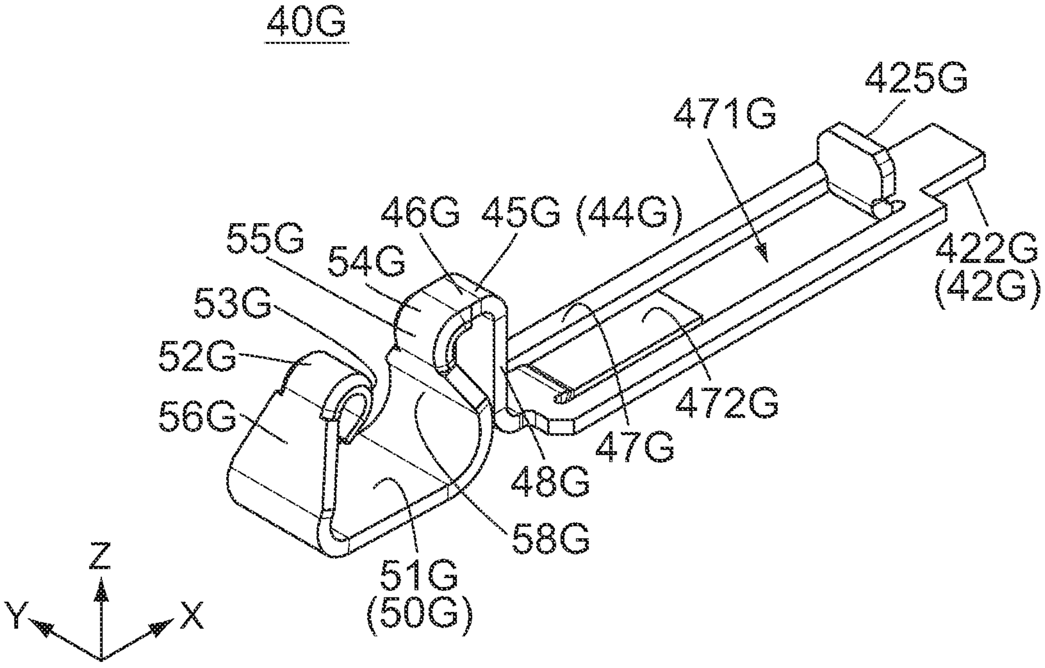
FIG. 45 is another perspective view showing the terminal of FIG. 44.

Comparing FIGS. 44 and 45 with FIGS. 11 and 12, the contact portion 50G of the present modification has a structure similar to that of the contact portion 50 and can be modified similarly to the contact portion 50. For example, the contact portion 50G has a bottom portion 51G, a first support portion 56G, a second support portion 58G, a first contact point 53G and a second contact point 55G. The bottom portion 51G has a flat-plate shape which extends along the XY-plane. The bottom portion 51G is located at a lower end of the contact portion 50G and extends straight along the first horizontal direction (X-direction). The first support portion 56G and the second support portion 58G are connected to opposite ends of the bottom portion 51G in the first horizontal direction, respectively. Each of the first support portion 56G and the second support portion 58G extends upward from the bottom portion 51G.

The first support portion 56G has a first projection 52G. The first projection 52G is an upper end part of the first support portion 56G. The first projection 52G projects in an arc and toward the second support portion 58G and then extends downward. The first contact point 53G is a part of the first projection 52G which is close to the second support portion 58G. The second support portion 58G has a second projection 54G. The second projection 54G is an upper end part of the second support portion 58G. The second projection 54G projects in an arc and toward the first support portion 56G and then extends along the first horizontal direction (X-direction) so as to be away from the first support portion 56G. The second contact point 55G is a part of the second projection 54G which is close to the first support portion 56G.

Figure 46:
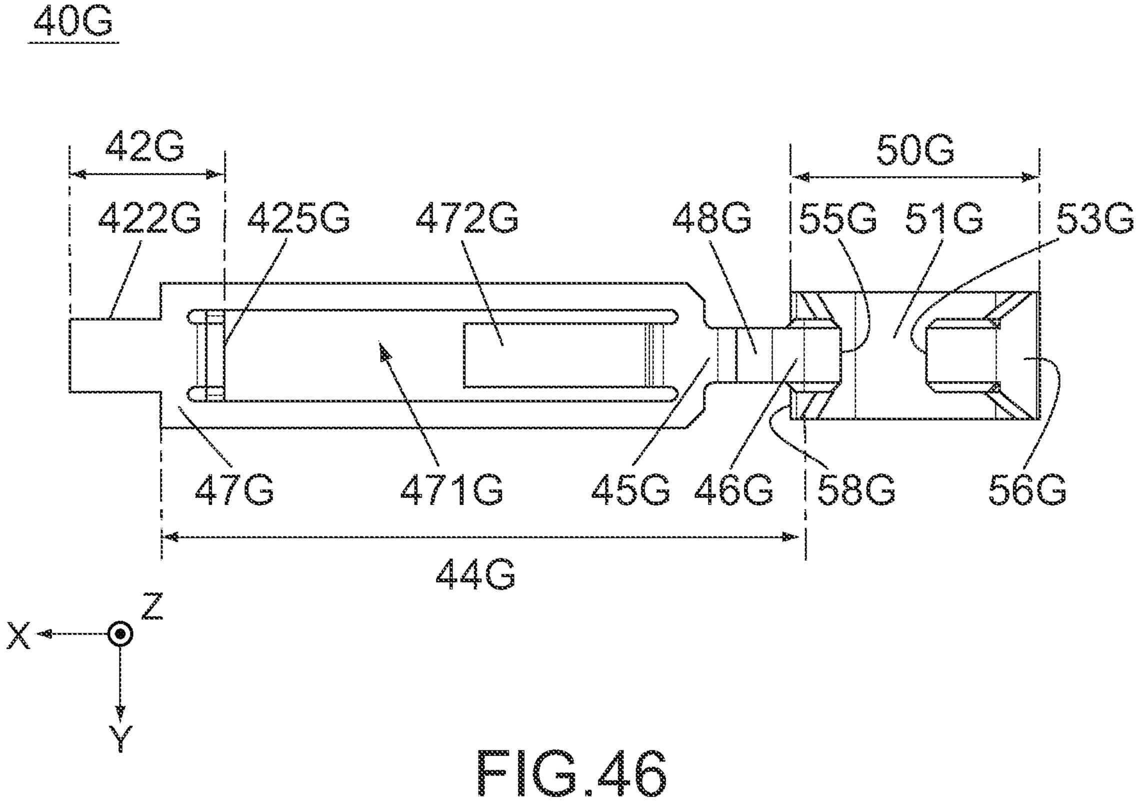
FIG. 46 is a top view showing the terminal of FIG. 44.
Figure 47:
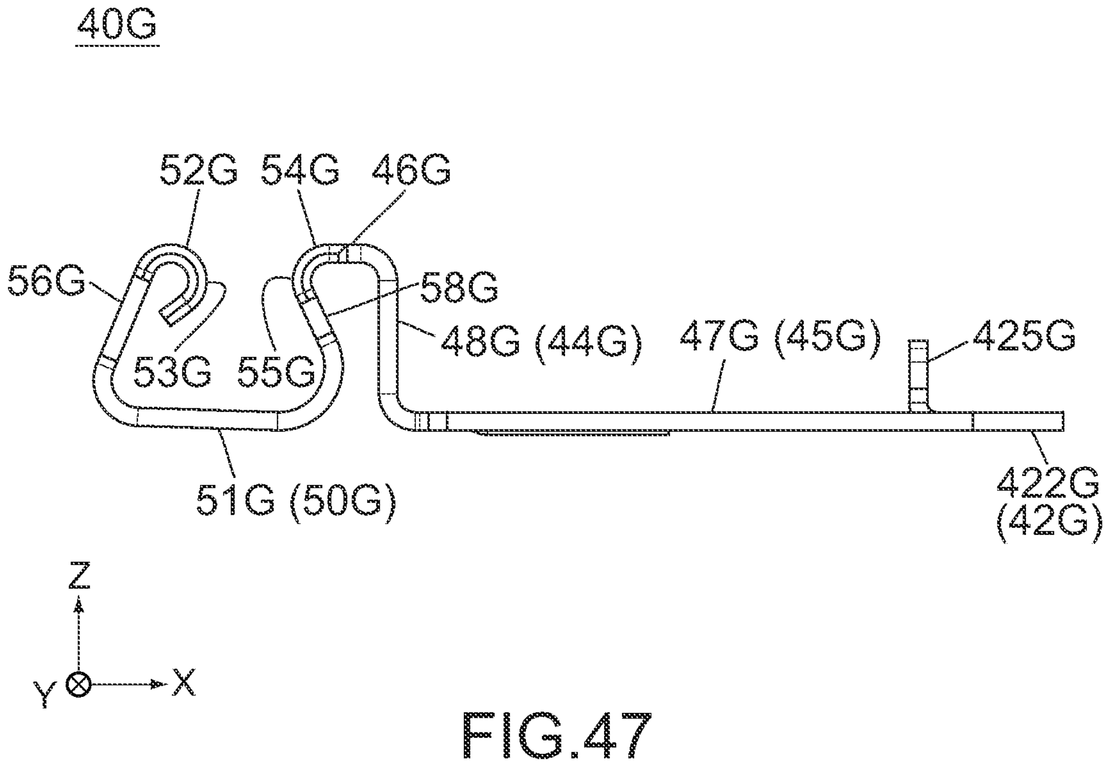
FIG. 47 is a side view showing the terminal of FIG. 44.
Figure 48:
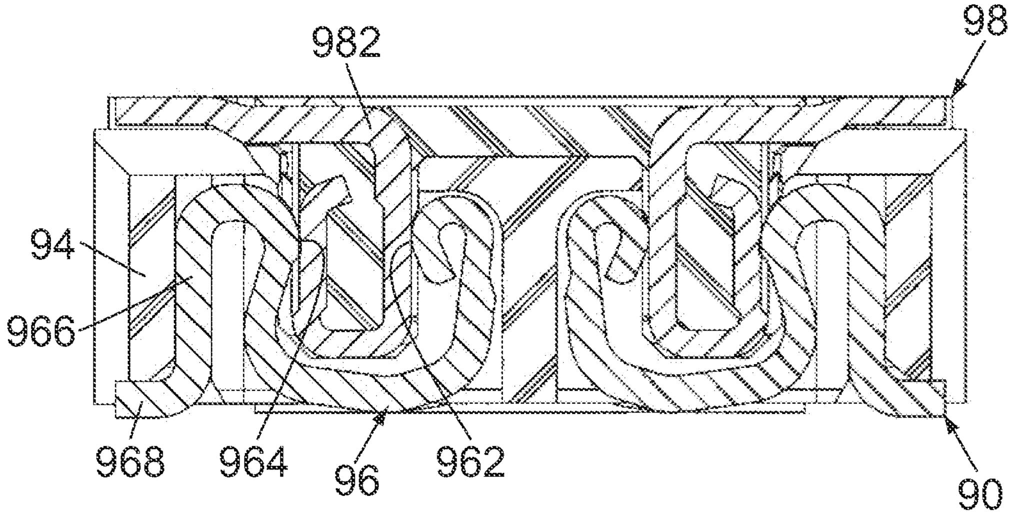
FIG.48 PRIOR ART
FIG. 48 is a cross-sectional view showing a connector and a mating connector of Patent Document 1.

Referring to FIG. 47, when the contact portion 50G is seen along the second horizontal direction (Y-direction), the first contact point 53G and the second contact point 55G are apart from each other and face each other in the first horizontal direction (X-direction). Referring to FIG. 46, the first contact point 53G and the second contact point 55G are located at positions same as each other in the second horizontal direction. The second contact point 55G is located between the first contact point 53G and the held portion 425G in the first horizontal direction. Referring to FIG. 47, the first contact point 53G is supported by the first support portion 56G. The second contact point 55G is supported by the second support portion 58G. Each of the first support portion 56G and the second support portion 58G is resiliently deformable. The first contact point 53G and the second contact point 55G are movable independently of each other.

Referring to FIG. 46, when the terminal 40G is seen from above along the upper-lower direction, the connected portion 422G, the first contact point 53G and the second contact point 55G are arranged in a straight line along the first horizontal direction (X-direction).

Referring to FIG. 47 together with FIG. 46, the whole of the contact portion 50G extends in parallel to the XZ-plane without an inclination in the second horizontal direction (Y-direction). In detail, each of the first support portion 56G and the second support portion 58G extends upward from the bottom portion 51G without being inclined in the second horizontal direction. Therefore, the first contact point 53G is located at a position same as that of a lower end of the first support portion 56G in the second horizontal direction. The second contact point 55G is located at a position same as that of a lower end of the second support portion 58G in the second horizontal direction. The first contact point 53G and the second contact point 55G are electrically connected with each other.

Referring to FIGS. 41 and 42, the contact portion 50G is accommodated in the accommodation portion 34G of the housing 20G. The contact portion 50G is apart from any part of the housing 20G, and the whole contact portion 50G is movable relative to the housing 20. Referring to FIG. 42, the mating terminal 64 is sandwiched and held between the first contact point 53G and the second contact point 55G under the mated state. As a result, the two contact points, or the first contact point 53G and the second contact point 55G, of the terminal 40G are electrically connected with the corresponding mating terminal 64.

Referring to FIGS. 44 to 47, at least a part of the arm 44G is resiliently deformable. The arm 44G of the present modification extends from a lower end of the held portion 425G to an upper end of the second support portion 58G along the first horizontal direction (X-direction). Thus, the arm 44G couples the held portion 425G and the contact portion 50G to each other and supports the contact portion 50G so that the contact portion 50G is movable. The present modification provides the new connector 10G (see FIG. 41) having: the contact portion 50G which can be stably brought into contact with the mating terminal 64 (see FIG. 42); and a structure which enables the insertion force upon mating and the removal force upon removing to be made small.

Referring to FIG. 40, the bottom portion 51G of the contact portion 50G is visible when the connector 10G is seen from below along the upper-lower direction. Referring to FIG. 42, under the separated state, the bottom portion 51G is located over the connection object 70 and is slightly apart from the connection object 70. Upon mating the mating connector 60 (see FIG. 3) with the connector 10G, the bottom portion 51G which has been moved downward is brought into abutment with the connection object 70 so that the posture of the contact portion 50G becomes stable. Since the bottom portion 51G has a flat shape in parallel to the XY-plane, the posture of the contact portion 50G can be easily made stable.

Referring to FIGS. 44 to 47, the arm 44G of the present modification is connected to an edge of the second support portion 58G in the first horizontal direction (X-direction). This edge of the second support portion 58G defines a boundary between the arm 44G and the contact portion 50G in the first horizontal direction. The boundary between the arm 44G and the contact portion 50G extends along the second horizontal direction (Y-direction). The arm 44G of the present modification has a main portion 45G and a coupling portion 46G. The coupling portion 46G is a part of the arm 44G which is located in the vicinity of the boundary between the arm 44G and the contact portion 50G. The main portion 45G is another part of the arm 44G which is other than the coupling portion 46G. The coupling portion 46G couples the main portion 45G and the contact portion 50G to each other in the first horizontal direction.

The arm 44G of the present modification has a base portion 47G and a support portion 48G. The base portion 47G has a flat-plate shape which extends along the XY-plane. The support portion 48G is a part of the arm 44G which is other than the base portion 47G and includes the coupling portion 46G. More specifically, the support portion 48G extends upward from the base portion 47G and is connected to the upper end of the second support portion 58G. The thus-formed support portion 48G is resiliently deformable. Thus, the support portion 48G has an upper end which supports the contact portion 50G so that the contact portion 50G is movable.

Referring to FIGS. 41 and 42, the support portion 48G is accommodated in the accommodation portion 34G of the housing 20G. The support portion 48G is apart from any part of the housing 20G. In particular, the support portion 48G is apart from the housing 20G in the first horizontal direction (X-direction) so as to be resiliently deformable easily in the accommodation portion 34G. The contact portion 50G of the present modification is accommodated in the accommodation portion 34G together with the support portion 48G, and the whole contact portion 50G is movable. The contact portion 50G of the present modification is supported by a softer spring, and thereby each of the insertion force upon mating and the removal force upon removing can be made smaller.

Referring to FIGS. 44 to 46, the base portion 47G extends between a lower end of the connected portion 422G and a lower end of the support portion 48G along the first horizontal direction (X-direction). The base portion 47G is formed with an aperture 471G. The aperture 471G is located at the middle of the base portion 47G in the second horizontal direction (Y-direction) and passes through the base portion 47G in the upper-lower direction.

The base portion 47G is provided with a fixed portion 472G. The fixed portion 472G is located in the aperture 471G in the XY-plane. Referring to FIGS. 41 and 42, the fixed portion 472G is fixed to the connection object 70 via soldering, etc. when the connector 10G is attached to the connection object 70. As a result, the terminal 40G is more securely fixed to the connection object 70. The fixed portion 472G of the present modification is visible from above through the hole portion 31G. The thus-arranged fixed portion 472G can be easily soldered. However, the present invention is not limited thereto. For example, the fixed portion 472G and the hole portion 31G may be provided as necessary. Moreover, the fixed portion 472G may be used as a connected portion. More specifically, the fixed portion 472G may be connected to a conductive pad (not shown) of the connection object 70. In this instance, the connected portion 422G does not need to be provided.

What is claimed is:

1. A connector mateable with a mating connector along an upper-lower direction, the mating connector comprising a mating terminal, wherein:

the connector comprises a housing and a terminal;

the housing has a holding portion and an accommodation portion;

the terminal has a held portion, an arm, and a contact portion;

the held portion is held by the holding portion;

the arm couples the held portion and the contact portion to each other and supports the contact portion so that the contact portion is movable;

at least a part of the arm is resiliently deformable;

the contact portion is accommodated in the accommodation portion, and an entirety of the contact portion is movable;

the contact portion has a bottom portion, a first support portion, a second support portion, a first contact point, and a second contact point;

the arm is connected to at least one of the bottom portion and the first support portion;

each of the first support portion and the second support portion extends upward from the bottom portion;

the first contact point is supported by the first support portion;

the second contact point is supported by the second support portion;

the second contact point is located between the first contact point and the held portion in a first horizontal direction perpendicular to the upper-lower direction;

when the contact portion is seen along a second horizontal direction perpendicular to both the first horizontal direction and the upper-lower direction, the first contact point and the second contact point are apart from each other;

under a mated state where the connector is mated with the mating connector, the mating terminal is sandwiched and held between the first contact point and the second contact point;

the accommodation portion opens downward from the housing; and the bottom portion is visible when the connector is seen from below along the upper-lower direction.

2. The connector as recited in claim 1, wherein:

the arm has a main portion and a coupling portion;

at least a part of the main portion is resiliently deformable; and the coupling portion couples the main portion and the contact portion to each other in the second horizontal direction.

3. The connector as recited in claim 1, wherein:

the arm and the contact portion are partially arranged in the second horizontal direction; and the terminal includes a gap located between the arm and the contact portion in the second horizontal direction.

4. The connector as recited in claim 1, wherein at least a part of the arm is located below the second contact point and is connected to the contact portion.

5. The connector as recited in claim 1, wherein:

each of the first support portion and the second support portion is resiliently deformable; and the first contact point and the second contact point are movable independently of each other.

6. The connector as recited in claim 1, wherein the bottom portion has a flat-plate shape.

7. The connector as recited in claim 1, wherein the arm is connected to the bottom portion.

8. The connector as recited in claim 1, wherein:

the arm has two branches;

each of the branches is connected to the contact portion; and the second support portion is located between the two branches in the second horizontal direction.

9. The connector as recited in claim 1, wherein:

the arm has a base portion and a support portion;

the support portion extends upward from the base portion and is resiliently deformable;

the support portion has an upper end which supports the contact portion; and the contact portion is accommodated in the accommodation portion together with the support portion, and an entirety of the contact portion is movable.

10. The connector as recited in claim 1, wherein the first support portion extends upward from the bottom portion without being inclined in the second horizontal direction.

11. The connector as recited in claim 1, wherein the first support portion extends upward from the bottom portion while being inclined in the second horizontal direction.

12. The connector as recited in claim 1, wherein the first contact point and the second contact point are electrically connected with each other.

13. The connector as recited in claim 1, wherein:

the connector is configured to be attached to a connection object;

the terminal has a connected portion; and the connected portion is connected to the connection object when the connector is attached to the connection object.

14. The connector as recited in claim 13, wherein the held portion is located between the contact portion and the connected portion.

15. The connector as recited in claim 1, wherein:

the arm has a base portion and a standing portion;

the base portion extends along the first horizontal direction; and the standing portion extends upward from the base portion and is connected to the first support portion.

16. The connector as recited in claim 15, wherein when the terminal is seen along the second horizontal direction, the standing portion overlaps with the first support portion.

17. The connector as recited in claim 15, wherein when the terminal is seen along the second horizontal direction, the standing portion is apart from the first support portion.

18. A connector mateable with a mating connector along an upper-lower direction, the mating connector comprising a mating terminal, wherein:

the connector comprises a housing and a terminal;

the housing has a holding portion and an accommodation portion;

the terminal has a held portion, an arm, and a contact portion;

the held portion is held by the holding portion;

the arm couples the held portion and the contact portion to each other and supports the contact portion so that the contact portion is movable;

at least a part of the arm is resiliently deformable;

the contact portion is accommodated in the accommodation portion, and an entirety of the contact portion is movable;

the contact portion has a bottom portion, a first support portion, a second support portion, a first contact point, and a second contact point;

each of the first support portion and the second support portion extends upward from the bottom portion;

the first contact point is supported by the first support portion;

the second contact point is supported by the second support portion;

the second contact point is located between the first contact point and the held portion in a first horizontal direction perpendicular to the upper-lower direction;

when the contact portion is seen along a second horizontal direction perpendicular to both the first horizontal direction and the upper-lower direction, the first contact point and the second contact point are apart from each other;

under a mated state where the connector is mated with the mating connector, the mating terminal is sandwiched and held between the first contact point and the second contact point;

the arm has two branches;

each of the branches is connected to the contact portion; and the second support portion is located between the two branches in the second horizontal direction.

* * * * *